(12) United States Patent
Lansberry

(10) Patent No.: US 6,425,450 B1
(45) Date of Patent: Jul. 30, 2002

(54) LOAD-SHIFTING VEHICLE

(75) Inventor: John B. Lansberry, Woodland, PA (US)

(73) Assignee: Lansberry Tractor Company, Inc., Woodland, PA (US)

( * ) Notice: Subject to any disclaimer, the term of this patent is extended or adjusted under 35 U.S.C. 154(b) by 0 days.

(21) Appl. No.: 09/984,647

(22) Filed: Oct. 30, 2001

Related U.S. Application Data

(60) Provisional application No. 60/243,732, filed on Oct. 30, 2000.

(51) Int. Cl.[7] .............................................. B62D 55/02
(52) U.S. Cl. .................... 180/9.36; 180/9.38; 180/9.42; 180/6.24; 180/6.62
(58) Field of Search ................. 180/9.36, 9.38, 180/9.42, 6.24, 6.62, 6.7, 9.1, 9.34, 307

(56) References Cited

U.S. PATENT DOCUMENTS

| | | | | |
|---|---|---|---|---|
| 1,287,643 A | * | 12/1918 | Corbitt | 180/9.36 |
| 1,341,851 A | * | 6/1920 | Hicks | 180/9.36 |
| 1,503,628 A | * | 8/1924 | Best | 180/9.36 |
| 4,304,313 A | * | 12/1981 | van der Lely | 180/15 |
| 4,306,640 A | * | 12/1981 | Morgan | 180/308 |
| 4,395,878 A | * | 8/1983 | Morita et al. | 180/307 |
| 4,458,485 A | * | 7/1984 | Seelmann | 180/6.48 |
| 4,679,396 A | * | 7/1987 | Heggie | 60/414 |
| 5,615,748 A | * | 4/1997 | Lansberry | 180/9.36 |
| 6,044,921 A | * | 4/2000 | Lansberry | 180/6.48 |
| RE37,098 E | * | 3/2001 | Lansberry | 180/9.36 |

FOREIGN PATENT DOCUMENTS

| | | | | |
|---|---|---|---|---|
| DE | 3603871 A1 | * | 8/1987 | B62D/11/08 |
| EP | 700821 A1 | * | 3/1996 | B62D/7/06 |

* cited by examiner

Primary Examiner—Lanna Mai
Assistant Examiner—Paul Royal, Jr.
(74) Attorney, Agent, or Firm—Pillsbury Winthrop LLP

(57) ABSTRACT

A vehicle is driven by a central track assembly and differential speed steering wheels in flanking relation thereto.

17 Claims, 25 Drawing Sheets

LOAD-SHIFTING VEHICLE

This application claims priority to provisional application No. 60/243,732 filed Oct. 30, 2000, which application is hereby incorporated by reference in its entirety into the present application.

FIELD OF THE INVENTION

The present invention is generally related to vehicles and more particularly related to a vehicle for use on a wide range of terrain, including uneven and/or steep terrain having a variety of soil conditions. The vehicle of the present invention offers many advantages over conventional vehicles and can replace conventional vehicles in performing a variety of tasks.

BACKGROUND OF THE INVENTION

Most conventional vehicles such as agricultural tractors, front end loaders and bulldozers are either driven by four wheels or by a pair of laterally spaced, parallel tracks. Four-wheeled vehicles have a pair of laterally spaced front wheels and a pair of laterally spaced rear wheels that engage the ground and rotate during vehicle movement. Typically, one or both pairs of wheels are driven to move the vehicle. The wheels of the wheel-driven vehicles are generally large and have treat designs tread aid in moving the vehicle over sand, clay and mud. Although capable of moving over terrain having a variety of soil conditions, conventional wheel-driven vehicles frequently become stuck because all of the tractional forces and driving surfaces of the wheels are not always put to the ground. Typical track-driven vehicles employ steel or rubber endless tracks that are driven to move the vehicle over the ground.

Conventional four wheel vehicles and conventional two track vehicles often cause environmental damage when used in natural areas. Recently, environmental concerns have been raised about the disruption of the topsoil which occurs when conventional loader/bulldozer-type vehicles are operated on the topsoil, sand or other soft terrain of sensitive natural areas. For example, in the tree harvesting industry, construction industry and/or the agricultural industry, the operation of conventional vehicles of the type described may cause significant damage to the topsoil, which in turn may result in the formation of ruts which may lead to soil erosion.

It is self evident from the above that the advantage of a two-track tractor vehicle over a four-wheeled tractor vehicle is its traction and stability. On the other hand, the advantage of a four-wheeled tractor vehicle over a two-track vehicle is in its ease of handling and maneuverability.

To a considerable extent, the tractor vehicle of my U.S. Pat. No. 5,615,748 patent achieves the advantages of both two track and four wheeled tractor vehicles. This is because it provides a central track for traction and stability and two outrigger wheels for ease of handling and maneuverability.

The outrigger wheels of my '748 tractor vehicle were steerable about a generally upright steering axis. The wheels were controlled using a steering mechanism capable of turning both wheels generally in unison about their respective steering axes to effect turning movement.

In my U.S. Pat. No. 6,044,921, it is disclosed that enhanced ease of handling and maneuverability can be achieved by utilizing outrigger wheels which are steered by changing the relative driving speed between the two outrigger wheels rather than by moving them in unison about upright steering axes. Further enhancement can be obtained by mounting the outrigger wheels for vertical movement and utilizing hydraulic cylinders and a control system therefor to maintain the wheels in ground contact.

The '748 or the '921 tractor vehicle, enhanced as aforesaid because it includes a central track and two outrigger wheels, is uniquely set up to enable a substantial portion of the load support to be shifted between the central track and the outrigger wheels. For example, if the hydraulic cylinders which keep the outrigger wheels in ground contact are adjusted so that a substantially low-pressure condition exists, the central track will support most of the vehicle load on the ground. As the pressure conditions in the hydraulic cylinders are increased, more and more of the vehicle load will be assumed by the outrigger wheels.

This substantial shift in load support occurs without any shifting of the load itself or any tilting of the frame. In contrast, the only way load support can be shifted between the two tracks of a two-track tractor or the four wheels of a four-wheel tractor is to shift the load itself. This unique load support shifting capability made possible by the use of hydraulic cylinders to keep the independently driving outrigger wheels on opposite sides of the central track in ground contact, enables traction and stability to be enhanced while at the same time further enhancing the ease of handling and maneuverability of the tractor vehicle.

Since existing two track tractors and four wheeled tractors do not have this load shifting capability, once they become stuck or bogged down in sloppy ground, there is nothing that can be done by the tractor itself to extricate itself from its mired condition. Shifting of the load carried between the central track and the outrigger wheels of the present vehicle allows the vehicle itself to vary the mired condition sufficiently to extricate itself from any one mired condition.

There is a need to make improvements in the functions of the disclosed vehicle or the way in which existing functions are achieved in order to make the vehicle more cost effective and otherwise more acceptable to a user.

BRIEF SUMMARY OF THE INVENTION

It is an object of the present invention to make such improvements and hence fulfill the need expressed above. In accordance with the principles of the present invention, this objective is obtained by providing a vehicle having improvements in combination with other vehicle components which comprise a frame assembly and an engine assembly carried by the frame assembly constructed and arranged to generate power. A drive track assembly is provided on the frame assembly which includes a series of rollers including a drive roller and an endless track trained about the rollers so as to provide an operative ground engaging flight extending longitudinally with respect to the frame assembly. A power operated track mover is operatively connected to the drive roller to move the operative flight in ground engaging relation and a pair of left and right driving and steering wheels are disposed on opposite sides of the drive track assembly in flanking relation thereto.

Each of the wheels has (1) mounting structure supporting the wheel for rotational movement about a rotational axis mounted on the frame assembly for vertical movement between extended and retracted positions with respect thereto; (2) a power operated wheel rotator connected thereto to rotate the associated wheel about its rotational axis; and (3) a power operated vertical mover constructed and arranged to move the mounting structure with respect to the frame assembly between the extended and retracted positions thereof.

The arrangement of the wheel mounting structures and vertical movers with respect to the frame assembly and track frame structure is such that movement of the wheel mounting structures by the vertical movers with respect to the frame assembly between the extended position thereof creates a shift of load between the wheels and the track assembly progressively between a maximum traction condition wherein the load is shared relatively less by the wheels and by the entire operative flight of the track and a maximum turning tricycle condition wherein the load is shared relatively more by the wheels and by only a portion of the operative flight of the track with the remainder of the operative flight of the track held out of ground contact.

An electronic controller is provided which is operable to control (a) an amount of power supplied from the engine assembly to the power operated track mover; (b) an amount of power supplied from the engine assembly to a left one of the wheel rotators; (c) an amount of power supplied from the engine assembly to a right one of the wheel rotators; (d) an amount of power supplied from the engine assembly to a left one of the vertical movers and (e) an amount of power supplied from the engine assembly to a right one of the vertical movers. A speed input system is communicated to the controller. The speed input system is operable to transmit a speed signal to the controller indicative of a selected speed at which the vehicle is to be moved. The controller is operable to receive the speed signal and responsively control the amount of power supplied from the engine assembly to the track mover and the wheel rotators so as to move said vehicle at the selected speed.

A steering input device is also communicated with the controller. The steering input device is operable to transmit straight and turning signals to the controller indicative of a selected straight vehicle movement and of a selected angle at which the vehicle is to be turned. The controller is operable to process the steering signals transmitted thereto and responsively control (a) the respective amounts of power supplied from the engine assembly to the track mover the wheel rotators and the vertical movers such that (1) when a straight signal is processed, both wheels rotate at the same speed in uncoordinated relationship with the track speed and the wheel mounting structures are in relative retracted positions with respect to the frame assembly presenting traction condition wherein the load is shared between the wheels and the entire operative flight of the track assembly, and (2) when a turning signal is processed an outer wheel with respect to the selected angle of turn rotates at a greater speed than an inner wheel with respect to the selected angle of turn to thereby effect the selected turn and the wheel mounting structures are in relative extended positions relative to said frame assembly presenting a turning tricycle condition wherein the load is shared between said wheels and only a portion of the operative flight of the track.

In accordance with the principles of the present invention, the improvements which are combined with the aforesaid vehicle components include one or more of the following three improvements: (1) The controller has connected therewith a controlled lateral tilt input system operable to generate a lateral tilt signal indicative of a sustained vehicle movement along a slope in a direction wherein a downhill wheel is lower than an uphill wheel and the frame assembly has at least a predetermined lateral tilt. The controller is operable to process the lateral tilt signal and responsively control the respective amounts of power from the engine assembly to one or more of the vertical movers to move the frame assembly from the lateral tilted condition into a generally horizontally level condition. Each of the vertical movers is provided with a separate manually actuatable second vertical mover in series therewith and a manually actuated lateral tilt system is operatively connected to each second vertical mover to cause power from the engine assembly to move the second vertical mover in accordance with a selected manual actuation thereof. The controller is rendered operable when processing a turning signal as aforesaid to responsively provide a greater amount of power from the engine assembly to an outer vertical mover with respect to the angle of turn than to an inner vertical mover with respect to the angle of turn so that the faster rotating outer wheel is provided with greater ground pressure and increased traction and any lateral tilt of the frame assembly during the turn is stabilized.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
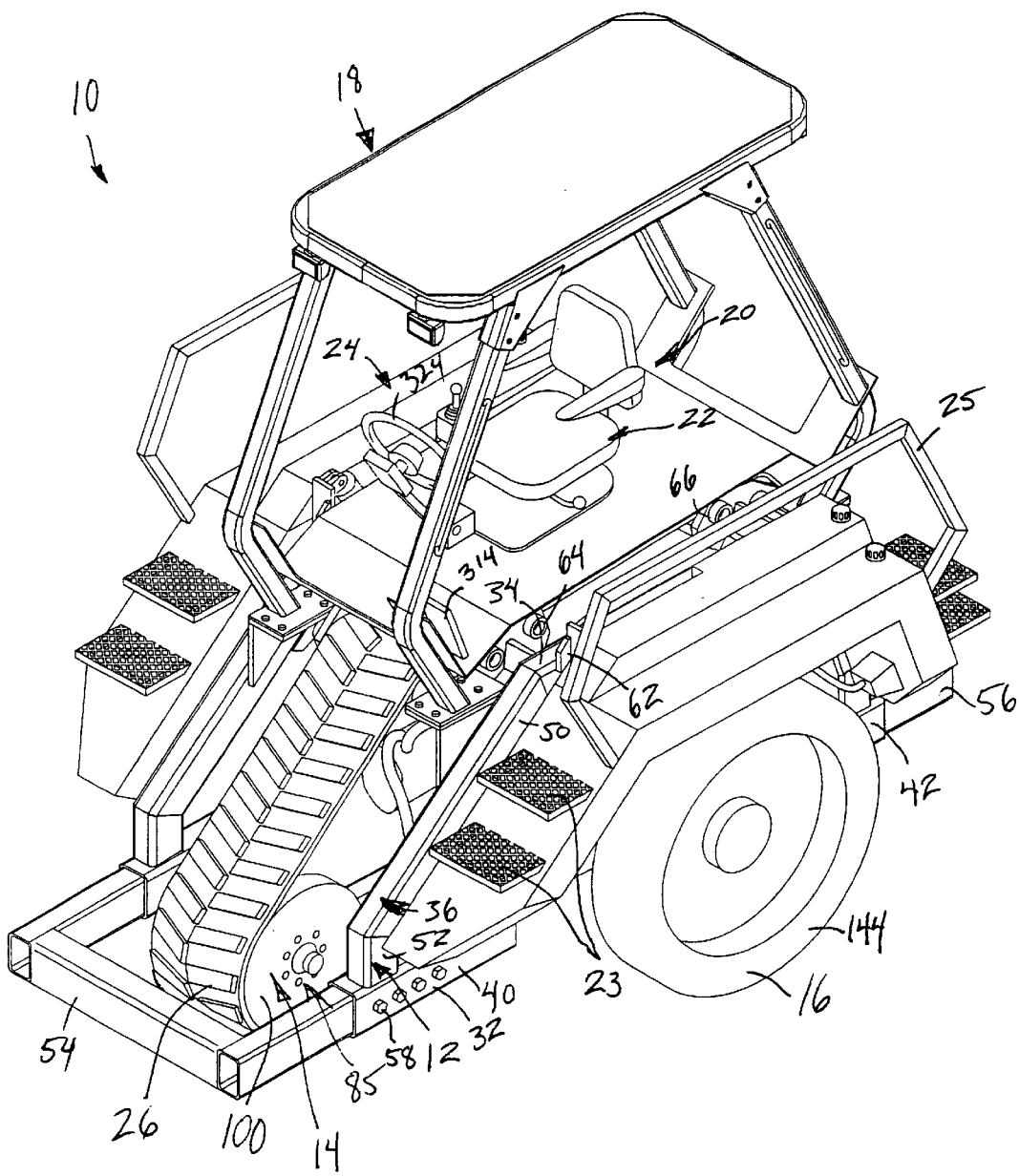
FIG. 1 is a perspective view of a vehicle constructed according to the principles of the present invention.

FIG. 1 is a left side perspective view (where the left and right directions are considered from the point of view of a forwardly facing vehicle operator) of a vehicle, generally indicated at 10, constructed in accordance with the principles of the present invention. The vehicle 10 is of the same general type as is disclosed in my U.S. Pat. Nos. 5,615,748 and 6,144,921 and in my co-pending provisional U.S. patent application Ser. No. 60/156,451 filed Sep. 28, 1999, the entirety of each patent and application being incorporated into the present application in its entirety for all material disclosed therein.

The vehicle 10 includes a frame assembly or main frame, generally indicated at 12, a driving track assembly, generally indicated at 14, mounted to the frame 12, and a pair of secondary driving assemblies, each generally indicated at 16, disposed on opposing lateral sides of the track assembly 14 in flanking relation. A cab assembly 18 is mounted on top of the main frame 12 and includes an operator cockpit 20. The cockpit 20 includes an adjustable operator's seat assembly 22 and a plurality of controls generally designated 24 which are used to operate and maneuver the vehicle 10 and to operate any implements (not shown) mounted on the front or rear (or both) of the vehicle 10. The cab assembly 18 provides an operator envelope in the cockpit 20 area that is ASAE/OSHA/MSHAW compliant and certified for rollover protection and for falling object protection. A plurality of steps 23 and a pair hand rails 25 are provided to assist the operator when entering and exiting the cab assembly 18. Preferably the seat portion of the seat assembly 22 is mounted on a seat suspension assembly (not visible in the figures) that functions to cushion the driver from "bumps" during vehicle movement, particularly on uneven terrain.

As explained below, the track assembly 14 includes a longitudinally extending, ground-engaging endless track 26, a hydraulically powered track motor constituting a track mover, a fixed ratio track planetary gear assembly, a series of track-supporting idler rollers and a power driven track drive roller. The track motor drives the track drive roller which moves the track 26 so that a ground engaging operative flight thereof moves along the ground to drive the vehicle 10.

Figure 2:
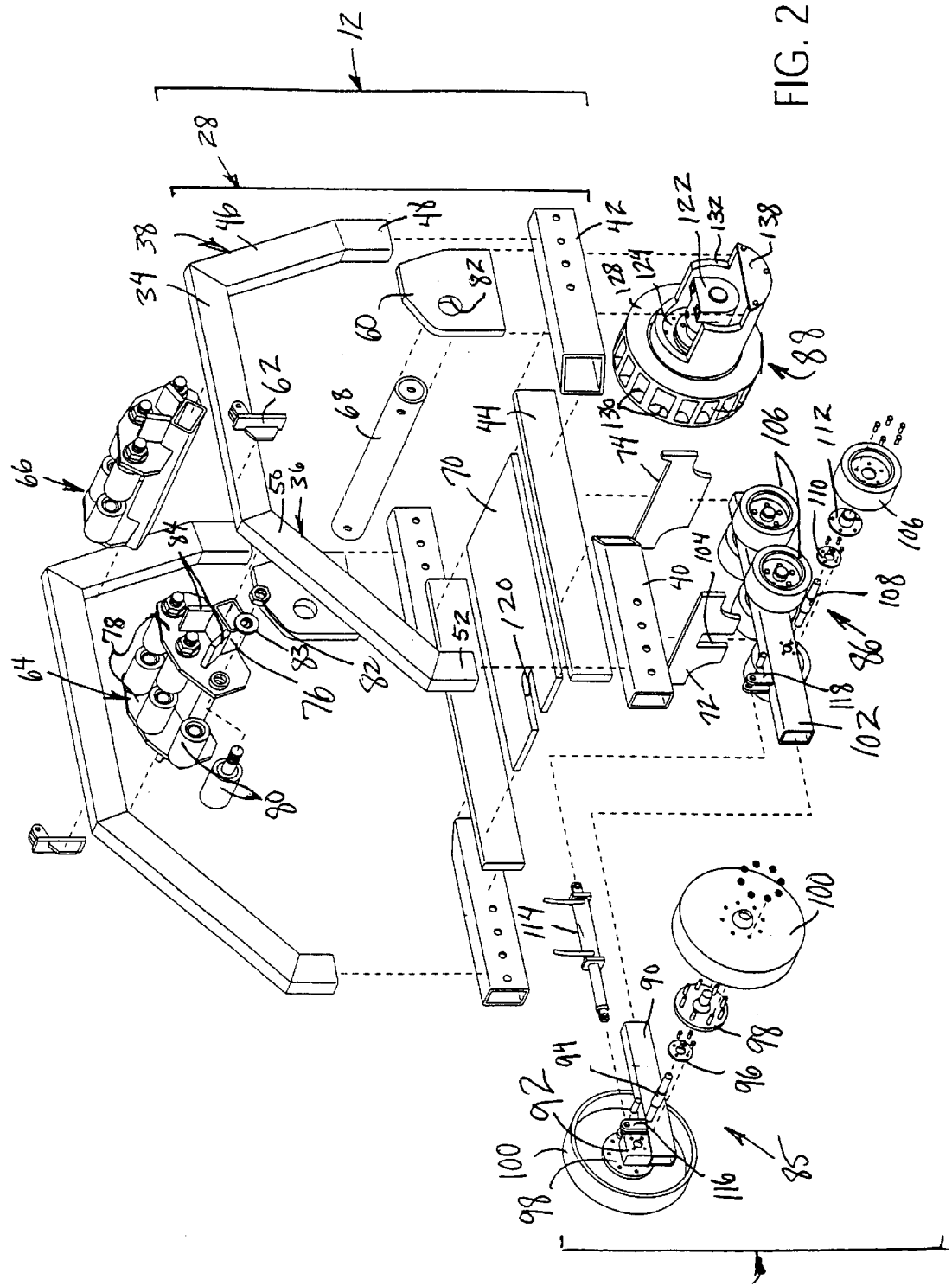
FIGS. 2 and 3 are partially exploded views of a main frame and a portion of a drive track assembly of the vehicle.
Figure 3:
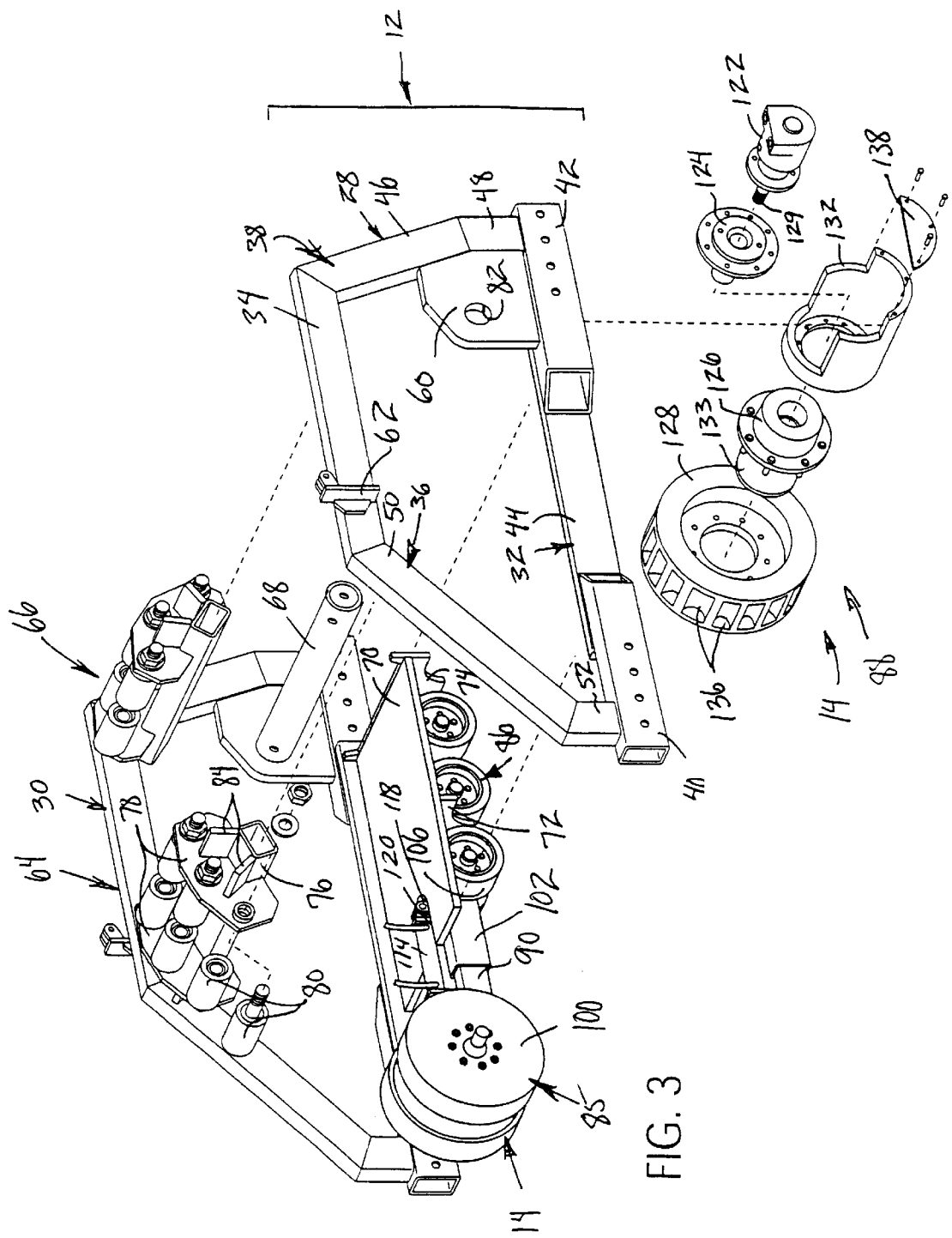
Figure 4:
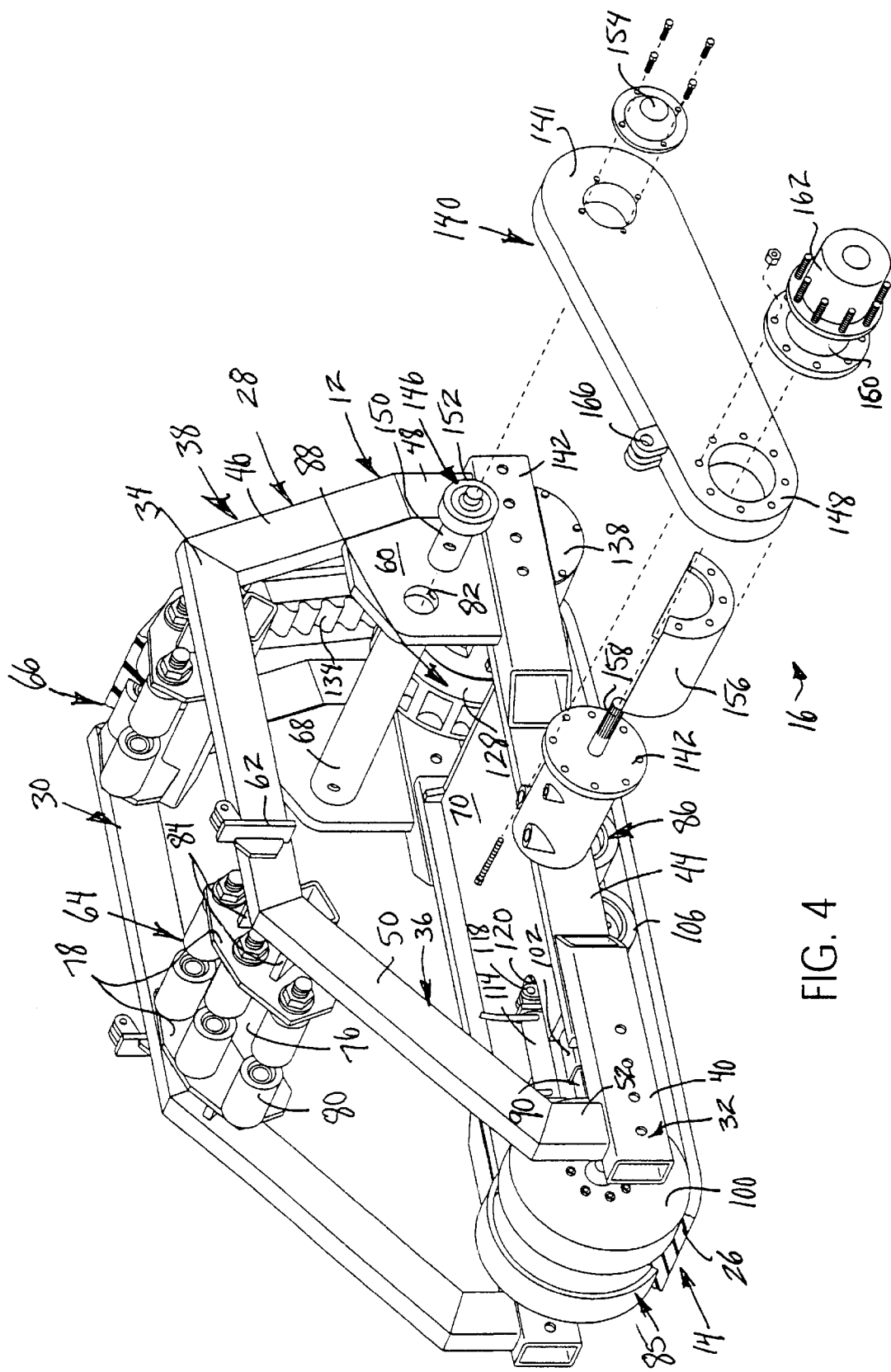
FIG. 4 is a view showing the assembled main frame and driving track assembly with a track portion of the track assembly broken away and not shown and showing portion of a secondary driving assembly of the vehicle in partially exploded view.

The construction of the frame 12 and the track assembly 14 can be best understood from FIGS. 2–4. The frame 12 is constructed of metallic components that are fixed together by welding or the like. The frame 12 is shown in partially exploded view in FIGS. 2 and 3. The frame 12 can be viewed as including a pair of frame side structures 28, 30. The side structures 28, 30 are of mirror image construction so only structure 28 is considered in detail, but the discussion applies equally to structure 30.

The side structure 28 (shown in partially exploded view in FIG. 2 and assembled in FIG. 3) includes a lower frame rail 32 (see FIG. 3), an upper frame rail 34, a forward frame rail 36 (see FIG. 3) and a rearward frame rail 38 (see FIG. 3). The lower frame rail 32 includes a pair of tubular sleeves 40, 42 and a central connecting member 44 rigidly secured therebetween. The rearward frame rail 38 includes tubular metallic upper and lower rearward frame members 46, 48. The forward frame rail 36 includes tubular metallic upper and lower forward frame members 50, 52. The upper frame rail 34 is a single integral tubular member. The members 34, 46, 48, 50, 52 can be welded to form an inverted generally U-shaped tubular structure that is in turn welded to the lower frame rail 32.

The vehicle includes forward and rearward counterbalance structures 54, 56, each of which is an elongated, generally U-shaped metallic tubular structure. Each counterbalance structure is telescopically received within associated pairs of tubular sleeves 40 or 42, respectively, for longitudinal movement with respect to the frame 12 and is releasably held in an adjusted position by locking bolts 58. Details of the construction, mounting, function and operation of the counterbalance structures 54, 56 is disclosed in the above-incorporated '451 patent application reference and will not be considered in further detail.

The side structure 28 further includes a rearward support structure 60 and an upper bracket 62. The rearward support structure 60 is a metallic structure and is rigidly fixed to the lower and rearward frame rails 32, 38 by welding or the like. The upper bracket 62 is a metallic structure and is rigidly fixed to a forward portion of the upper forward rail 34 by welding or the like.

The frame 12 further includes a forward upper roller support assembly 64, a rearward upper roller support assembly 66, a laterally extending tubular support structure 68, an engine assembly support structure 70 and a pair of laterally extending lower connecting structures 72, 74.

The structure of the forward and rearward upper roller supports 64, 66 is identical, so the structure of only the forward support 64 is considered in detail. The forward roller support 64 includes a main tubular structure 76 and a pair of laterally spaced, vertically extending roller support elements 78 rigidly affixed thereto. Three pairs of track-supporting upper idler rollers 80 are mounted on each roller support 64, 66 generally between the support elements 78 with nuts 82 and washers 83. The pairs of rollers 80 generally support the track 26 for rotational movement of the track 26 with respect to the frame. A pair of metallic auxiliary elements 84 are each affixed to the main tubular structure 76 at each end thereof and to an outwardly facing surface of the adjacent support elements 78 by welding or the like.

The upper roller supports 64, 66, the tubular support structure 68, the engine assembly support structure 70, and the pair of laterally extending connecting structures 72, 74 are metallic structures and, as best appreciated from FIGS. 3 and 4, are rigidly secured between the side structures 28, 30 (by welding or the like) to hold the longitudinally extending side structures 28, 30 in laterally space fixed relation.

More particularly, each auxiliary element 84 is a plate-like structure. An outer edge surface of each auxiliary element 84 of each upper roller support 64, 66 is welded to an adjacent portion of the associated side structures 28, 30 (as can be understood, for example, FIG. 5). Each end of the laterally extending tubular support structure 68 is welded to the rearward support structure 60 of the associated side structure 28, 30. An aperture 82 in each rearward support structure 60 is approximately the same size as and is aligned with the tubular opening of the associated end of the tubular support structure 68 so that the opening 82 in each rearward support structure 60 and the tubular support structure 68 cooperate to define a laterally extending channel through the main frame 12.

The engine assembly support structure 70 is welded between the central connecting structures 44 of the side structures 28, 30 and provides a horizontally extending support surface for the engine assembly. The lower connecting structures 72, 74 are welded between the central connecting structures 44 of the side structures 28, 30 and are also welded to a bottom surface portion and a rearward edge portion, respectively, of the engine assembly support structure 70 to help reinforce the support structure 70 and to provide structure for mounting a portion of the track assembly 14, as will become apparent.

The track assembly 14 includes the track 26, the upper idler rollers 80, a front idler wheel assembly 85, a road wheel assembly 86, and a track driving assembly 88.

The front idler assembly 85 is shown in partially exploded view in FIG. 2. The front idler assembly 85 includes a tubular front wheel support 90 and a front axle support 92 adjustably mounted thereto. A front idler axle 94 is held within the axle support 92 by a pair of front axle retainer rings 96. A front idler bearing 98 is mounted on each end of the idler axle 94. A front idler wheel 100 is mounted on each bearing 98 for free rotational movement with respect to the axle 94. As considered in further detail below, the two front idler wheels 100 are held in laterally spaced relation to one another by the axle 94 to allow a plurality of teeth 134 integrally formed around the inside of the track 26 to pass between the spaced wheels 100 (as best understood from FIG. 4). It is contemplated to use a track 26 on the vehicle that is constructed of rubber. All rubber tracks are shaped somewhat differently from one another. A front adjuster assembly (not shown) is included in the front idler assembly 85 which allows the pair of front idler wheels 100 (and the associated structures including the axle support 92, the axle 94, the rings 96 and the bearings 98) to be shimmed right or left as a unit to ensure proper tracking of the track 26, particularly when the track 26 is a rubber track. "Shimming" thus refers to the movement wheels 100 laterally (bi-directionally from an imaginary longitudinally extending center line of the vehicle) with respect to a rear drive wheel 128 of the vehicle.

A tubular road wheel housing 102 is rigidly fixed below the engine assembly support structure 70 by welding or the like. The tubular housing 102 is affixed within a downwardly opening notch 104 in the connecting structure 72 and is welded to a forwardly facing surface of the connecting structure 74. Three pairs of idler road wheels 106 are rotatably mounted on the housing 102 by axles 108 (see FIG. 2). Each axle 108 is mounted on the housing 102 by a pair of retainer rings 110. An idler bearing 112 is mounted on each end of each axle 108 to rotatably mount a wheel 106 on each end of each axle 108.

The front wheel support 90 of the front idler wheel assembly 85 is telescopically received within a forward portion of the housing 102 and a track tensioning hydraulic piston assembly 114 is mounted between a bracket 116 on the front wheel support and a bracket 118 on an upper portion of the housing 102. FIG. 3 shows the assembled front idler wheel assembly 85 telescopically interengaged with the assembled road wheel assembly 86. A notch 120 is formed in the engine assembly support structure 70 to accommodate the piston assembly 114. The front idler wheels 100 are capable of movement in the longitudinal direction with respect to the road wheel assembly 86 and track driving assembly 88 in response to expansion and contraction of the hydraulic piston assembly 114 to tension the track 26.

The construction of the track driving assembly 88 is best understood from the partially exploded view of FIG. 3. The track driving assembly 88 includes a power-operated track operating motor 122, a support assembly 124, a track planetary gear assembly 126 and a track-engaging drive wheel 128. The support assembly 124, the track operating motor 122 and the gear assembly 126 are bolted together and to a track housing 132 such that a splined shaft 129 on the track operating motor 122 is in gear-meshing engagement with gears inside the planetary gear assembly 126. The operating motor 122 is mounted within a track housing 132 and the planetary gear assembly 126 is mounted on the exterior of the track housing 132. The track drive wheel 128 is bolted to a hub assembly portion 133 of the planetary gear assembly 126 and is operatively associated with the track operating motor 122 such that rotation of the motor shaft 129 rotates the track drive wheel 128 to drive the track 26 with respect to the frame 12. Preferably, the planetary gear assembly 126 is a fixed ratio device and is provided by a readily commercially available unit such as a Model 9 Wheel Drive commercially available from Scott Industrial Systems as part number Auburn 9WC 114349B5Z. Preferably the planetary gear assembly 126 includes a spring-applied, pressure released brake mechanism.

It can be understood from FIGS. 2–4 that the assembled track driving assembly 88 is secured to the lower frame rail 32 of the side structure 28 by bolts in operative relation to the track 26. A removable cover 138 is bolted on the housing 132.

The track 26 is shown in fragmentary view in FIG. 4 mounted for rotational movement about the two rearward most pairs of upper idler rollers 80, lower portions of the front idler wheels 100 of the front idler wheel assembly 85 and the road wheels 106 of the road wheel assembly 86. FIG. 4 also shows the track 26 drivably engaged with the track drive wheel 128 of the track driving assembly 88. It can be appreciated from FIG. 4 that the track 26 is a rubber structure and includes the plurality of spaced teeth 134 which drivingly engage circumferentially spaced grooves or recesses 136 on the drive wheel 128. Preferably the track is manufactured by Goodyear Tire & Rubber and has the commercial part number 26400160XEXFX 26022. The upper idler rollers 80, the front idler wheels 100 and the road wheels 106 are laterally spaced to accommodate passage of the teeth 134 during rotation of the track 26. The teeth/grooves arrangement of the track assembly is an example of a positive drive configuration (also referred to as a sprocket-type drive). As an alternative to the exemplary positive lug drive configuration, it is contemplated to replace the positive lug drive with a friction drive, that is, an arrangement in which the drive wheel frictionally engages and drives the track.

A secondary driving and steering assembly 16 is mounted on each side of the vehicle 10. A secondary driving and steering assembly 16 is shown in exploded relation to the frame 12 in FIG. 4. The secondary driving assemblies are of mirror image construction so only one assembly 16 is shown in FIG. 4 and is discussed in detail, but the discussion applies to both assemblies. The driving assembly 16 includes a vertically movable mounting structure 140 including an arm 141, a power-operated driving structure operating motor 142 constituting a wheel rotator, and a ground engaging driving structure preferably in the form of a ground engaging rotatable wheel 144 (shown, for example, in FIG. 1 but not shown in FIG. 4 to more clearly illustrate portions of the driving assembly 16). Alternatively, the ground engaging driving structure may be a small track assembly as shown in the above-incorporated '921 patent reference.

The vertically movable mounting structure 140 includes a frame connecting portion 146 and a driving structure mounting portion 148 on the distal end of the arm 141. The frame connecting portion 146 includes a spindle structure 150 that is secured within the opening 82 in the rearward support structure 60 and within an adjacent end portion of the tubular support structure 68. The arm 141 is pivotally mounted on the spindle structure 150 through a spindle bearing assembly 152. More specifically, the arm 141 is welded to an outer annular surface on the spindle bearing assembly 152 and a spindle cap 154 is bolted on the arm 141 to cover the assembly 152. Preferably the spindle structure 150 is provided by a 16,000 lb. tandem tube spindle commercially available from Conestoga Tire & Rim, Co. The spindle structure 150 is a double set of tapered bearings mounted around an outer hub to which the associated arm 141 is welded.

The driving structure mounting portion 148 includes a motor support housing 156 that is bolted to the distal end of the arm 141. The operating motor 142 is bolted to the arm 141 and to the housing 156 such that a splined drive shaft 158 on the motor drivingly engages a wheel planetary gear assembly 160. A wheel-supporting hub portion 162 of the planetary gear assembly 160 is constructed and arranged to receive the rim of an associated wheel. Preferably the planetary gear assembly 160 associated with each wheel is a fixed ratio device and is commercially available as a Model 6 Wheel Drive commercially available from Scott Industrial Systems as part number Auburn 6W 2B 152472.

It can thus be seen that each mounting structure 140 supports the associated wheel 144 for rotational movement about a rotational axis and is mounted on the main frame 12 for vertical movement between extended and retracted positions.

The secondary driving assembly 16 further includes a power-operated vertical mover in the form of an extendible and retractable hydraulic piston and cylinder suspension assembly 164 (best seen in FIG. 7) that is in fluid communication with a hydraulic pump system as described below. The suspension assembly 164 is pivotally mounted to the upper bracket 62 on the upper frame rail 34 and to an arm bracket 166 on the arm 141. The suspension assembly 164 is constructed and arrange to pivot the arm 141 about the frame mounting portion 150 so as to maintain a bottom surface of each wheel in generally parallel relation to the ground to assure optimal engagement of the treaded outer surface of each tire with the ground surface in all pivotal positions of the arm 141. Preferably the tire mounted on each wheel is a biased tire.

Figure 5:
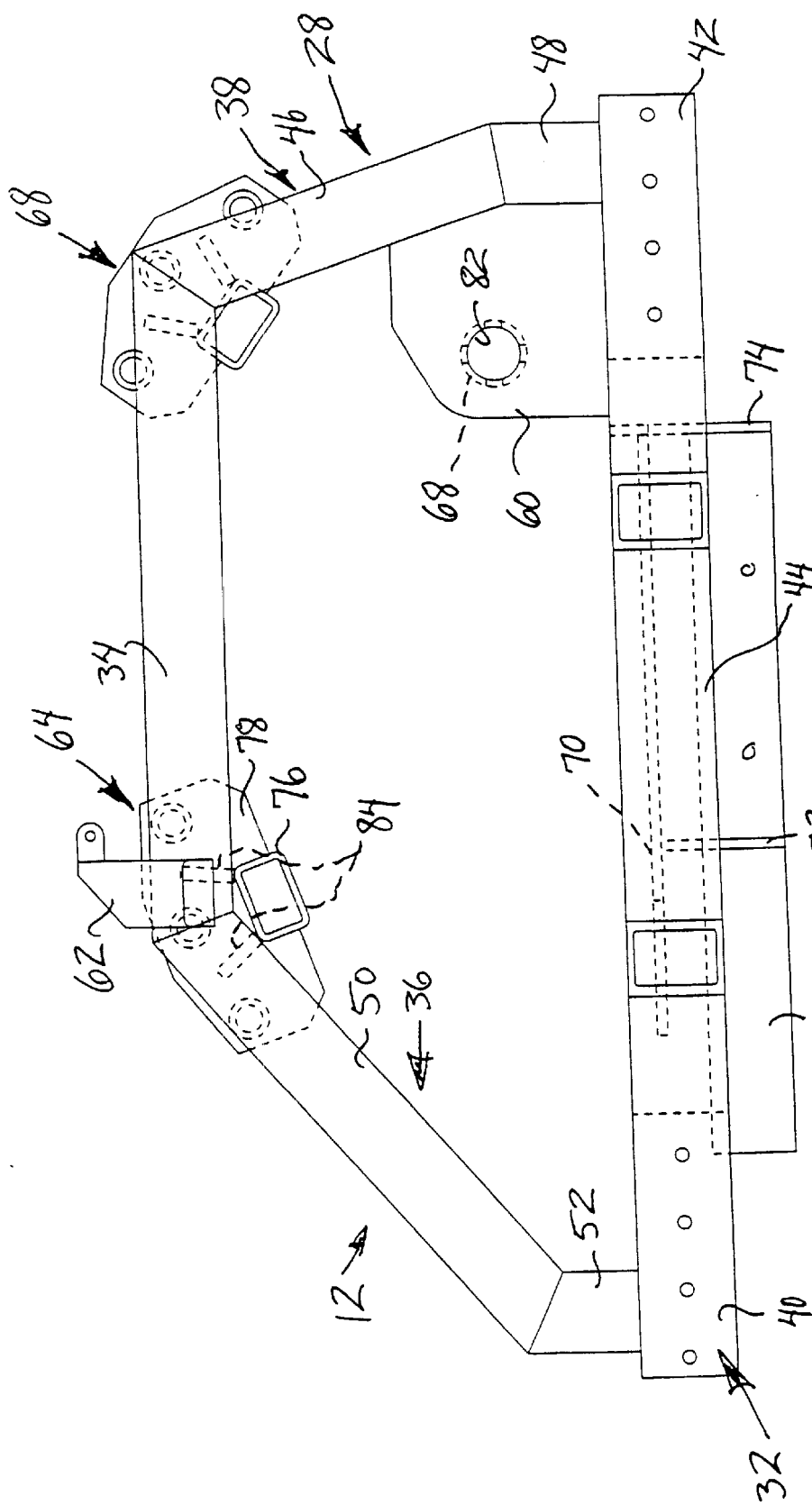
FIG. 5 is a side elevational view of the main frame.
Figure 6:
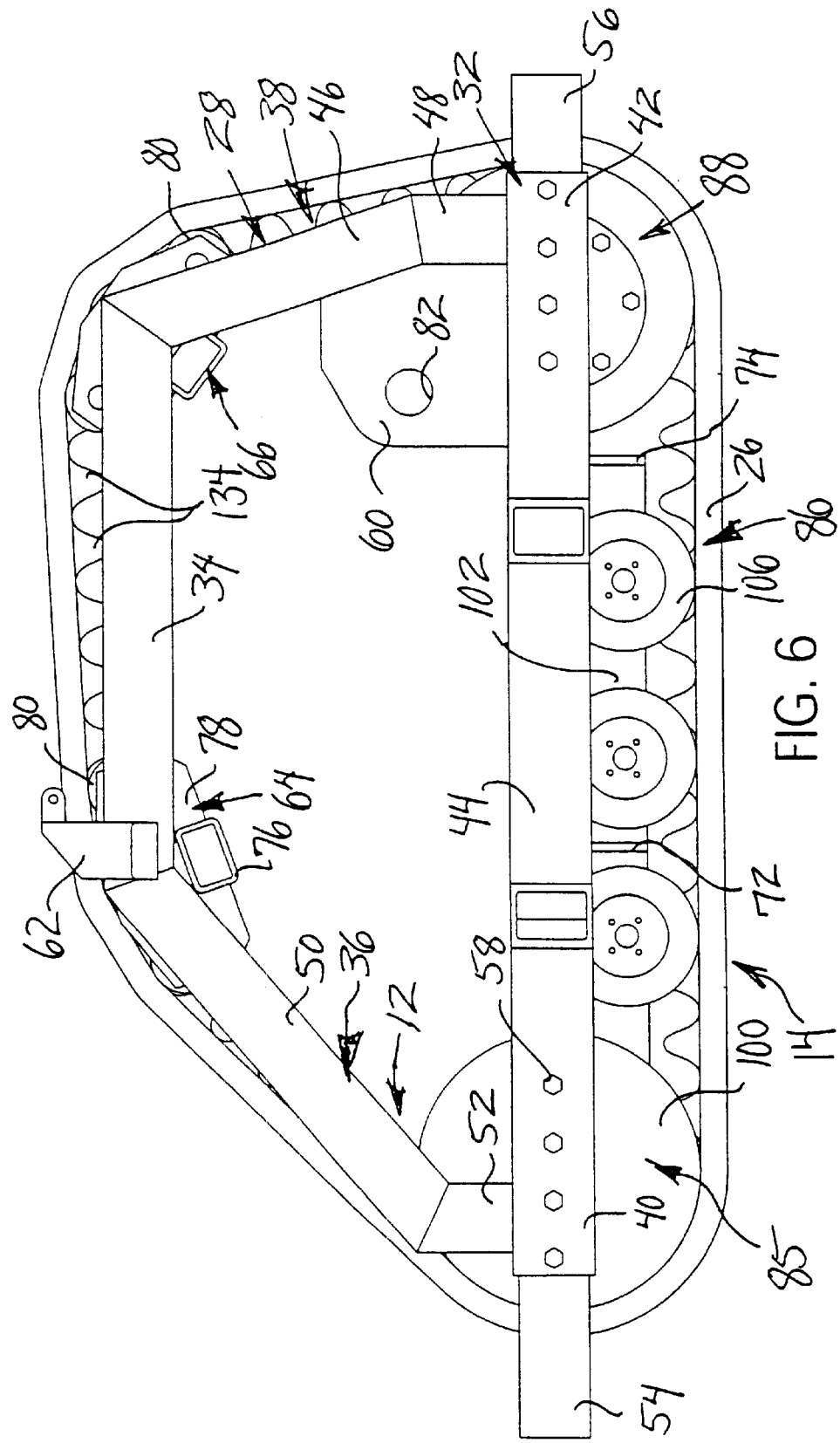
FIG. 6 is a view similar to FIG. 5 showing the drive track assembly and a pair of counterbalance members mounted on the main frame.
Figure 7:
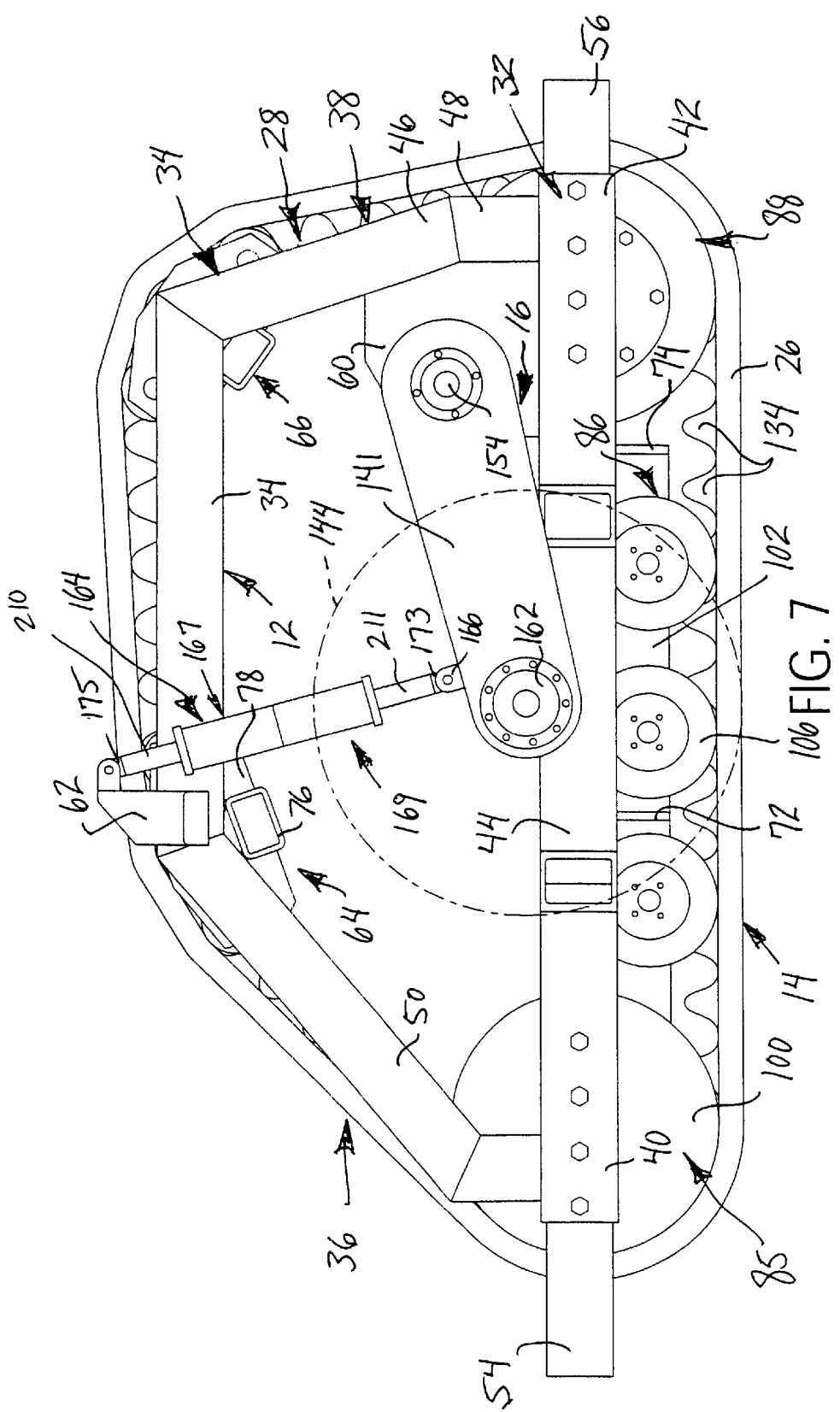
FIG. 7 is a view similar to FIG. 6 further showing a secondary driving assembly mounted on the vehicle with a wheel portion of the secondary driving assembly indicated by a dashed line.

FIGS. 5–9 show various stages of assembly of the vehicle 10 in side elevational view. FIG. 5 shows a side elevational view of the frame 12. FIG. 6 shows the track assembly 14 mounted on the mainframe 12. FIG. 7 shows the arm 141 and the associated suspension assembly 164 mounted on the frame 12 with a wheel of the secondary driving assembly 16 indicated with dotted lines. The forward and rearward counterbalance structures 54, 56 are shown mounted on the frame 12 in FIG. 6.

Figure 8:
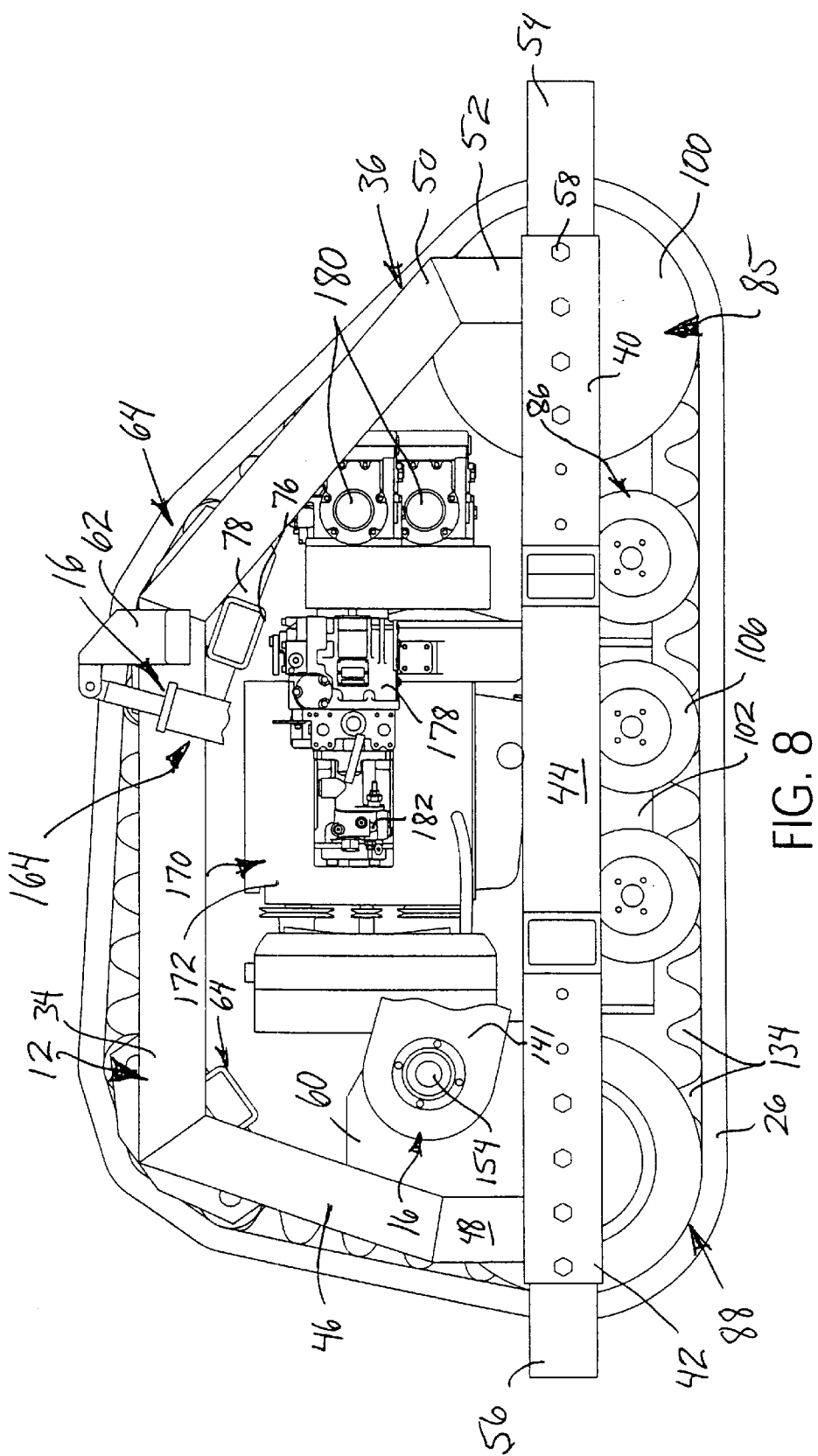
FIG. 8 is a view similar to FIG. 7 showing an engine assembly mounted on the vehicle and showing the secondary driving assembly in fragmentary view to more clearly illustrate the engine assembly.

As best seen in FIG. 8, an engine assembly 170 is mounted to the frame within the track envelope. The engine assembly 170 (and the associated hydraulic and control assemblies) is preferably as described below, but it is contemplated to use the engine assembly arrangement (and the associated hydraulic and control assemblies) disclosed in either the above-incorporated '921 patent or in the above-incorporated '748 patent.

The engine assembly 170 generally includes an internal combustion engine 172, a gear box transfer case 174 mounted to the internal combustion engine, and four hydraulic pumps mounted on the gear box 174. Preferably, the internal combustion engine 172 is a model TMD T27 Continental 80 horsepower diesel engine commercially available from Wisconsin Total Power Corporation of Memphis, Tenn. and the gear box 174 is model number P.O. GB-S1 commercially available from Superior Gearbox Co., P.O. Box 645, Stockton, Mo.

The diesel engine drives the four pumps. The IC engine 172, the gear box 174 and the four hydraulic pumps are shown in side elevational view in FIG. 8 (a portion of the secondary driving assembly 16 and of the associated suspension assembly 164 are broken away and not shown to more clearly show the engine assembly 170). The four pumps include: 1) a track drive pump 178, 2) a pair of a wheel drive pumps 180a, 180b and 3) and an implement pump 182. The gear box is bolted to the IC engine 172 and is operatively coupled to the engine 172 through a flex plate that drives the main gear in the gear box 174. Each pump 178, 180, 182 is bolted to the gear box 174 and is operatively connected to the gear box 174 through a splined coupling. There is a 1:1 gear ratio between all of the pumps 178, 180, 182 and the gear box 174.

It can be appreciated from FIG. 8 that one wheel pump 180a is mounted to the gear box 174 in line with the shaft of the engine 172 and that the other wheel pump 180b, the track pump 178 and the implement pump 182 are mounted in line with one another and generally parallel to the motor shaft of the engine 172. Both wheel pumps 180a, 180b and the track pump 178 are mounted directly to the gear box 174 and the implement pump 182 is "piggybacked" on the track pump 178.

Preferably the track pump 178 is a Sunstrand series 90 axial piston closed loop pump commercially available from the Sauer-Sunstrand Co. of Ames, Iowa, the wheel pumps 180 are Sunstrand series 42 axial piston closed loop pumps also commercially available from the Sauer-Sunstrand Co. and the implement pump 182 is a series 45 axial piston open circuit pump commercially available from the Sauer-Sunstrand Co.

The track pump 178 is fluidly communicated to the track operating motor 122 by a pair of hydraulic lines. Preferably the track operating motor 122 is a Model SE 90 Track Motor is commercially available from Sauer-Sunstrand Co. Each wheel pump 180 is fluidly communicated to a respective wheel motor 142 by a pair of hydraulic lines (not shown). Preferably each wheel operating motor 142 is a Model MMF-35 wheel drive motor commercially available from the Sauer-Sunstrand Co. In one preferred embodiment of the vehicle 10, each wheel pump and each track pump is a variable displacement pump and each associated motor is a variable displacement motor.

The implement pump 182 is operable to control any implements (not shown) mounted on the front or rear (or both) of the vehicle 10, to supply hydraulic oil to the piston assembly 114 to tension the track 26 and to operate the suspension assemblies 164 associated with the secondary driving assemblies 16 to control the suspension system in a manner described below.

Figure 10:
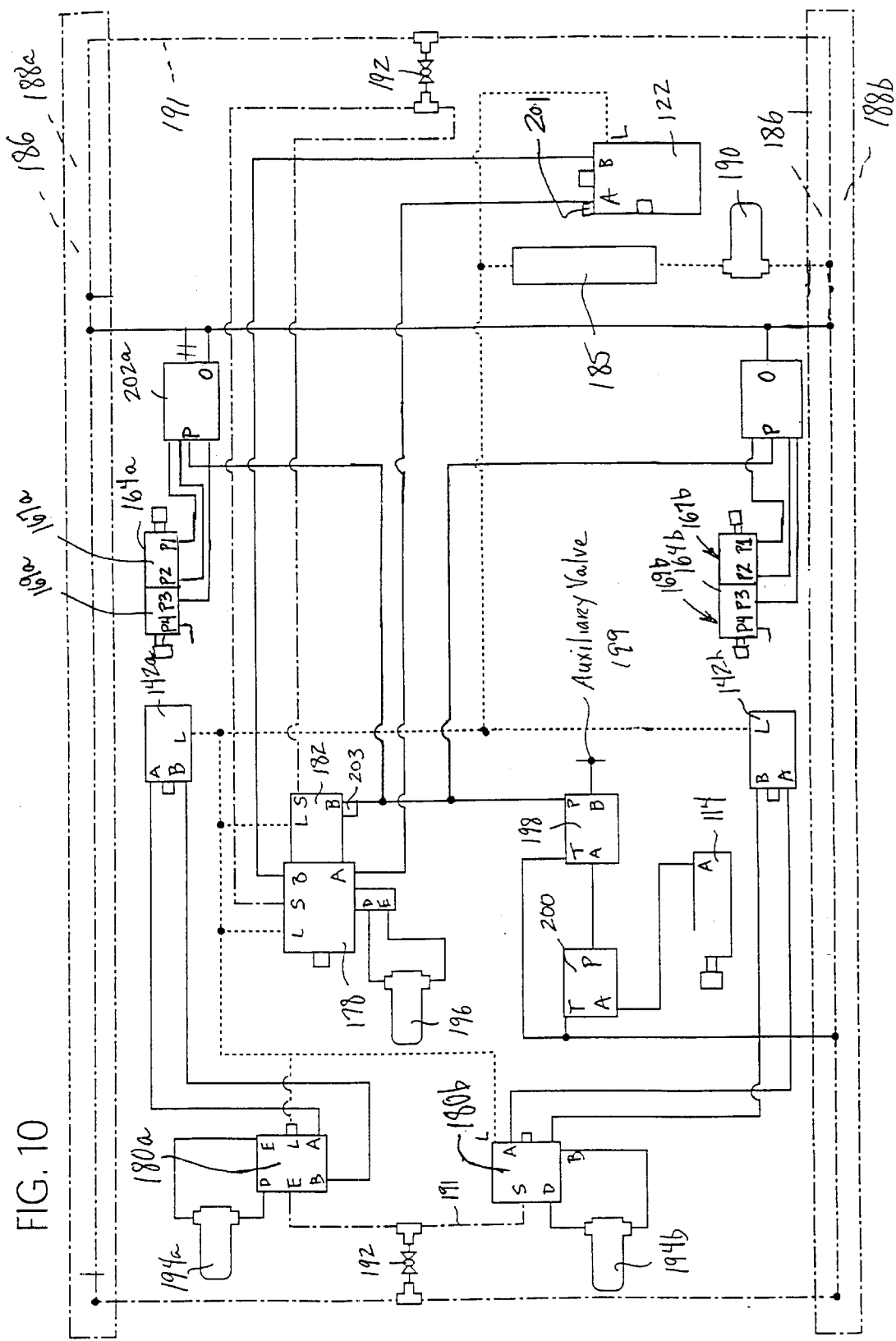
FIG. 10 is a schematic view of an exemplary hydraulic system for the vehicle.

To tension the track 26, the pump 182 acts through a pair of track tensioning valves (shown in schematic view in FIG. 10 and designated 198 and 200). One or both track tensioning valves 198, 200 are manually adjustable to set a predetermined base pressure that corresponds to the track tension desired. If an object of sufficient size gets between the track 26 and a wheel 80, 100, 106 or 128, the hydraulic pressure in the track tensioning cylinder 114 rises sufficiently above the base pressure to release fluid from the piston assembly 114, thereby allowing the track tensioning cylinder 114 to contract and the object to disengage from the track assembly 14. As soon as the object is out of the track assembly 14, the track tensioning cylinder 114 will expand until its internal pressure goes back to the predetermined base pressure level.

Figure 9:
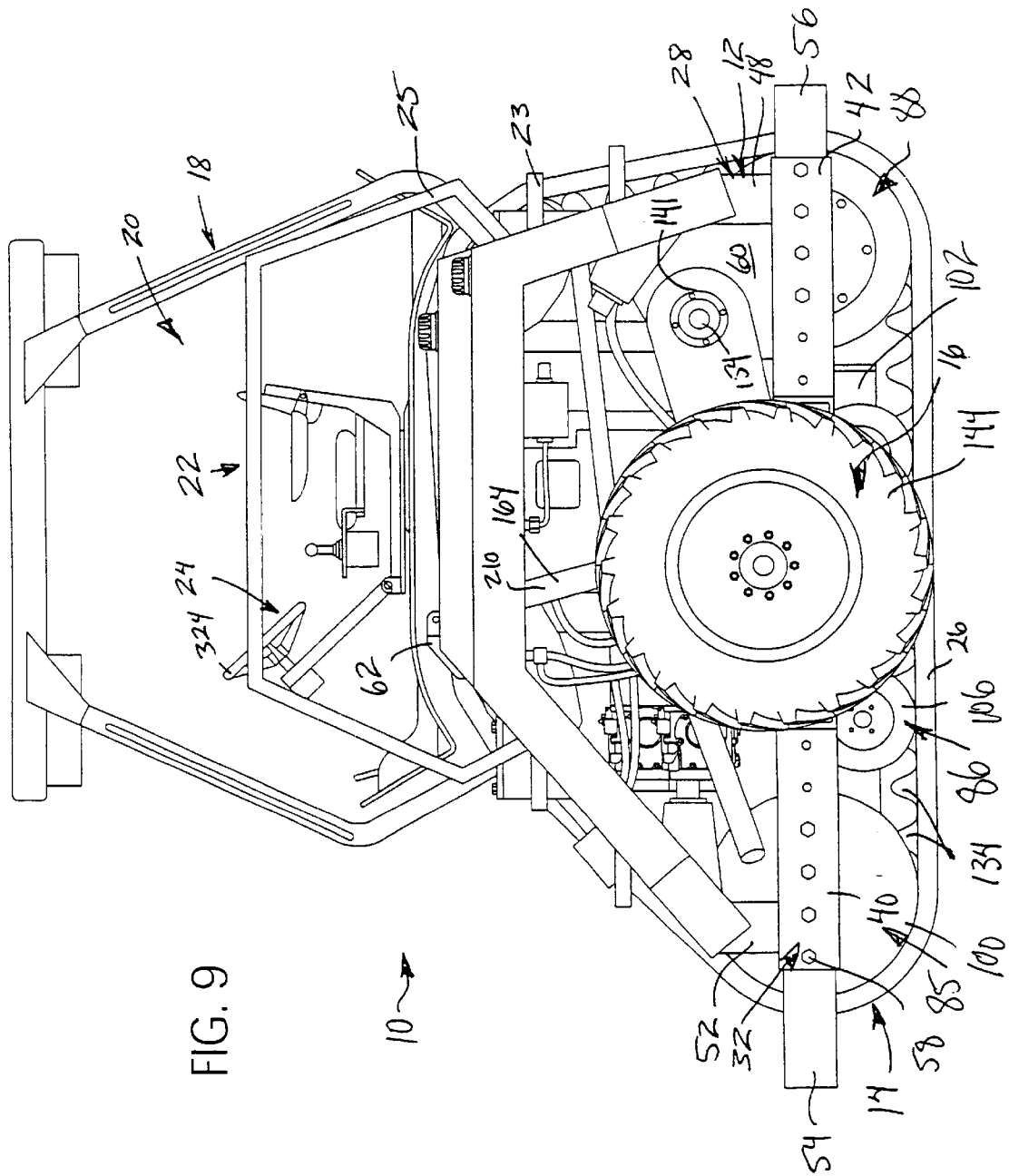
FIG. 9 is a side elevational view of the assembled vehicle showing a cab assembly mounted on the vehicle.

The engine 172 is mounted to the engine assembly support structure 70 of the main frame 12 by isolator and conical mounts (not shown). A radiator 184 and a hydraulic oil cooler 185 (shown, for example, in FIG. 8) are mounted within the envelope of the track 26 in fixed relation to the engine assembly support structure 70. As best seen in FIGS. 1 and 9, a tank assembly 186 is mounted on each side of the main frame 12. Each tank assembly 186 is made from welded rectangular tubing and has an inverted "U" shape. Each tank assembly 186 includes two separate compartments, one compartment being for hydraulic oil and the other compartment being for fuel oil. The two tank assemblies 186 together provide the exemplary vehicle 10 with a 60 gallon capacity for hydraulic oil (i.e., 30 gallons on each side) and a 30 gallon capacity for fuel oil (15 gallons on each side) which will run the vehicle 10 for approximately 12 hours.

Because of the high total hydraulic oil capacity provided by the two tank assemblies 186 relative to the number and size of the pumps 178, 180, 182 driven by the engine assembly 170, and because of the inverted U-shaped configuration of each tank assembly 186 (and therefore of each chamber within each tank assembly 186) which provides a high degree of surface area as compared to a single rectangular-shaped tank, the temperature of the hydraulic oil is not raised sufficiently by the heat generated during vehicle operation to require the hydraulic oil cooler 185 in many applications. Thus, the hydraulic oil cooler 185 is optional.

Each hydraulic oil-containing chamber in each tank assembly 186 includes at least three suction ports. A suction port is provided at or near the lowermost end of each leg portion of each inverted U-shaped chamber and in approximately the center of the bight portion of each chamber. The diesel fuel-containing chambers of the two tank assemblies 186 have a similar three port configuration. Corresponding suction ports on the pair of hydraulic oil chambers are connected together and to the suction side of each of the three pumps 178, 180, 182 through "T"-type connectors. Similarly, corresponding fuel ports on the pair of fuel oil chambers are connected together and to the fuel intake on the diesel engine 172 through "T"-type connectors. Because of the inverted U-shape of the fuel and oil chambers and because of the positioning of the paired tank assemblies 186 on each side of the engine assembly 170, and because the tank assemblies 186 on opposite sides of the vehicle are fluidly connected through "T" connectors, this assures that the engine 172 will receive diesel fuel and that all hydraulic pumps 178, 180, 182 will receive hydraulic oil regardless of the orientation of the vehicle 10 and regardless of the level of fuel or hydraulic oil in the tank assemblies 186.

As will become apparent, the hydraulic oil chambers act as a reservoir which supplies oil to the suction side of each hydraulic pump 178, 180, 182. The track pump 178 and each wheel pump 180 is fluidly communicated to an associated hydraulic motor 122, 142 and sends high pressure oil thereto. Hydraulic oil tank pressure is typically approximately 6–7 pounds. Each pump 178, 180 182 and each motor 122, 142 also has a case drain. Case drain pressure refers to a relieving of oil pressure inside each pump and inside each motor to protect the pumps and the motors from damage due to excessive fluid pressure. Each case drain from each pump and each motor returns oil to the tank assemblies 186.

A hydraulic schematic of a preferred hydraulic system for the vehicle 10 is shown in FIG. 10. Another preferred hydraulic system (including hydraulic schematics) suitable for use with the vehicle 10 of the present invention is shown and described in my '921 patent reference incorporated in its entirety above. Still another preferred hydraulic system (including hydraulic schematics) suitable for use with the vehicle 10 of the present invention is shown and described in my provisional patent application Serial No. 60/215,082 incorporated in its entirety above.

The two hydraulic oil compartments of the two tank assemblies 186 are shown in dashed lines in FIG. 10 and are designated 188*a* and 188*b* to indicate that these compartments are identical but are mounted on opposite sides of the frame 12. In the discussion of the vehicle 10 in general and of the hydraulic schematic in particular, identical components are indicated with identical reference numbers and distinguished from one another by the use of lowercase letters following the reference number. The hydraulic schematic shows the three driving pumps (i.e., the track pump 178 and the wheel pumps 180*a*, 180*b*) and shows the implement pump 182. Each hydraulic oil compartment 188*a*, 188*b* functions as a reservoir for the hydraulic system.

Generally, hydraulic oil flows through the suction lines 191 (indicated by broken lines) coming out of each of the tank compartments 188*a* and 188*b* and flows into the suction port "S" of each pump 178, 180*a*, 180*b*, 182. Each drive pump 178, 180*a*, 180*b* has a pair of outlet ports A and B that are fluidly communicated to inlet ports A and B on the associated drive motors 122, 142*a*, 142*b*. The B port on the implement pump 182 is connected to the pressure feed port P on control valve 198. The A port on the control valve 198 is fluid communicated to the pressure feed port P on the control valve 200. The B port on the control valve 198 is fluid communicated to an auxiliary valve 199 mounted on the exterior of the vehicle 10. The auxiliary valve 199 is provided for hydraulically powering implements mounted on the vehicle. The A port on the control valve 200 is fluid communicated to the track tensioning cylinder 114 to tension the track 26.

The B port on the implement pump 182 is also in fluid communication to an input port (the "P" ports) on each of a pair of manifold assemblies 202*a* and 202*b*. Each manifold assembly 202*a*, 202*b* is in controlled fluid communication with an associated suspension assembly 164*a*, 164*b*, respectively, (through ports P1, P2, and P3) to control fluid flow into and out of the associated assembly 164. The manifold assemblies 202 are described in detail below. An oil output port O on each manifold assembly 202*a*, 202*b* is fluid communicated with both tanks 188*a*, 188*b* through "T" connectors to allow hydraulic fluid leaving the manifold assemblies 202*a*, 202*b* to return to the tanks.

A plurality of valves (not shown in FIG. 10) are mounted in each manifold assembly 202*a*, 202*b* to control the associated hydraulic assembly 164*a*, 164*b* and thereby control the vertical movement of the associated flanking wheel (the valves and the wheels are not shown in FIG. 10). The hydraulic valves in each manifold assembly 202*a*, 202*b* are described in detail below when the suspension assemblies 164 are described.

Each pump 178, 180*a*, 180*b*, 182 and each motor 122, 142*a*, 142*b* has a case drain port "L" that drains through the oil cooler 185 (optionally) and then through an oil filter 190 and back to the compartments 188*a*, 188*b*. A ball valve 192 is connected between suction lines on each side of the schematic. An oil filter 194*a*, 194*b* is associated with each pump 180*a*, 180*b* and an oil filter 196 is connected to the pumps 178, 182.

The spring applied, pressure released brake 201 (shown schematically in FIG. 10 as a block operatively associated with the track motor 122) is mounted in the track planetary gear assembly and is operatively connected with the hydraulic pump 182. The brake 201 is applied to lock the drive wheel 128 when hydraulic pressure drops below a predetermined level to prevent rotation of the drive wheel 128 and thereby prevent the vehicle 10 from moving. The brake is released from breaking engagement with the drive wheel 128 by application of a predetermined level of hydraulic pressure which is normally in the line. A 12 volt on/off solenoid valve 203 is tied into the pump circuit for pump 182 as shown in FIG. 10 and is operable to either set or release the brake 201 when the engine 172 is running. An on/off switch that controls the on/off solenoid valve 203 to set and release the brake 201 is mounted in the vehicle cockpit 20, preferably on a side of an FNR (forward/neutral/reverse control mechanism, as explained below) speed control lever mounted in the cockpit.

The pair of control valves 198, 200 are operatively connected between the pump 182 and the track tensioner cylinder 114. Preferably the control valve 198 is a FV-4544 control valve and preferably the control valve 200 is a FV-4553 control valve.

One skilled in the art will appreciate that the hydraulic system shown in FIG. 10 eliminates the use of directional valves because the three track and wheel pumps 178, 180a, 180b, respectively, can provide fluid flow in two directions by reversing the direction of operation of a swash plate (not shown) within each pump and thereby change the direction of fluid flow to each motor (i.e., into either the A or B port). By changing the direction of fluid flow, each motor 122, 142a, 142b can be run in forward or reverse directions to, for example, run the track and wheels in forward or reverse directions or to counter rotate the wheels.

Figure 11:
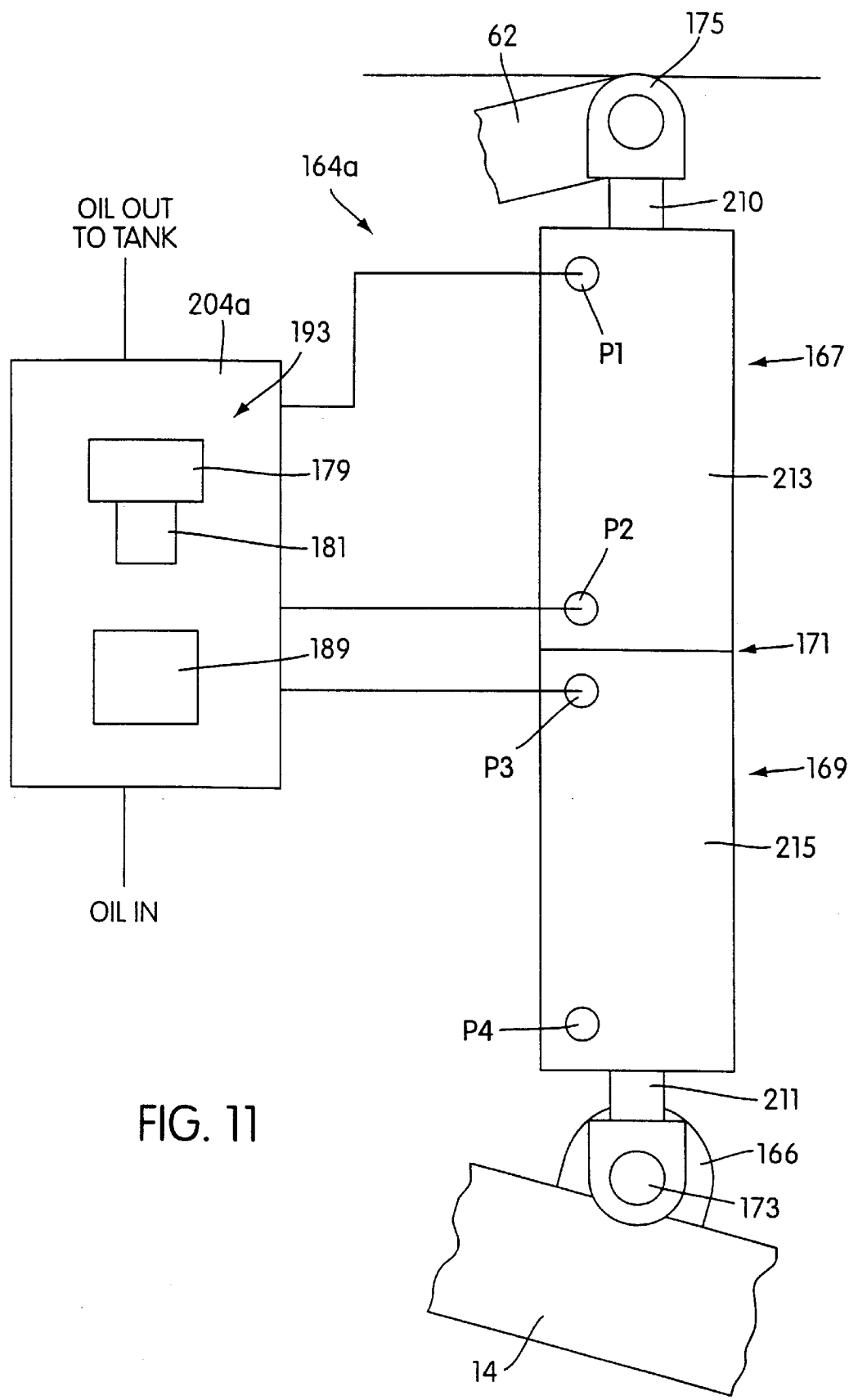
FIG. 11 shows a schematic view of a suspension assembly and a manifold assembly in isolation.

A suspension assembly 164a and the associated manifold assembly 202a are shown schematically in isolation in FIG. 11. The suspension assembly 164b and manifold assembly 202b can be understood from the discussion assemblies 164a and 202a. The suspension assembly 164a is a "double" suspension assembly constructed from two 6-inch stroke cylinders, 167, 169. The piston side mounting end of each cylinder 167, 169 have been removed and the two suspension cylinders 167, 169 welded together end-to-end at welded connection 171. The two suspension cylinders 167, 169 are hydraulically separate from one another as by a wall not shown, but are each hydraulically connected to the same hydraulic system. The bracket 173 on the rod of the suspension cylinder 169 is pivotally connected to the bracket 166 on the arm 141. The bracket 175 on the rod of suspension cylinder 167 is pivotally connected to the bracket 62 on the frame 34 of the vehicle 10. As will become apparent, the suspension cylinder 167 is manually controlled by a vehicle operator using an on/off closed center valve. The suspension cylinder 167 is used as a double acting cylinder with hold valve and a counterbalance valve. The suspension cylinder 169 is controlled by an electronic controller of an electronic control system described below. The cylinder 169 is used as a single acting cylinder. As described below, a Parker DFT proportional directional control valve controlled by the electronic control system causes hydraulic fluid to flow into and out of a port P3 (see FIGS. 10 and 11) on the piston side of the cylinder 169. A rod side port P4 on the cylinder 169 is vented to atmosphere. Each suspension cylinder 167, 169 has a 3.5 inch bore, a 1.75 inch rod diameter and a 6 inch stroke. Only four inches of the 6 inch stroke of the double acting cylinder 167 is utilized. Six inches of the stroke is utilized on the single acting cylinder 169.

As will become apparent, the suspension assembly 164a is in effect a single hydraulic cylinder that is comprised of two separate and independently controllable cylinders 167, 169. Preferably one of the cylinders (the upper cylinder 167 in this example) is manually controlled for manual positioning and holding of the associated wheel relative to the frame, and the other of the cylinders (the lower cylinder 169 in this example) is controlled by the electronic controller. Generally, each upper cylinder 167 is manually controlled and is adjusted at the operator's discretion. The manually controlled portion 167 of the suspension assembly 164a enables the vehicle operator to control the suspension assembly 164 to respond to changing ground conditions, to transfer weight between the track and the flanking wheels as desired and to adjust the lateral angular position of the vehicle relative to the ground surface. As explained below, the electronic control system utilizes pressure feedback data (from a pressure transducer on the piston side of the cylinder 169), lateral tilting feedback data (from a tilt switch mounted on the frame of the vehicle) and steering wheel position feedback data (generated from a steering input device) to control the lower cylinders 169 of the suspension assemblies 164a, 164b to effect computer-controlled vehicle leveling, wheel ground-following movement and shifting of the vehicle weight between the central track to the flanking wheels during a vehicle turning operation. Before this is considered in detail, however, further details of the suspension assembly 164a and the associated manifold assembly 202a will be considered.

Fluid flow into and out of the manually controlled cylinder 167 is controlled by valve assembly 193. The valve assembly 193 is comprised of a solenoid operated non-proportional closed center valve 179 (shown schematically in FIG. 11) preferably manufactured by the Sterling Co. and a pilot operated counter balance valve 181 (shown schematically in FIG. 11) preferably manufactured by the Command Control company. The valves 179, 181 are controlled by a three position toggle switch 197 the is mounted within the cockpit. By controlling the valve assembly 193 using the toggle switch 197, the operator can manually control the operation of the cylinder 167. The three position toggle switch has a spring return to center feature. The three positions will be referred to as the "up", "down" and "center" positions for convenience. When the switch is moved to its up position, valves 179, 181 cause fluid to flow into the piston side and out of the rod side of suspension cylinder 167 through ports P1, P2, respectively. This causes the suspension assembly 164 to elongate, thereby moving the associated wheel vertically downwardly relative to the frame of the vehicle. When the switch is released, it is spring biased into its center position. This center switch position holds the suspension assembly 164a and the associated wheel 144 in its hydraulically adjusted position.

The DFT proportional directional control valve 189 (shown schematically in FIG. 11) is operated by the electronic control system to cause fluid to flow into or out of the port P3 on the suspension cylinder 169 of the suspension assembly 164. The solenoid operated non-proportional closed center valve 179, the pilot operated counter balance valve 181 and the proportional directional control valve 189 are all incorporated into a specially constructed manifold 191 of the manifold assembly 204a. The manifold assembly 204a has channeling and ports (not shown) for the valves 179, 181, 189.

Vehicle Control System

Propulsion of the vehicle in forward and reverse directions is accomplished by driving the track 26 and the wheels 144. The track 26 provides the main driving power. The wheels 144 help stabilize the vehicle 10 and wheel rotation imparts force to the vehicle 10 to supplement the main driving power of the track assembly 14. The wheels 144 also steer the vehicle 10. Steering is preferably accomplished by differential rotation of the wheels 144. During a steering operation, the wheels 144 can also be operated to assume a greater portion of the vehicle load to reduce track 26 ground pressure. Steering can be accomplished by rotating one wheel 144 at a faster rate than the other wheel 144 (i.e., through differential wheel speed) or by counter-rotating the wheels 144 at equal or unequal speeds while the track 26 is either driven or free-wheeling. It is also contemplated to steer the vehicle 10 by driving one wheel 144 while the opposite wheel 144 is idle and while the track 26 is idle or driven.

Generally, the steering system functions to control the amount of pressurized fluid flow into the hydraulic motors 142 that drive the wheels 144 in response to an operator-initiated input signal from a steering input device such as a rotary potentiometer-type steering wheel. By controlling the amount of pressurized fluid flowing to the hydraulic motors 142, the steering system controls the amount of force imparted to the vehicle 10 by each wheel 144 and hence controls the vehicle's turning movements. The hydraulic assemblies 164 of the secondary driving assemblies 16 utilize pressurized fluid supplied from the hydraulic pumps of the engine assembly and are operable to vertically move the wheels 144 with respect to the track assembly 14 and thereby control the amount of pressure applied by each wheel 144 to the ground. By vertically moving the wheels 144, it can be ensured that all of the vehicle's 10 tractive forces are applied to the ground, even when driving over uneven terrain.

Various operator controls are provided in the cockpit 20 to control the vehicle 10. Generally, input signals from the various controls are electrically communicated to a programmable electronic controller which in turn controls the vertical position and rotational speed of the wheels 144, the track 26 speed, wheel differential speed or counter rotation and hydraulic pressure in each suspension assembly 164. Preferably, implements (not shown) mounted on the vehicle 10 are manually controlled, although various degrees of computerized control of implements are contemplated.

The exemplary vehicle 10 weighs approximately 11,000 pounds (without implements), has a lateral track 26 width of 16 inches and has an outside-to-outside lateral distance between the wheels 144 of approximately 80 inches. The diesel engine is 80 horsepower. The components of the vehicle 10 can be used with an internal combustion engine 172 that is up to 175 horsepower. The size, weight, and power of the vehicle 10 makes the vehicle useful for a wide range of applications.

Generally, to operate the vehicle 10, the internal combustion engine 172 is started to power the pumps 178, 180, 182. The engine 172 operating speed can vary (based on operator input), but in normal operation the engine 172 will run at a predetermined high idle rate. For example, the engine 172 typically operates at 3,000 rpm.

Preferably, each pump 178, 180, 182 is an axial piston variable displacement pump of cradle swash plate design. Each pump 178, 180, 182 converts an input torque from the internal combustion engine 172 into hydraulic power. The high pressure fluid is then ported out either the A port or the B port of the associated pump 178, 180 or 182 to provide power to the associated motors 122, 144.

The swash plate angle can be varied by a control piston. Changing the swash plate angle varies the displacement of fluid per revolution of the input shaft of the pump. A larger angle causes greater displacement which yields greater output torque for the given input. A smaller angle reduces the displacement per revolution and yields greater speed for a given input. The swash plate can be angularly adjusted to achieve this variable fluid flow outwardly from either the A or the B port. Thus, the swash plate can be angularly adjusted to adjust the volume, pressure and direction of hydraulic fluid flow out of pump 178, 180, 182. Either the A line or the B line can be pressurized to make the associated motor 122 or 142 go forward or in reverse.

Each hydraulic motor 122, 142 converts an input hydraulic power into an output torque. The output torque from the motor 122, 142 rotates the associated flanking wheel 144 or track wheel 128. Preferably, each pump 178, 180 and each motor 122, 142 is a variable displacement device. Alternatively, each pump 178, 180 can be variable displacement device and each associated motor 122, 142 can be a fixed displacement device or, alternatively, a two-speed device.

When a pump 178, 180 or 182 is idle, it is referred to as being "destroked". Each pump 178, 180, 182 is normally de-stroked. Each pump 178, 180, 182 includes an electric displacement control (EDC) that causes tilting of the swash plate in response to an electrical input signal, thus varying the pump's displacement from full displacement in one direction through a neutral (i.e., idle) swash plate position to full displacement in the opposite direction. The electrical input signal can be, for example, a DC voltage or a current. The electrical input control signal to a particular pump 178, 180, 182 is generated by a suitably programmed and properly interfaced electronic controller. As explained in greater detail below, the electronic controller generates a pump input signal in response to an input signal the controller receives from an input device controlled by the vehicle operator or in response to a feedback signal communicated to the electronic controller from a controlled device. In response to the pump input signal sent by the electronic controller, each EDC controls the direction, the flow and the pressure of the hydraulic fluid coming out of the associated hydraulic pump 178, 180, 182 and thereby controls motor speed, direction of travel, and so on.

Each wheel motor 180 and the track drive motor 178 includes a speed sensor. Hydraulic motors that include speed sensors are readily commercially available. Each speed sensor detects rotational movement of a magnetic ring wrapped around the motor cylinder and generates a feedback signal that is transmitted to the electronic controller. The speed feedback signal is generally comprised of a series of pulses that are counted by the controller so that the rotational speed of the shaft (in rpm) can be measured. The electronic controller can be programmed to use the rotational speed of each motor shaft to calculate the rotational speed of the associated wheel 144 or track 26.

The suspension assemblies 164 function to move the wheels 144 vertically with respect to the frame of the vehicle 10. The suspension assemblies 164 can be operated to move the wheels together or independently of one another. Operation of the suspension assemblies 164 is preferably controlled by the electronic controller based on 1) pressure feedback data electrically communicated to the electronic controller by pressure transducers in the suspension assemblies 164, 2) steering input device position information and 3) tilt switch information. The suspension assemblies 164 can also optionally be controlled individually or together directly by the vehicle operator using manual controls in the cockpit. As will become apparent, preferably each suspension assembly 164 is controlled by a combination of manual control (of the upper suspension cylinder portion 167) and computer control (of the lower suspension cylinder portion 169).

Generally, the vehicle 10 is operated with a predetermined operator-selected ground bearing or "baseline" pressure established in one or both suspension assemblies 164. The suspension assemblies 164 are thus operable to ensure that the wheels 144 engage and follow the ground with a predetermined baseline pressure, even if the ground contour is uneven. More specifically, the DFT proportional directional control valves 189 are electrically controllable to maintain the baseline operating pressure in one (or both) of the suspension assemblies 164 (as explained below), thereby ensuring continuous ground engagement by one (or both) wheel(s) 144 during straight forward and reverse vehicle movement.

The suspension assemblies 164 can also be operated to vary the portion of the vehicle weight borne by the wheels 144 relative to the track 26, particularly during vehicle turning operations. As discussed below, it is contemplated to electrically control each DFT proportional directional control valve 189 such that the hydraulic pressure of one or both suspension assemblies 164 (and thus the ground bearing pressure of the associated wheel) increases above baseline pressure level by an amount dependent on the magnitude of a steering input signal electrically communicated to the electronic controller. Each suspension assembly 164 includes a pair of piston rods 210, 211 (see FIG. 11, for example) mounted for movement in and out of an associated cylinder wall 213, 215, respectively. A piston (not shown) is movably mounted within each cylinder wall 213, 215 and each is fixedly mounted to an end of the associated piston rod 210, 211, respectively. Each piston divides the interior of the associated cylinder wall 213, 215 into two chambers. These two chambers are called the "rod side chamber" and the "piston side chamber" of each cylinder 167, 169. There is no rod in the piston side chamber of the cylinder and hence, these piston side chambers are the load bearing chambers of the suspension assembly 164.

Hydraulic fluid is disposed on both the rod and piston side chambers of the upper suspension cylinder 167, but hydraulic fluid is disposed only on the piston side of the lower suspension cylinder 169. The DFT proportional directional control valve 189 associated with each suspension assembly 164, for example, causes fluid to flow into and out of the port P3 communicating with the piston side chamber of the lower suspension cylinder 169. This can be done to extend or retract the piston rod 211 and thereby vertically raise or lower the associated wheel 144 (with respect to the main frame) to increase or decrease, respectively, the portion of the weight of the vehicle 10 borne by that wheel, and therefore, also the proportion of the vehicle weight borne by the operative flight of the track 26. The hydraulic fluid flow into and out of the port P3 of each suspension assembly 164 can be controlled by the electronic controller to assure that the preselected baseline pressure is maintained in each of the suspension assemblies 164 to provide ground-following action of the wheels 144 with respect to the ground surface during vehicle movement.

As mentioned, the electronic controller controls operation of the lower suspension cylinder 169 of each suspension assembly 164 using feedback from the associated pressure transducers. A pressure transducer is disposed on the piston side of the lower cylinder 169 of each suspension assembly 164. Preferably a baseline hydraulic pressure within each suspension assembly 164 is set by the operator prior to commencing work. Preferably a default baseline pressure (such as 800 pounds of hydraulic pressure) is established in each suspension assembly 164 when the vehicle is started. The baseline pressure can be set any of a range of values, however, by the operator depending on many factors, including ground conditions (soil type, etc.) and weather conditions. Establishing a baseline pressure of 800 pounds in a suspension assembly 164 means that the electronic controller will ordinarily operate the associated DFT proportional directional control valve 189 utilizing a feedback from the associated pressure transducer to maintain 800 pounds in both suspension assemblies 164. It can be appreciated that as the vehicle 10 moves along the ground, the ground contour causes the pressure in each lower cylinder 169 to fluctuate. For example, if the vehicle 10 is moving forwardly along a ground surface and the wheels 144 encounter a depression in the ground, the wheels would be momentarily suspended over the depression.

As a result, the fluid pressure in each lower cylinder 169 would decrease below baseline pressure. The pressure transducer detects the pressure decrease on the piston sides and sends a feedback signal indicating this change in fluid pressure to the electronic controller.

More specifically, each DFT proportional directional control valve 189 functions such that when no control voltage is sent to the valve, the rod 211 of the lower cylinder 169 remains in a fixed position relative to the piston 215. When a control voltage is communicated to a DFT proportional directional control valve 189 from the electronic controller, the valve 189 is actuated, thereby causing hydraulic fluid to flow into the associated port P3 of the lower cylinder. Preferably, the amount of fluid flowing through the DFT proportional directional control valve 189 is proportional to the level of the control voltage communicated to the valve 189 by the electronic controller.

The exemplary DFT directional proportional valve 189 is thus actuated by a control voltage. The magnitude and/or the sign (positive or negative) of the control voltage determines the rate and the direction of fluid flow through the valve into or out of the lower cylinder 169 of the suspension assembly 164. The flow rate is thus directly proportional to the control voltage.

The controller 250 continuously monitors the feedback signal from the pressure transducer and signals the valve 189 to stop fluid flow when the baseline pressure is re-establish on the piston side of the lower cylinder 169.

Figure 12:
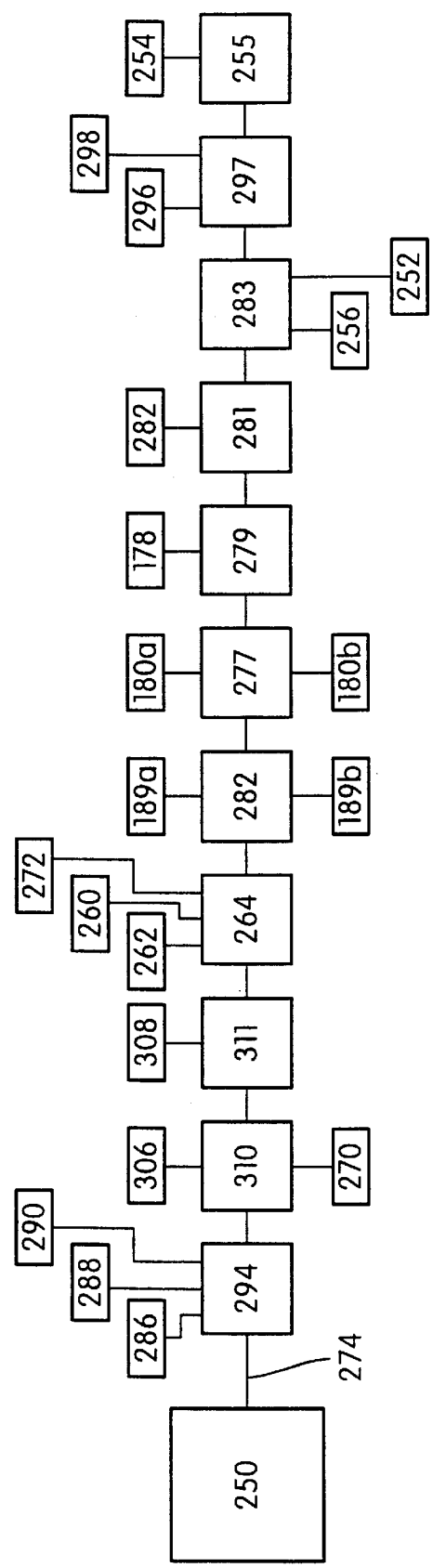
FIG. 12 is a schematic view of an exemplary electronic control system for the vehicle.

A schematic diagram of an exemplary electronic control system for the vehicle 10 is shown in FIG. 12. FIG. 12 shows an electronic controller 250 with a plurality of devices electrically communicated to the controller 250. These devices include the operator-controlled input devices mounted in the cockpit 20 (for controlling the motor and wheel pumps 178, 180, for example) and various feedback devices communicated to the controller 250 (for indicating wheel speed, track speed, suspension assembly pressure and lateral tilt, for example).

The operator-controlled input devices electrically communicated to the controller 250 include a speed signal input device 252 for inputting an operator selected forward or reverse vehicle speed. Preferably, the speed signal input device 252 is provide by a joystick-type potentiometer referred to as a "forward-neutral-reverse lever" (or "FNR lever"). The speed signal input device 252 could also be, for example, a foot-controlled accelerator pedal-type potentiometer, or any other suitable device. The input speed signal is sent from the input device 252 to the electronic controller 250 through an interface 283 which is connects the device 252 to a bus 274.

A steering signal input device 254 for affecting differential speed or counter rotation of the flanking wheels 144 is electrically communicated to the bus 274 utilizing bus interface 255. Preferably, the steering signal input device 254 is a rotary potentiometer-type steering wheel, but could also be a joystick-type potentiometer or other suitable device. It can be appreciated that the speed and steering input devices 252, 254 can be realized by two separate devices as in the exemplary embodiment or, alternatively, by a single device, such as a 3-axis joystick, in other embodiments of the vehicle.

Other operator-controlled input devices include an inch-brake 256 which is communicated to the bus 274 through interface 283. The inchbrake 256 is preferably in the form of a foot pedal-type potentiometer electrically communicated to the controller 250 to progressively slow the pumps 178, 180 in a manner described below to limit vehicle speed.

A plurality of switches are mounted within the cockpit. An increase pressure setpoint switch 258, a decrease pressure setpoint switch 260, neutral switch 262 and a control reversal switch 272 are mounted in the cockpit and are each communicated to the bus 274 through interface 264. Preferably the neutral switch 262 is mounted on the FNR lever 252. The operation of switches 258, 260, 262 and 272 are described below. The cockpit 20 also includes a work mode/travel mode switch 270

The electronic controller 250 also communicates with a plurality of output and feedback devices through the bus 274. The right and left wheel pumps 180a, 180b are interfaced to the bus 274 by interface 277. The track pump 178 is interfaced to the bus 274 by interface 279. The electronic controller 250 controls the right wheel pump 180a, the track pump 178 and the left wheel pump 180b by sending control signals to pump interfaces 277, 279, which, in response, communicate pump-controlling signals to the respective pump EDC's.

The valves 189a, 189b are communicated to the bus 274 through interface 282. The electronic controller 250 controls the operation of the right suspension cylinder valve 189a and the left suspension cylinder valve 189b by sending control signals to a valve controllers 282, 284, respectively. The electronic controller 250 receives track speed, right wheel speed and left wheel speed feedback signals from, respectively, the track speed sensor 286, the right wheel speed sensor 288 and the left wheel speed sensor 290. The speed sensors 286, 288, 290 interface with the bus 274 through interface 294.

The hydraulic pressures in the lower right and left suspension cylinders are electrically communicated to the electronic controller 250 through a right pressure transducer 296 and a left pressure transducer 298, respectively. The pressure transducers are interfaced with the bus 274 through interface 297.

Preferably a tilt switch 306 is mounted on the vehicle 10 to detect lateral vehicle tilt from horizontal. The tilt switch 306 is interfaced to the bus 274 by interface 310. An audible backup warning indicator 308 communicates with the controller 250 through an interface 311.

In the preferred embodiment of the vehicle, the control system including the electronic controller 250 and the interfaces are provided by an Opto 22 control system commercially available from the Opto 22 Company, 43,044 Business Park Drive, Temecula, Calif. 92590-3614. The electronic controller 250 is a preferably a SNAP Analog/Digital Brain Mistic/Optomux Controller (available from Opto 22 as item number B3000) and is communicated to a 12-module Rack unit (available from Opto 22 as item number SNAP-B12MC-P). The Opto 22 controller accepts inputs and sends outputs through a plurality of interfaces (referred to as "modules" by Opto 22) mounted in the rack unit. Preferably interface 294 is an Opto 22 IDC5-FAST module, interfaces 310, 264 are Opto 22 IDC5 module, interface 311 is an Opto 22 IDC5R module, interface 282 is an Opto 22 AOV-27 module, interface 283, 297 and 255 are Opto 22 AIV modules, and interface 281 is an Opto 22 AIV module. Preferably interface 277 is provided by an Opto 22 AOV-27 module and two Parker Drive Cards, Model Number 8D101-24 commercially available from the Parker Company. Each drive card is connected between the AOV-27 module and the associated wheel pump 180a, 180b. Preferably interface 279 is provided by an Opto 22 AOV-27 module and a Parker Drive Cards, Model Number 8D101-24. The drive card is connected between the AOV-27 module and the track pump 178.

Vehicle Operation

The single track and two flanking wheel design of the vehicle 10 provides the advantages of both wheel- and track-driven vehicles making the vehicle 10 useful for a wide range on applications in a wide range of working environments. The electronic controller 250 assisted operation of the vehicle 10 simplifies vehicle operation from the point of view of the vehicle operator while increasing vehicle functionality and vehicle responsiveness to various working environments.

Generally, movement of the speed input device 252 from its neutral position to a forward speed-indicating position transmits a speed input signal (such as a control voltage) to the electronic controller 250. The electronic controller 250 in response generates appropriate output control signals to the interfaces 277, 279. The interfaces 277, 279 in response, send the proportional voltages to the EDC's of the three pumps 178, 180.

The pumps 178, 180a, 180b respond by commencing hydraulic fluid flow in a forward-motor causing direction. This fluid flow results in the turning of the track 26 and wheels 144, respectively, at essentially the same moment and reach their maximum commanded speeds at essentially the same time when no steering input signal is commanded during this speed control operation. When the speed input device 252 (i.e., the forward-neutral-reverse lever) is in its neutral position, the device 252 communicates to the controller 250 an appropriate input signal to cause the electronic controller 250 to de-stroke the wheel and track motor pumps 180, 178. Reverse motion of the vehicle 10 is accomplished in the reverse manner.

Steering of the exemplary vehicle 10 is accomplished through differential speed rotation of the wheels 144. During a steering operation, the track 26 skids laterally along the ground surface. Because the wheels 144 are in flanking relation to the track 26 and because the wheels 144 are generally vertically movable (along a slightly arcuate path defined by the pivotal movement of the arms 141 about the spindles 150) with respect to the track 26, the suspension assemblies 164 can be operated to change the portion or fraction of the vehicle 10 weight that is borne by the wheels 144 relative to the portion of the vehicle weight that is borne by the track 26. Moving the wheels vertically downwardly against the ground, for example, increases the ground bearing pressure of the wheels 144 and decreases the ground bearing pressure of the track 26.

Generally, the electronic controller 250, in response to a left or right steering input signal from the steering input device 254 1) causes differential wheel rotation to turn the vehicle 10 and 2) increases suspension pressure to shift the vehicle weight from the track 26 to the wheels 144 during the turning operation. During a turn, the speed of the "outside" wheel (i.e., the wheel on the opposite side from the turning direction) is increased by an amount that is roughly proportional to the percentage the steering wheel is moved from neutral in a turning direction and the speed of the "inside" wheel (i.e., the wheel on the same side as the turning direction) is decreased by an amount that is roughly proportional to the same percentage. The wheel speeds are changed by the action of the controller 250 causing voltages to be sent to the respective wheel pump EDC's that proportionally increase or decrease the pump outputs. In one preferred embodiment, the electronic controller 250 is programmed to control the track and wheel speeds during a turning operation such that the track 26 speed is approximately equal to the average of the differential wheel 144 speeds. The controller 250 can be programmed to cause the hydraulic pressures in both suspension assemblies 164 to increase above baseline (i.e., normal or selected operating) pressure by a percentage that is approximately equal to the percentage of the movement of the steering wheel in a turning direction from neutral. This increase of suspension assembly 164 pressure shifts the vehicle weight or ground bearing pressure from the track 26 to the wheels 144. When the steering wheel is returned to its neutral position after completion of the turn, the controller 250 causes the suspension assembly 164 pressure to go back to baseline pressure (thereby causing a portion of the vehicle weight to shift from the wheels 144 back to the track 26) and causes the wheels 144 to return to their pre-turn speed.

This shifting of the ground bearing pressure between the track 26 and wheels 144 by adjusting suspension assembly 164 pressure is referred to as "shifting of the proportional load" of the track 26 and wheels 144. This shifting of the proportional load between the track and wheels is controlled by varying the pressure within the wheel suspension assemblies 164. Proportional load shifting from the track 26 to the wheels 144 during a turn, for example, increases wheel ground bearing pressure which increases vehicle stability and maneuverability and decreases track ground bearing pressure which minimizes the ground disturbance that would otherwise occur during lateral skidding movement of the track 26 while the vehicle is changing direction.

Because the vertical position of each wheel 144 is adjustable independently of the other wheel and because the wheel vertical position can be adjusted either by the vehicle operator directly (through the operation of the toggle switches 190), by the electronic controller 250 (by controlling the valves 189a, 189b), or a combination of both, a wide range of operating flexibility is inherent in the vehicle 10. Generally, the suspension assemblies 164 operate at a hydraulic pressure called the baseline pressure. During normal forward or reverse (i.e., "non-turning") movement, the controller 250 monitors the suspension assembly 164 baseline pressure through the pressure transducers 296, 298 and adjusts the hydraulic pressure to maintain the baseline pressure.

The controller 250 is programmed to establish a default baseline pressure at vehicle 10 startup (typically around 800 psi). The operator can also adjust the baseline pressure in the suspension assemblies 164 if appropriate considering the terrain and ground conditions on which the vehicle is operating. The controller 250 will then monitor and adjust the suspension assembly 164 pressure to maintain the newly established baseline pressure. When the ground is relatively hard and dry, for example, the baseline pressure can be set relatively low. If the ground surface is soft or slippery, baseline pressure can be increased to prevent the wheels 144 from slipping. The electronic controller 250 can be programmed to control the suspension assembly valves 189 (in a manner described below) to adjust the hydraulic pressure in the lower portions 169 of the suspension assemblies 164 to maintain the default or selected baseline pressures in the two suspension assemblies 164, thereby affecting ground-following movement of both wheels 144 at the selected baseline pressure.

The tilt switch 306 is communicated to the electronic controller 250 and is operable to indicate if the vehicle 10 is tilted laterally (relative to horizontal) and in which vehicle direction. The tilt data is utilized by the electronic controller 250 to level the vehicle by adjusting suspension assembly 164 pressure to vertically reposition the wheels 114. If the vehicle 10 is tilted, the electronic controller 250 responds by simultaneously increasing the pressure in the suspension assembly 164 on the "downhill" side (i.e., the side toward which the vehicle is tilted) of the vehicle and decreasing the pressure in the suspension assembly 164 on the "uphill" side (i.e., the side away from which the vehicle is tilted) of the vehicle 10. This has the effect of lengthening the suspension assembly 164 on the downhill side of the vehicle and contracting the suspension assembly 164 on the uphill side of the vehicle 10 to level the vehicle. This lengthening/contracting movement of the two suspension assemblies 164 continues until the tilt switch 306 indicates vehicle leveling.

Preferably, the electronic controller 550 is programmed to level the main frame 12 of the vehicle (including the attached cab portion) only after the vehicle is tilted in a given direction for a length of time above a predetermined threshold length of time.

The above described general principles of the operation of the vehicle can be better understood from the example described in a series of flowcharts shown in FIGS. 13–22. The flowcharts describe interrelated procedures or subroutines for controlling the vehicle including the vehicle steering, suspension and speed. Preferably, the subroutines described by the charts are continuously executed sequentially while the vehicle is operation so that the controller 250 continuously monitors and controls vehicle operations. The exemplary flowcharts of FIGS. 13–22 can be used to code portions of a program that can be used to control the operation of the vehicle. When the vehicle is started, the control program is loaded and each variable is given an initial or default value. The flowcharts are interdependent.

Figure 13:
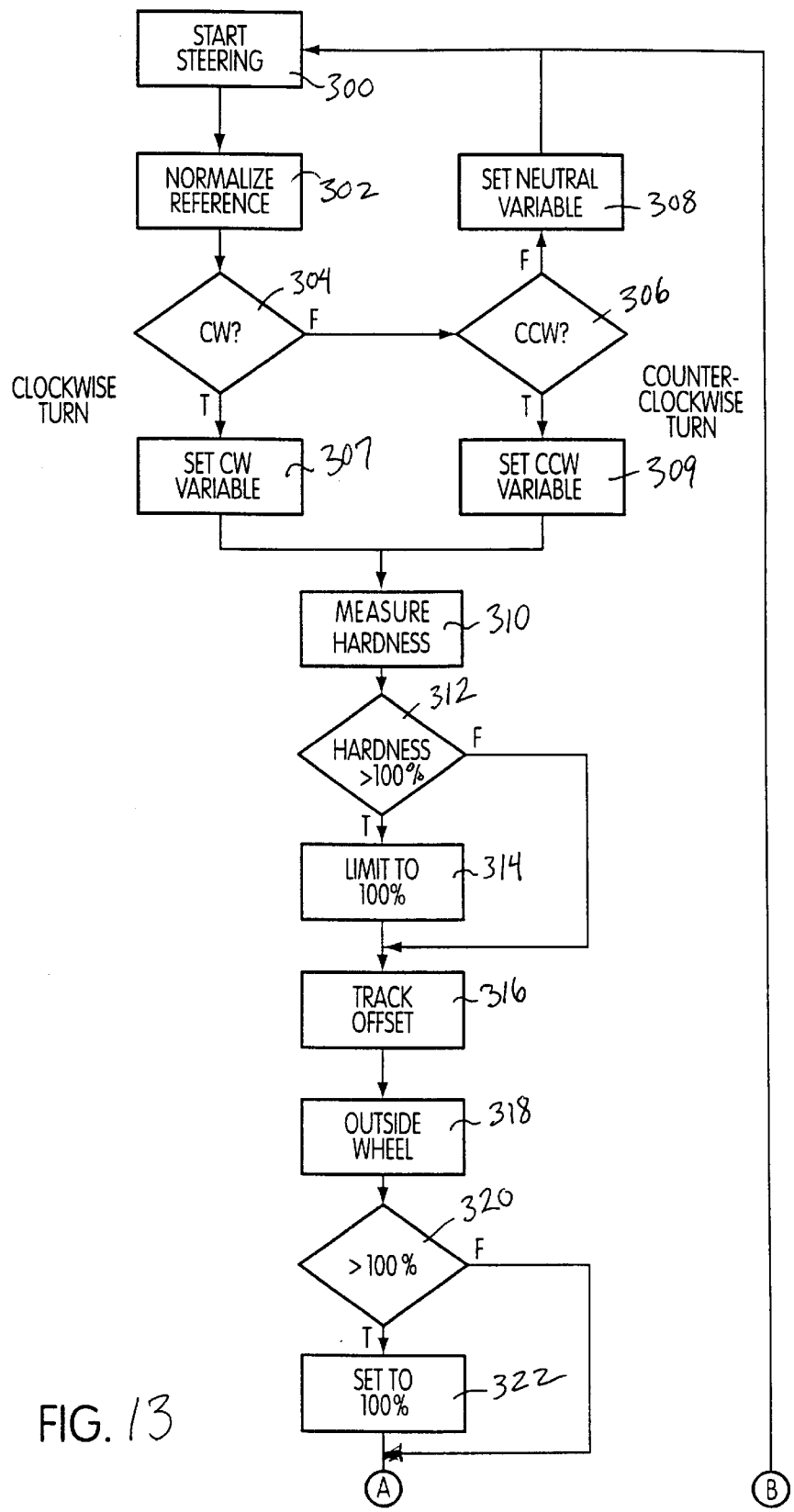
FIGS. 13–22 illustrate flowcharts for an exemplary electronic control system for the vehicle.
Figure 14:
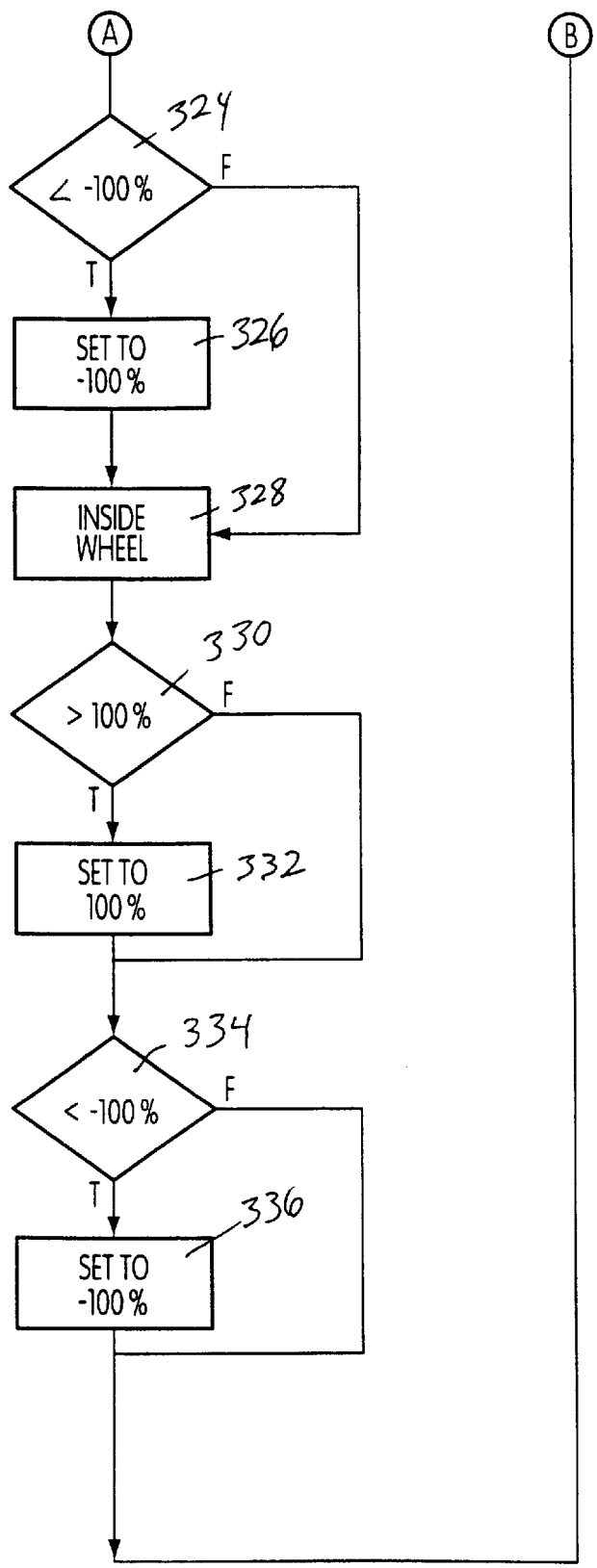
Figure 15:
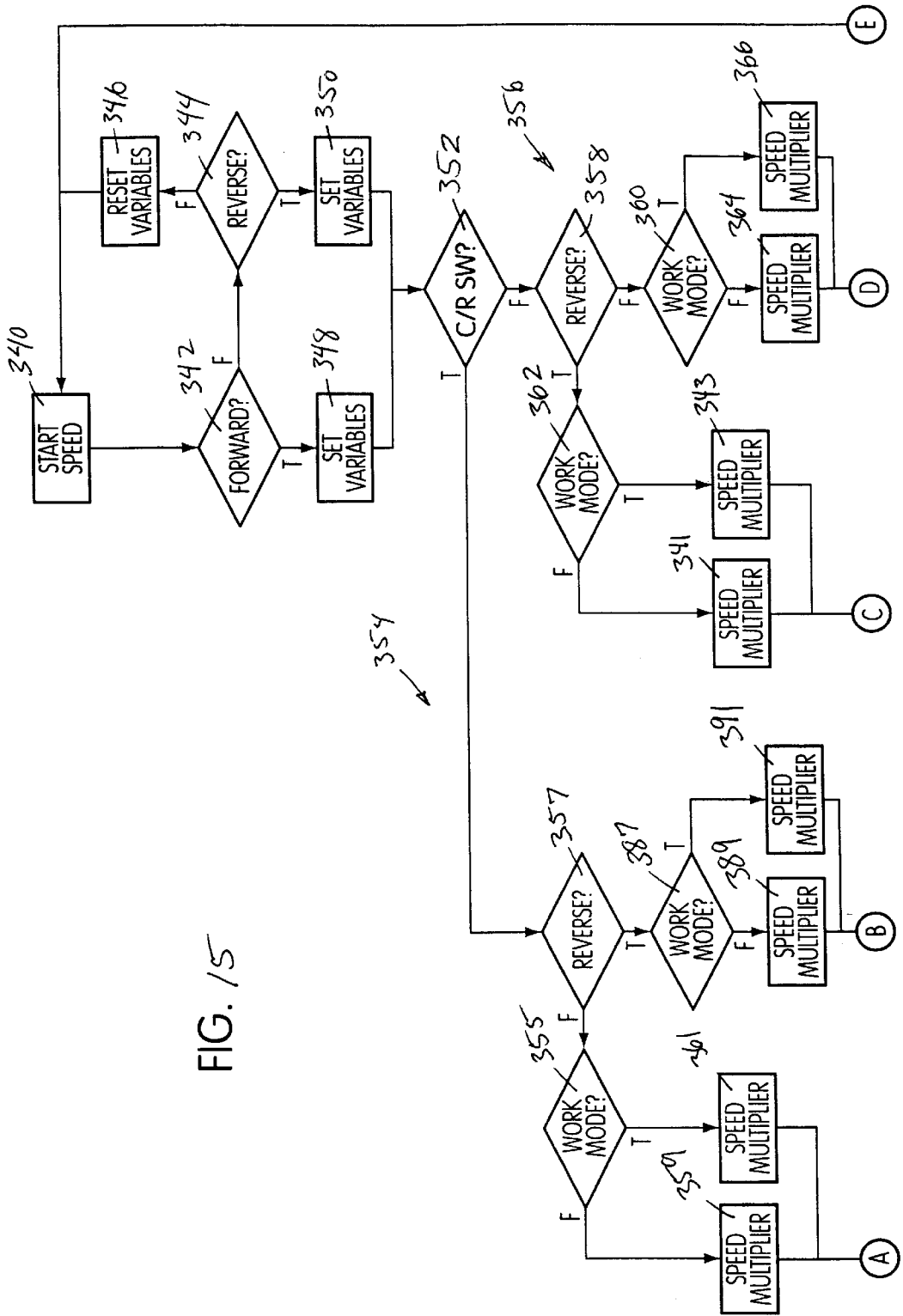
Figure 16:
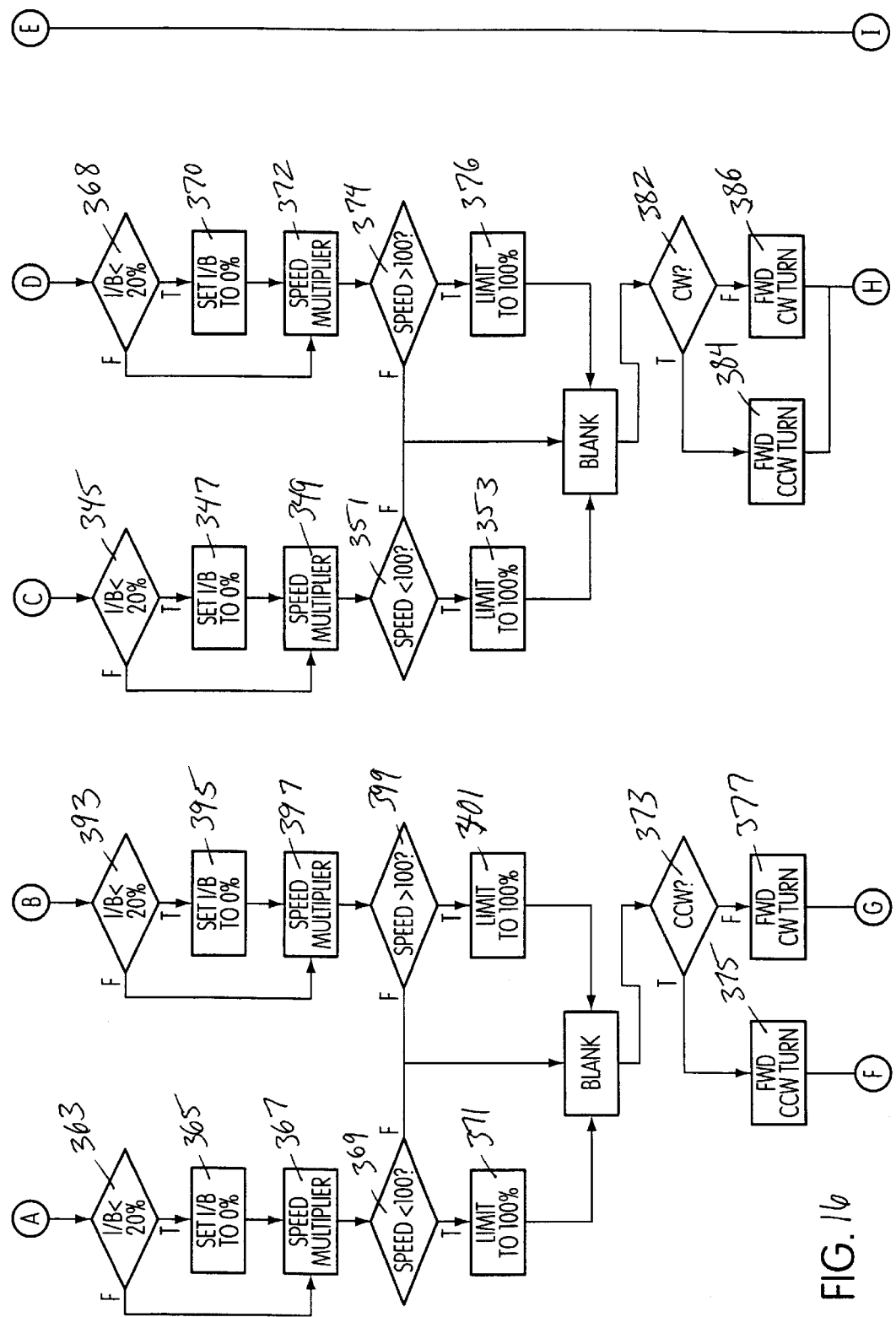
Figure 17:
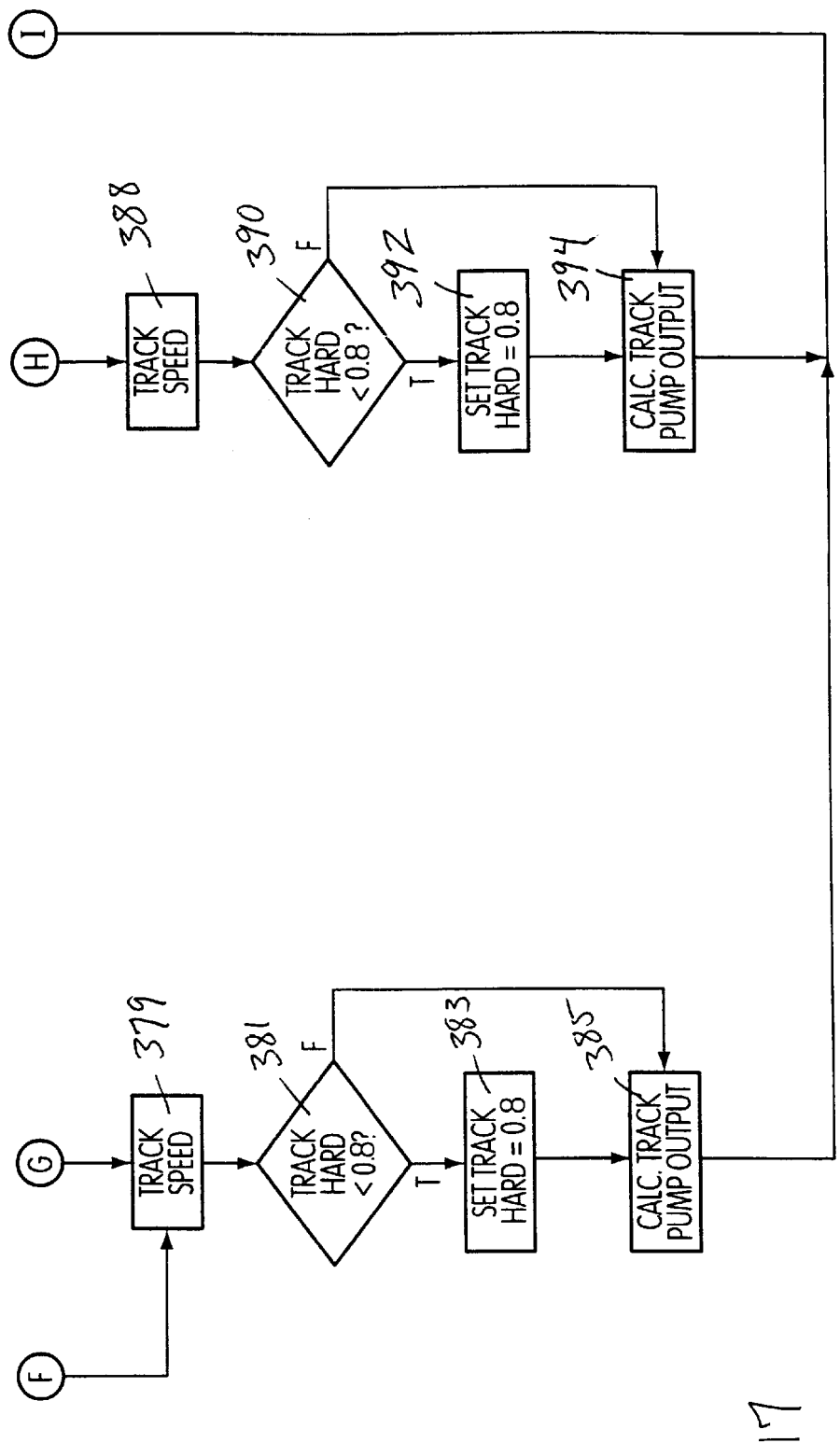

A steering flowchart is shown in FIGS. 13–14. The steering flowchart starts at block 300. At block 302 a normalized reference variable is calculated. The normalized reference variable is the battery 282 voltage. That is, the engine battery voltage is measured by the electronic controller 250 and this voltage value is stored as the normalized reference variable. This reference variable is recalculated each time this flowchart is executed because the battery voltage normally fluctuates during vehicle operation (because of change in engine speed and so on). After the battery voltage is measured, this variable is normalized from 0 to 100. That is, we consider the battery voltage to represent the 100 percent level of a variable, and normalize over that range. As will become apparent, the battery voltage is compared with an input voltage level from the steering wheel 254, the FNR lever 252 and the inch brake 256 to determine the positions (and therefore the input values of)

these input devices. The battery voltage is thus used as a voltage input to the potentiometer in the steering wheel 254. The output voltage from this steering wheel potentiometer is the input to the electronic controller. The electronic controller 250 determines the position of the steering wheel by comparing the voltage sent to the electronic controller 250 from the potentiometer in the steering wheel with the battery reference voltage. When the steering wheel is in its neutral position, for example, the voltage from the steering wheel is 50 percent of the battery reference voltage. When the steering wheel is turned fully in one direction, the voltage from the steering wheel is 100 percent of the battery reference voltage. When the steering wheel is turned fully in the opposite direction, the voltage from the steering wheel is 0 percent of the battery reference voltage.

The steering flowchart uses three variables to indicate the general position of the steering wheel 254, that is, to indicate whether the steering wheel has been turned in a clockwise direction, a counterclockwise direction or is in its neutral position: a clockwise variable, a counterclockwise variable, and a neutral variable. Block 304 determines if the steering wheel is moved in a clockwise direction (based on the steering wheel 254 input voltage to the controller 250). Block 306 determines if the steering wheel is moved in a counterclockwise direction. If both block 304 and block 306 are false, the neutral variable is set to 1 at block 308, the clockwise and counterclockwise variables are each set to zero, and the steering flowchart is restarted at block 300. If either block 304 or block 306 is true, then either the clockwise or counterclockwise variable is set to 1 as appropriate at either block 307 or 309 and the other two variables are set to zero. Thus, only one of the clockwise, counterclockwise and neutral variables can be true at any given time and the other two variables therefore must be false. When the electronic controller 250 detects one of these conditions as being true, it sets the corresponding variable to equal one, and sets the other two variables to zero.

If either the clockwise or counterclockwise variable is true, the electronic controller 250 calculates and stores the value of a "hardness" variable at block 310 based on the input voltage from the steering wheel 252 to the controller 250. The hardness variable is a measure of how far the steering wheel is turned in a given direction from neutral. The hardness variable is normalized over a range of −100 to +100. If, for example, hardness is determined to be zero, the electronic controller 250 interprets this as meaning the steering wheel 254 is in its neutral position. If the steering wheel is at −/+100, the electronic controller 250 interprets this as meaning the steering wheel is fully displaced in one direction or the opposite direction, respectively.

Block 312 determines if the hardness variable is the greater than its 100%. If hardness is greater than a 100% value, that indicates that the steering wheel input voltage is higher than expected. In response, the controller 250 uses the measured steering wheel voltage as the new 100 percent level at block 314. Block 314 thus assures that the hardness variable is never above its 100% level. A voltage of over 100 percent of the expected voltage may be obtained, for example, because the steering wheel 254 input voltage is not precise or because the battery voltage has fluctuated.

Block 316 calculates a value called track offset. The track offset value that represents a ratio between the circumference of a wheel 144 (both wheels 144 have circumferences that are equal to each other) and the circumference of the track 26. This ratio takes into account the fact that the linear distance the vehicle travels during one revolution of track 26 is not equal to the distance the vehicle travels during one revolution of a wheel 144. As will become apparent, this ratio is used to adjust wheel speed during target wheel speed calculations to, in essence, synchronize target wheel and track speeds.

Block 318 calculates the desired (or "target") outside wheel speed based on the steering wheel position (i.e., the hardness variable) and the FNR lever position and the track offset variable. When the steering wheel is in its neutral position, the steering wheel hardness variable has no effect on the outside (or inside) wheel speed calculation. Forward (or reverse), straight ahead wheel speed is calculated from the position of the FNR lever and the track offset value. During a vehicle turning operation, the outside wheel speed is raised by an amount that is directly proportional to the displacement of the steering wheel from its neutral position in a steering direction.

As discussed below, vehicle speed in the forward (or reverse) direction is directly proportional to degree of forward (or reverse) displacement of the FNR lever from neutral. For example, if the FNR lever 252 is moved half way through its forward range, the vehicle will travel forwardly at 50 percent of its maximum forward speed. Generally, if the steering wheel is turned from its neutral position through a given percentage of its range of motion (for example, 30 percent) the outside wheel speed is increased by the same percentage amount (in his example, by 30 percent) and the inside wheel speed is decreased by approximately the same percentage amount (that is, it is decreased in this example by approximately 30 percent). The inside wheel percentage value is approximate because, as discussed below, when the steering wheel 254 has moved through 66.7 percent of its range of motion in a given steering direction, the inside wheel begins counter rotation. Generally, when the steering wheel is at 100 percent (or maximum) displacement (in either steering direction), the outside wheel speed is rotating at double its initial (i.e., pre-turn) forward speed and the inside wheel is rotating at the same rate but in the opposite direction.

Because the wheels 144 counter-rotate when the steering wheel 254 is moved to its position of greatest displacement (in a either the clockwise or counterclockwise directions) and because the suspension assembly pressure is increases above baseline pressure in direction proportion to the degree of steering wheel 254 displacement from neutral, the vehicle 10 is capable of essentially turning in place when the wheels counter-rotate. In other words, the vehicle 10 is capable of entering a "tricycle" configuration, that is, a configuration in which the weight of the vehicle is supported by the wheels 144 and an end portion of the track 26.

Blocks 320 and 324 determined whether or not the outside wheel speed is greater than or less than its +100 or −100 percent limit. If it is, block 322 and 326 sets the value of the outside wheel speed variable to +100 or −100 percent values. Block 328 calculates the desired or "target" inside wheel speed as described above, that is, based on steering wheel position (i.e., the value of the hardness variable), the FNR lever position and the track offset value. Blocks 330, 332, 334 and 336 limit the target wheel speed value calculated in block 328 to within the plus or minus 100 percent levels. The steering subroutine loops back to the starting block following block 336.

As noted above, the design of the vehicle 10 allows the vehicle 10 to be driven with the operator facing in either of the two longitudinal vehicle directions. The vehicle seat is "reversible" to allow the driver to face in either longitudinal vehicle direction. Specifically, the seat can be unlatched from a latch or locked position facing in one longitudinal direction, swiveled 180 degrees and relatch in a position facing in the opposite direction. The control reversal switch 272 is a two position toggle switch that is provided as an input to the controller 250 to indicate to the controller which direction the seat is facing in, and therefore, which of the two vehicle directions is the "forward" reference direction from the point of view of a driver sitting in the seat. In other words, when the driver wishes to reverse the direction of the seat so that he faces in the opposite longitudinal direction, the driver swivels the seat 180 degrees and then changes the position of the control reversal switch 272. Preferably the steering wheel 254 (and several other controls including the FNR lever) swivel with the seat. Based on which of its two positions the control reversal switch 272 is in, the electronic controller 250 is programmed such the vehicle controls behave the same way from the operator's point of view, regardless of the direction in which the driver is facing. Thus, for example, when the seat is facing in either longitudinal direction and the seated driver moves the FNR lever 252 "forward" (from the seated driver's prospective), the vehicle moves "forward" (from the seated driver's prospective) and when the driver is driving "forward" (from the seated driver's point of view) and the steering wheel is turned to the right (i.e., clockwise), for example, the vehicle turns right (from the seated driver's point of view) regardless of the direction in which the seat is facing. It is contemplated to include the control reversal switch 272 as part of the seat assembly 22 so that when the seat is swiveled 180 degrees, the switch 272 is automatically toggle to the correct position by the movement of the seat assembly.

Thus, it can be understood that the electronic controller 250 is programmed to assign (based on the position of the control reversal switch 272) to each wheel 144 and to the track 26 the "correct" (from the driver's point of view) target speed and rotational direction so that the vehicle 10 "steers" in a manner similar to a conventional vehicle regardless of the longitudinal direction in which the seat of the vehicle 10 is facing and regardless of whether the vehicle 10 is moving "forward" or "in reverse" (where the terms "forward" and "reverse" are in this context defined from the point of view of a driver sitting in the vehicle seat 22). The speed flowchart of FIGS. 15–17 generally has four branches which function to correctly assign wheel and track speeds and directions to accommodate these four situations. As will become apparent, the flowchart of FIGS. 15–17 includes four branches (two branches off block 357 and two branches off block 258) which accommodate the four possible wheel and track speed and direction assignment situations (i.e., 2 seat positions with two driving directions relative to each of the two seat positions).

Thus, generally the electronic controller 250 must determined which wheel is the inside wheel and which wheel is the outside wheel before the controller 250 can adjust the wheel speeds to turn the vehicle 10. This determination is made in the speed chart shown in FIGS. 15–17. The speed chart starts at block 340. At blocks 342 and 344 the controller 250 determines the position of the FNR control lever 252 to determine if it is in a forward position, a reverse position, or a neutral position. If the FNR lever is in a neutral position the controller 250 resets a forward variable and a reverse variable to false (i.e., to zero) and goes back to the starting block 340. If the FNR control lever 252 is in forward or reverse, the appropriate variable is set to 1 (i.e., true) at block 348 or 350.

The FNR control lever 252 is a potentiometer that is used to generate an input voltage to the controller 252 to control vehicle speed. The FNR control lever signal is a percentage of the engine battery voltage or "reference" voltage. When the FNR control lever 252 is in its neutral position, it sends an input voltage to the controller 250 equal to 50 percent of the reference voltage. When the FNR lever 252 is fully forward (indicating maximum forward speed) or fully rearward (indicating maximum reverse speed), its input voltage is 100 percent or 0 percent, respectively, of the battery reference voltage. As a specific example, if the battery reference voltage is 12 volts, the controller 250 interprets a 6 volts input voltage from the FNR control lever as meaning the FNR level is in its neutral position, a 12 volts input voltage as indicating the FNR lever is fully forward, and a zero volts input level as indicating the FNR lever is in its fully reverse position. It is also contemplated to provide an FNR lever in which, if the battery reference voltage is 12 volts, the FNR lever sends a positive 12 volts signal to the controller 250 when the lever is fully forward, a zero volts level to the controller when the lever is in neutral, and a −12 volts signal to the controller when the lever is fully rearward.

At block 352 the controller 250 determines the position of the control reversal switch 272. It will be recalled that switch 272 is in one of two positions, depending on the longitudinal direction in which the seat (and, therefore, the driver) is facing. The switch 272 is provided to reverse the effects of various input devices to assure that they operate the same way regardless of the direction in which the driver and seat are facing relative to the rest of the vehicle. Depending on the position of the control reversal switch 272, the program will follow one of two branches generally indicated 354 and 356, respectively. Branches 354 and 356 are essentially identical. Branch 354 will be described in detail. The operation of branch 356 can be understood from an examination of branch 354 and therefore will only be discussed briefly. At block 358, the controller 250 determines if the vehicle 10 is moving forward or in reverse based on the position of the FNR control lever 252. If the lever 252 is in a forward or its neutral position, the program follows the false branch and the controller determines in block 360 whether the vehicle 10 is in work mode or travel mode based on the position of the work mode/travel mode switch 270. If the vehicle is in work mode, the controller 250 implements a speed control equation provided in block 366 and if the vehicle is in the travel mode, the controller 250 implements a speed control equation provided in block 364.

To understand the operation of the speed multipliers, it should be recalled that vehicle speed is determined by the hydraulic outputs of the wheel and track pumps 180, 178. The pumps 180, 178 are controlled by sending a control voltage to each pump typically a voltage of from −10 volts to +10 volts, for example. When a 0 volt signal is sent to the pump EDC's by the controller 250, the pumps 180, 178 are destroked, meaning that they are not sending any fluid to the associated hydraulic motors, so that the wheels 144 and track 26 are not turning and therefore the vehicle 10 is not moving. When the controller 250 sends +10 volts to a pump EDC's, that pump 180 or 178 is operating at its maximum hydraulic output. Therefore, the associated wheel 144 and the track would be moving at its maximum speed in one direction. Similarly, if the controller 250 were to send a −10 volt signal to a pump EDC's, that pump 180 or 178 would operate at its maximum hydraulic output in the opposite direction. When the vehicle is in travel mode, the controller 250 is can send a control voltage anywhere in the range of between ±10 volts to the pumps 180, 178, depending on the position of the FNR lever 252 and other factors. When the vehicle is in work mode, however, the controller 250 will only send control voltages to the pumps 180, 178 that are within narrower limits. The travel mode/work mode switch thus operates to limit maximum forward and reverse vehicle speed when the switch is in its work mode. The voltage range, and therefore the maximum forward and reverse vehicle speeds, are affected by the speed multiplier equations. The speed multiplier equations also assures that the forward and reverse vehicle speed is directly proportional to FNR lever 252 displacement in both the work mode and travel mode.

The controller 250 determines the position of the inchbrake 256 at block 368. The inchbrake 256 is typically a foot controlled pedal-type potentiometer that sends an input voltage signal to the controller 250. This input signal from the inchbrake 256 to the controller 250 is a percentage of the battery reference voltage. When the inchbrake 256 is fully extended, the inchbrake 256 is referred to as being in its fully extended or 100 percent position and the input voltage from the inchbrake 256 to the controller 250 is equal to (or 100 percent of) the battery reference voltage. When the inchbrake 256 is fully depressed, the inchbrake 256 is referred to as being in its fully retracted or zero percent position and the input voltage from the inchbrake 256 to the controller 250 is equal to approximately zero percent of the battery reference voltage. The input voltage from the inchbrake 256 to the controller 250 thus varies from 100 percent to the 0 percent of the battery reference voltage and is proportional to the amount or percentage that the inchbrake 256 is depressed.

Block 368 determines whether the inchbrake 256 is depressed through more than 80 percent of its range of motion, that is, if the inchbrake 256 is within 20 percent of the bottom of its range of motion. If this condition is true, the controller sets the inchbrake 256 value to the 0 at block 370. When the inchbrake 256 is at zero value, the pumps 178, 180 are destroked, which stops the movement of vehicle. The inchbrake 256 can be used to limit the speed of the vehicle in certain work situations. For example, if the vehicle operator wants to slow the vehicle down (or stop the vehicle) for some reason, the driver would partially (of fully) the press the inchbrake 256. If the inchbrake 256 is partially depressed but is still above the 20 percent level, the controller 250 changes the speed multiplier value at block 372 to slow the vehicle (for the given FNR lever setting) in direct proportion to the amount the inchbrake 256 has been depressed. If the inchbrake 256 is fully depressed (that is, below the 20 percent level) the controller 250 changes the speed multiplier value at block 372 to stop the vehicle.

The inchbrake 256 also acts as a safety feature. As the inchbrake 256 is depressed, the vehicle 10 progressively decelerates. When the inchbrake 256 is fully depressed, the wheel pumps 180 and track pump 178 are fully de-stroked and the vehicle 10 stops. More particularly, if the engine 172 is running at, for example, 3000 rpm and the vehicle is traveling at 1.2 mph, and the operator wants to slow the vehicle to 0.25 mph, for example, the operator depresses the inchbrake 256 through its range of motion until this speed is reached. The engine 172 remains at the same rpm level (3,000 rpm), but the pumps 178, 180 are stroked less Blocks 374 and 376 limit the speed input signal value. Specifically, block 374 determines whether the voltage sent from the FNR control lever 252 to the controller 250 is above the 100 percent level. If the voltage is above 100 percent, the voltage is higher than expected so the controller 250 in response takes this high voltage level to be the new 100 percent level at block 376.

Blocks 382, 384 and 386 function to correctly assign wheel speed and direction to the two wheels 144 based on the positions of the FNR lever and the control reversal switch as determined in blocks 358 and 352, respectively. The controller 250 determines whether the vehicle is turning clockwise at block 382. It will be recalled that on the steering flowchart, and inside target wheel speed and an outside target wheel speed were calculated. Blocks 384 and 386 function to assign which wheel is the inside wheel and which wheel is the outside wheel and then calculates the actual pump output voltages required to be sent to each wheel pump to achieve these speeds.

Blocks 388, 390, 392 and 394 operate to calculate the target track speed for the track 26. Block 388 calculates the target track speed from the FNR lever position and a variable called track hardness. Track hardness is a variable that can vary within the range of 1.0 to 0.8 depending on the position of the steering wheel. Target track speed is equal to track speed determined from the position of the FNR lever times the hardness variable. When the steering wheel is in its neutral position, the track hardness variable is equal to 1.0. Therefore, track output speed is purely a function of FNR lever position. In other words, when the steering wheel is in its neutral position, and the FNR lever is moved to its fully forward position, the track 26 rotates at its maximum speed (that is, the track pump 178 is pumping at its maximum displacement. Similarly, when the FNR lever is moved 50 percent through its forward position and the steering wheel is in its neutral position, the track 26 is rotating at 50 percent of its maximum forward speed. The track hardness variable decreases from its maximum value of 1.0 to its minimum value of 0.8 as the steering wheel is moved out of neutral. When the steering wheel has moved out of neutral by a predetermined percentage, the track hardness variable reaches 0.8 and further movement of the steering wheel away from its neutral position towards its fully displaced position in either steering direction does not further decrease the track hardness variable. Preferably, the hardness variable has decreased to its 0.8 value when the steering wheel has moved through approximately 67 percent of its range of motion in a steering direction.

It can be understood that the track hardness variable functions to reduce the track speed by an amount of up to 20 percent from the speed at which the track will otherwise be rotating based on FNR lever position. The hardness variable thus functions to reduce track speed during a turning operation regardless of the initial speed of the vehicle prior to commencement of the turn. Block 390 checks to determine whether or not the track hardness variable has decreased below its 0.8 value. If it has, block 392 sets the hardness variable to 0.8. Blocks 390 and 392 function to assure that the track speed does not drop below 80 percent of its pre-turn speed value. Block 394 calculates the required track pump output displacement based on the target track speed calculated in block 388. Block 392 loops back to the start speed block 340.

It can be understood from the above discussion that blocks 362, 341 and 343 operate in the same manner as blocks 360, 364 and 366, respectively. Similarly, blocks 345, 347 and 349 can be understood from the operations of blocks 368, 370 and 372, respectively. Block 351 functions in a manner analogous to block 374 except that in block 351, the FNR lever is in the reverse portion of its range and in block 374 the FNR lever is in the forward portion of its range. Hence, block 351 determines whether or not the input voltage from the FNR lever to be controller 250 is below a minimum expected voltage value. For example, if the FNR lever sends a voltage value of −12 volts to be controller 250 when it is in its fully rearward position, if the input voltage is below that −12 volt level, block 353 response by taking that voltage level to be the new 100 percent level in the reverse direction.

Block 355, 359 and 361 operate in the same manner as blocks 360, 364 and 366, respectively. Similarly, blocks 363, 365 and 367 operate in the same manner as blocks 368, 370 and 372, respectively. Block 369 functions in a manner analogous to block 353 by determining whether or not the input voltage from the FNR lever to be controller 250 is below a minimum expected voltage value. If it is below the expected level, block 371 response by taking that voltage level to be the new 100 percent level in the reverse direction.

Blocks 373, 375 and 377 function to correctly assign wheel speed and direction to the two wheels 144 based on the positions of the FNR lever and the control reversal switch as determined in blocks 357 and 352, respectively. The controller 250 determines whether the vehicle is turning counterclockwise at block 373. It will be recalled that on the steering flowchart, and inside target wheel speed and an outside target wheel speed were calculated. Blocks 375 and 377 function to assign which wheel is the inside wheel and which wheel is the outside wheel and then calculates the actual pump output voltages required to be sent to each wheel pump to achieve these speeds.

It can be understood form the foregoing description that to set the vehicle forward (or reverse) speed, first the target track speed is calculated based on the position of the FNR lever and the position of the steering wheel. The wheel speeds are then calculated from the value of the track offset, the FNR lever position and the position of the steering wheel. When the vehicle is traveling straight ahead, the wheel speeds are equal to one another and are calculated as a ratio of track speed, the ratio of being determined by the track offset value. The track offset is a factor simply accounts for the difference in circumference of each wheel 144 as compared to the circumference of the track 26.

During movement of the steering wheel from its 0 percent displacement (that is, from its neutral position) to its 100 percent displacement, the outside wheel speed increases from its initial speed (that is, it's straight ahead speed prior to the commencement of the turn) up to double its initial speed. The outside wheel speed increases from its initial speed to double its initial speed (if possible, based on initial or pre-turn speed) in a directly proportional or "straight line" manner. If the vehicle is traveling at a rate that is in excess of 50 percent of its maximum straight ahead travel speed prior to the commencement of the steering operation, the outside wheel speed increases in the same manner with movement of the steering wheel until the wheel reaches its maximum possible speed. After its maximum possible speed is reached, further movement of the steering wheel toward its position of maximum displacement from neutral does not increase outside wheel speed.

The inside wheel will decrease to its −100 percent speed level when the steering wheel is fully moved into its position of maximum displacement from neutral. More specifically, the inside wheel speed decreases from its initial (that is, pre-turn) speed and to 0 speed in straight line manner as the steering wheel is moved from its neutral position in a steering direction to a position that is 66.7 percent through its range of motion. As the steering wheel moved through the last third of its range of motion to its position of maximum (or 100 percent) displacement, the inside wheel speed increases in a straight line manner to 100 percent of its initial speed in the opposite direction.

Figure 18:
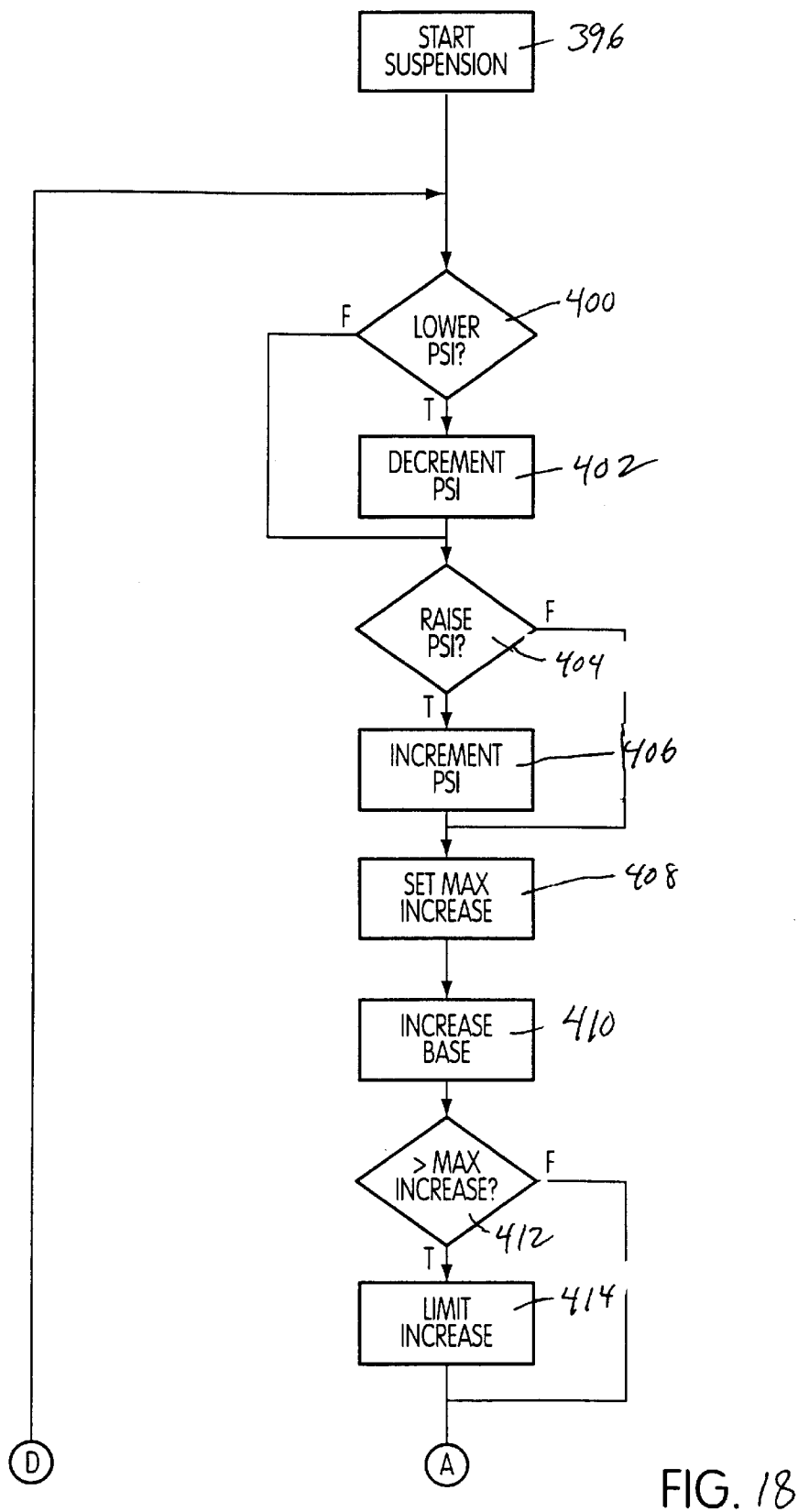
Figure 19:
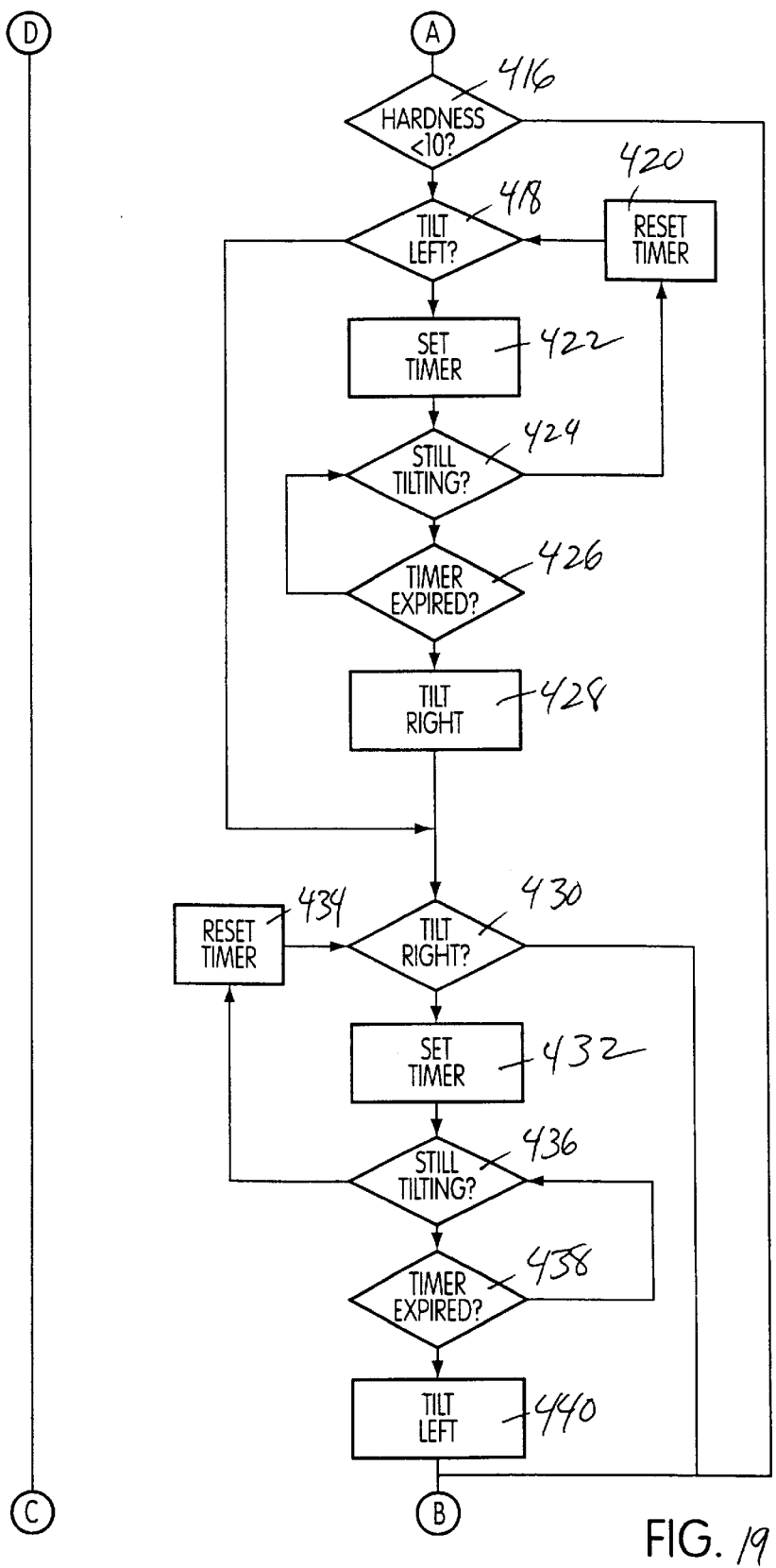
Figure 20:
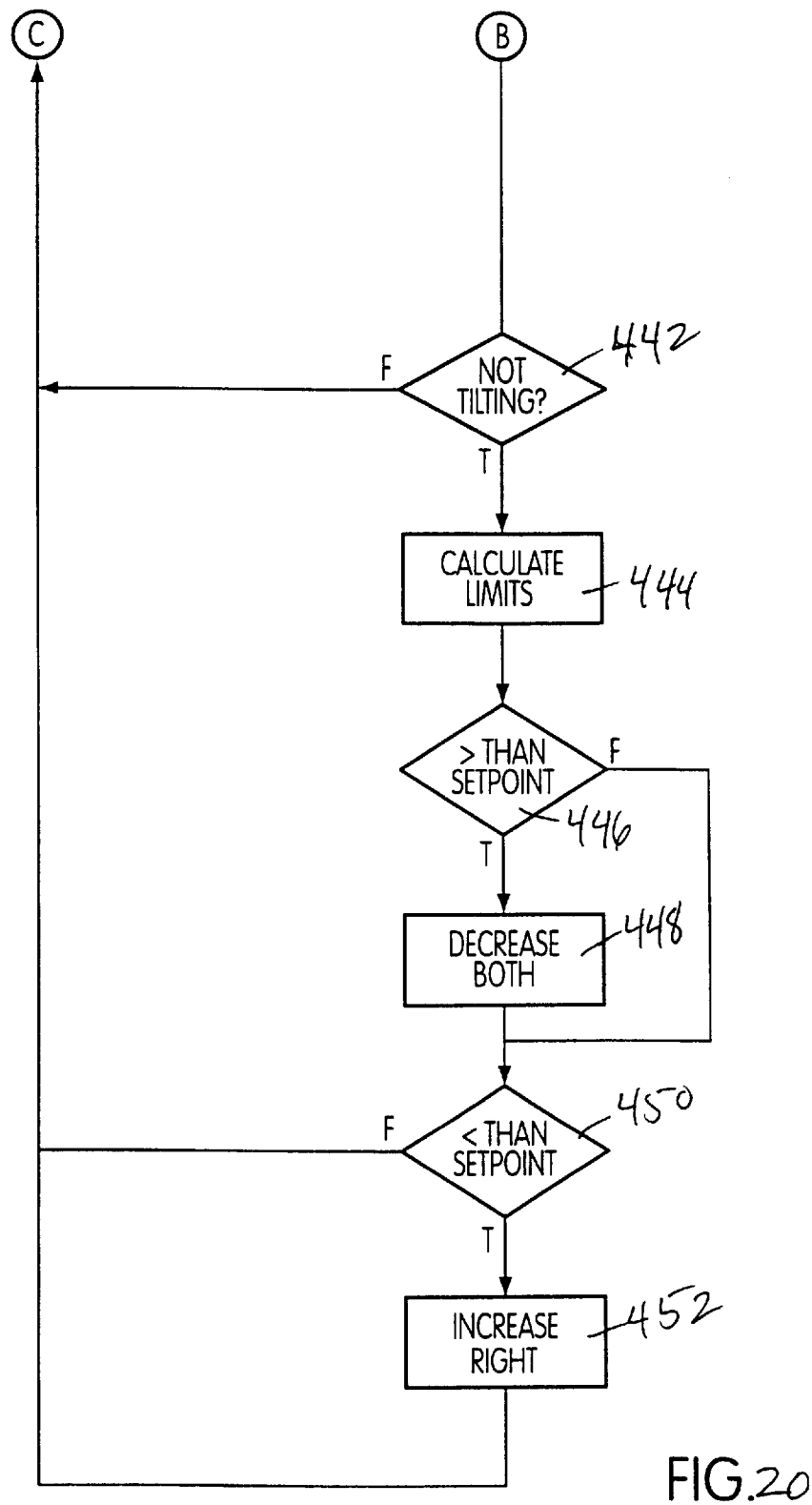

A flowchart for controlling the suspension system is shown FIGS. 18–20. Wheel differential speed levels (and the calculations thereof) are independent of the suspension pressure increases and decreases calculated due to steering wheel movement during turned. The operation of the suspension system has three goals: 1) maintaining baseline pressure in the suspension assemblies 164, 2) leveling the vehicle, and 3) lifting the main framing to shift the vehicle load from the track to the wheels during a steering operation (provided the steering wheel 252 is turned from neutral in a steering direction by greater than a threshold amount). When the vehicle turns, the controller measures the steering wheel displacement from neutral (in either the clockwise or counterclockwise direction) and increases the pressure in both suspension assemblies 164 simultaneously by opening the valves 189a, 189b.

During a steering operation, both valves 189 are operated to increase the hydraulic pressure in the associated suspension assemblies 164 simultaneously, equally and in direct proportion to be degree or hardness of the steering wheel movement from neutral. The tilt switch is an on/off switch. When the vehicle is level, the tilt switch is in its "off" position. When the vehicle is tilted, the switch is in one of two "on" switch positions (depending on direction of tilt) and indicates direction of tilt only, but not the degree of tilt. The controller 250 constantly monitors the pressure in each suspension assembly 164 using feedback information from the pressure transducers. The controller 250 adjusts the pressure to maintain baseline pressure when the vehicle is level and traveling essentially in a straight line (i.e., the controller 250 does not adjust baseline pressure when the vehicle is tilted, as indicated by the position of the tilt switch, or in a turning operation, as indicated by the degree of steering wheel 252 displacement from neutral.)

Preferably, the tilt switch overrides the base pressure adjustment so that if the vehicle is tilted, the controller does not correct for base pressure, it corrects for tilt instead. Thus, when the vehicle 10 is tilted, the base pressure adjustment is overridden. Similarly, the only time the steering wheel movement would increase suspension assembly pressure is when the vehicle is level. The feedback signals generated by the pressure transducers are analog signals. The pressure transducers 296, 298 produce analog feedback signals. These analog signals are digitized and digitally filtered to filter out high frequency pressure fluctuations (i.e., spikes). This assures that the controller 250 will not attempt to adjust suspension assembly pressure in response to pressure changes of short duration.

The suspension control flowchart begins with starting block 396. The controller 250 determines the position of a baseline pressure setting adjustment switch 260 at blocks 400 and 404. As described above, the baseline pressure setting adjustment switch 260 is preferably a 3-position spring-returned-to-center toggle switch. The baseline pressure setting adjustment switch 260 allows the vehicle operator to either increase or decrease the baseline pressure setting in both suspension assemblies 164, based on which of the two non-center position the switch 260 is in. When the vehicle 10 is started, a default baseline pressure value is utilized by the controller 250 and the controller operates the suspension assemblies 164 to maintain the default baseline pressure in both assemblies 164 (within predetermined upper and lower limits as described below) during normal vehicle operations. If the controller 250 determines in block 400 that the vehicle operator is requesting a decrease in the baseline pressure setting, the controller 250 decreases the target baseline pressure setting (which is stored as a variable) in block 402. Similarly, if the controller 250 determines in block 404 that the vehicle operator is requesting an increase in the baseline pressure setting, the controller 250 increases the target baseline pressure setting in block 406.

At block 408 the controller calculates a maximum increase value for the suspension assembly pressure and stores the value as a maximum increase variable. The maximum increase variable is determined by adding 1000 pounds of pressure to the baseline pressure setting. This maximum increase variable value is used to limit the increase in suspension assembly pressure using the manual pressure adjustment switches 190 and to limit the maximum pressure increase by the controller 250 operates the valves 189. The increase limited of 1000 psi based on the weight of the vehicle.

At block 410 the controller 250 increases the pressure in both suspension assemblies 164 simultaneously based on the steering wheel displacement variable value. To accomplish this, the controller 250 reads the steering wheel hardness variable as a percentage (from 0% to 100%) of steering wheel displacement from neutral and increases the pressure in each suspension assembly 164 above baseline pressure setting by the portion of 1000 psi indicated by the steering wheel position. For example, if the vehicle is operating with a baseline pressure setting of 900 psi and the steering wheel is turned in a steering direction through 50 percent of its range of motion from neutral in that direction, the controller 250 establishes a pressure of 1400 psi in each suspension assembly (that is, 900 psi plus 50 percent of 1000 psi). When the steering wheel is displaced to its 100 percent position of displacement, each suspension assembly 164 has a pressure of 1900 psi. If there is no steering wheel displacement, the baseline pressure is increased by a factor of one which means there is no baseline pressure increase.

Blocks 412 and 414 are used in conjunction with block 408. If the operator attempts to increase the suspension assembly pressure by more than 1000 psi above the baseline pressure setting using the toggle switches 190, for example, Block 412 detects that the 1000 psi increase has been reached and block 414 limits this increased to 1000 psi. Blocks 412 and 414 operate by comparing the actual pressure data derived from the pressure transducers with the value stored in the maximum increase variable.

The controller 250 corrects vehicle tilt in blocks 416–440. Block 416 reads the hardness value for the steering wheel and if this value is within ±10% of neutral, the controller 250 considers the vehicle to be traveling straight head. The controller 250 attempts to correct for vehicle tilt only when block 416 indicates that the vehicle is traveling straight ahead. If the vehicle is turning (determined by steering wheel position), the tilt switch is assumed to be out of its level-indicating position due to the centrifugal force on the tilt switch from the turning motion of the vehicle. The controller 250 thus does not attempt to correct for tilt when the vehicle is turning.

If the vehicle is not turning, the controller 250 determines if the tilt switch indicates a left tilt at block 418. If a left tilt is detected, the controller 250 starts a timer Block 422. The timer is used to establish that the vehicle is tilted in a given direction during straight-ahead vehicle movement for a predetermined period of time. Thus, the timer assures that the controller 250 will not attempt to level the vehicle during the relatively rapid side-to-side vehicle movement that may occur during vehicle traversal of rough or contoured ground. If a block 424 determines that the vehicle is no longer tilting, the controller resets the timer at block 420. If the vehicle is still tilting, the controller 250 determines whether or not the timer has expired at block 426. If the timer has expired, the controller 250 causes simultaneous equal and oppositely directed fluid flows in the lower portions 169 of the suspension assemblies 164 as described above, thereby starting the leveling process.

Blocks 430–440 repeat the tilt-correcting logic for a right tilt. Blocks 430–440 thus operate in essentially the same way as blocks 418–428. Therefore blocks 430–440 will not be considered in detail.

Block 442 determines whether or not the vehicle is tilting. If the vehicle is tilting, the controller 250 returns to block 400. Thus, while the vehicle is tilting, blocks 400–436 are executed as a loop.

If block 442 determines that the vehicle is not tilting, the controller 250 adds and subtracts a predetermined fixed amount to the stored baseline pressure set point value in block 444. It will be recalled that the baseline pressure set point is the target baseline pressure level at which the operator wants the vehicle to be operating. Preferably this predetermined fixed amount (or "offset") is 50 psi so that the controller 250 adds and subtracts 50 psi to the baseline pressure set point. The controller 250 reads the hydraulic pressures from the pressure transducers 296, 298 in the suspension assemblies 164 and determines if the actual pressure value is greater than the set point value. If the actual pressure in both suspension assemblies 164 is greater than 50 pounds over the baseline pressure set point, the controller causes the fluid pressure in both suspension assemblies 164 to decrease at block 448 by causing valves 189 to remove hydraulic fluid from the lower portions of the suspension assemblies 164. The hydraulic pressure in both suspension assemblies is changed simultaneously to assure that the vehicle remains level and does not tilt as a result of the baseline pressure adjustment. If the controller 250 determines that block 450 that the actual pressure in both cylinders is below the lower threshold pressure level (i.e., the baseline pressure set point minus 50 psi), the controller 250 increases fluid pressure in both suspension assemblies 164 simultaneously at block 452 (by actuating the valves 189). The program loops back to block 400 at either block 450 or block 452 as indicated in the flowchart.

Figure 21:
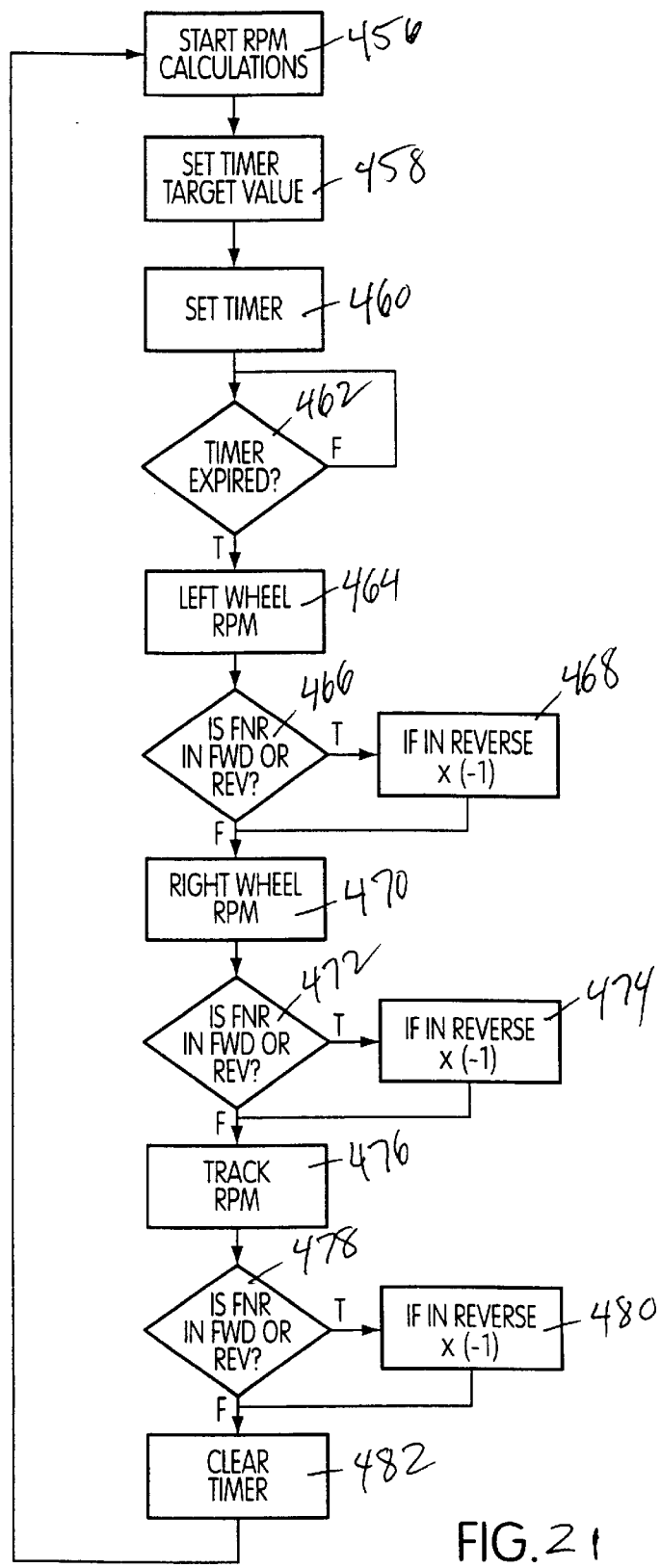

A flowchart for calculating wheel and track rpm's (that is, revolutions per minute) is shown in FIG. 21. As discussed, the wheel motors 142 and track motor 122 each include speed sensors, each of which provides a feedback signal to the controller 250 indicating the rotational rate of the associated motor shaft. Each feedback sensor generates a fixed number of pulses per revolution of the associated motor shaft. Generally, the controller 250 calculates the actual wheel speeds and actual track speed (based on the feedback signals from the speed sensors), compares these actual speeds with desired speeds (referred to as "target" speeds), and then adjusts the actual speeds, if necessary, to achieve the target speeds. More specifically, the controller 250 calculates what the actual wheel and track speeds are, compares these speeds to the respective target speeds, and calculates an error value for each of the wheel and track speeds. These error values are then used to either raise or lower the output control voltage to the associated wheel and track pumps.

The rpm calculation flowchart begins at block 456. At block 458, the controller 250 chooses a time value which determines the length of time a timer will run. At block 460, the controller starts the timer which then runs for the time interval chosen in block 458. The block 460 also starts three counters which count (or "sum") the pulses generated by each speed sensor. Block 462 determines whether or not the timer started in block 460 has expired. If the timer has not expired, the three counters continue to count, respectively, the pulses generated by the three speed sensors. After the timer has expired, block 464 calculates the number of rpm's for the left wheel based on the total number of pulses counted during the known time interval and the number of pulses generated by each motor shaft per revolution.

At block 466, the controller 250 determines whether the FNR lever 252 is in forward or in reverse. If it is true that the FNR lever is in reverse, the controller multiplies the left wheel rpm value by negative one at block 468. Blocks 470–474 and blocks 476–480 perform identical calculations on the right wheel and track, respectively. The controller 250 clears the timer at block 482.

Figure 22:
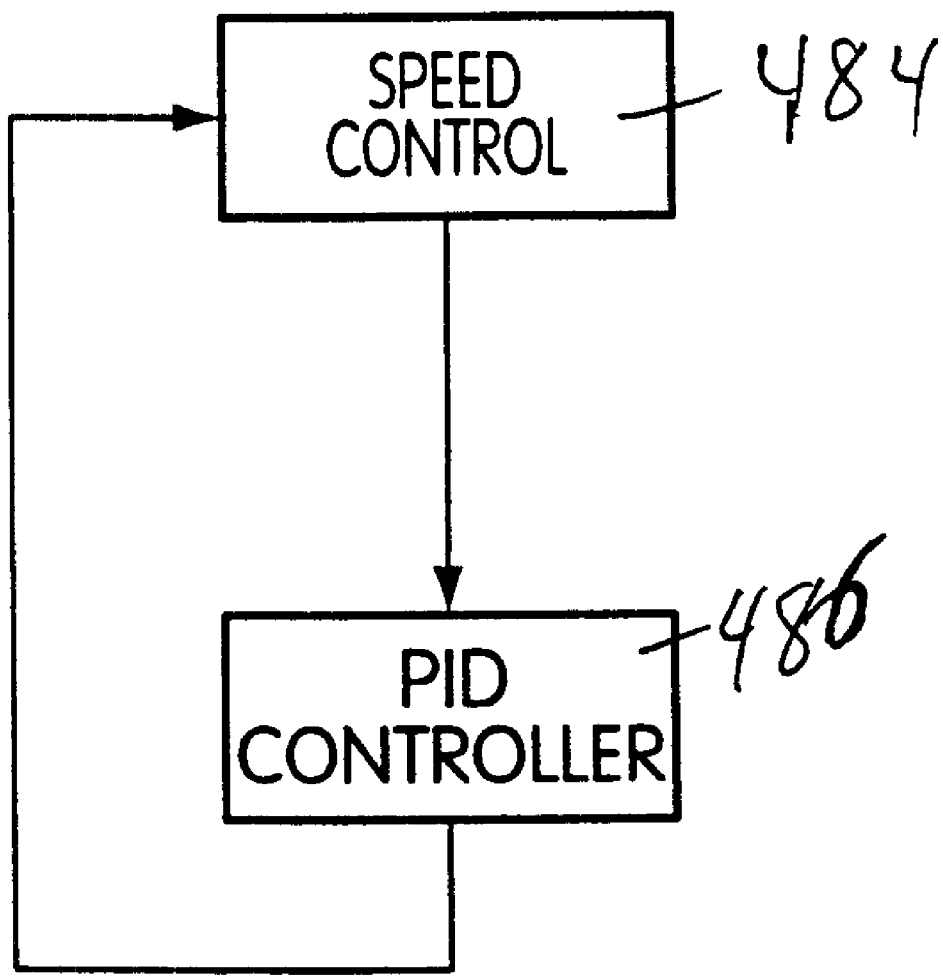
Figure 23:
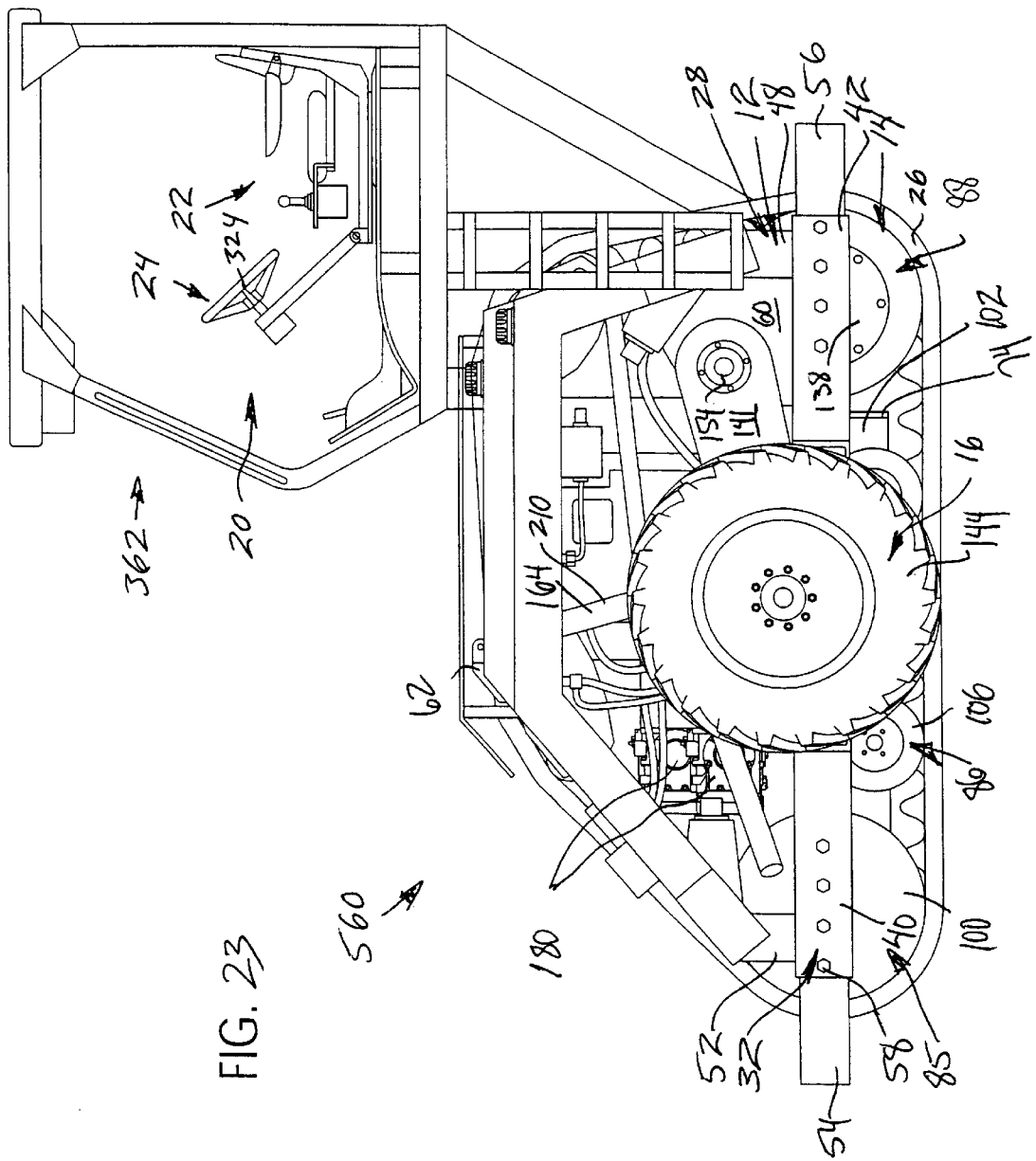
FIG. 23 is a side elevational view of a second embodiment of the vehicle showing a cab assembly mounted generally rearwardly of the main frame.
Figure 24:
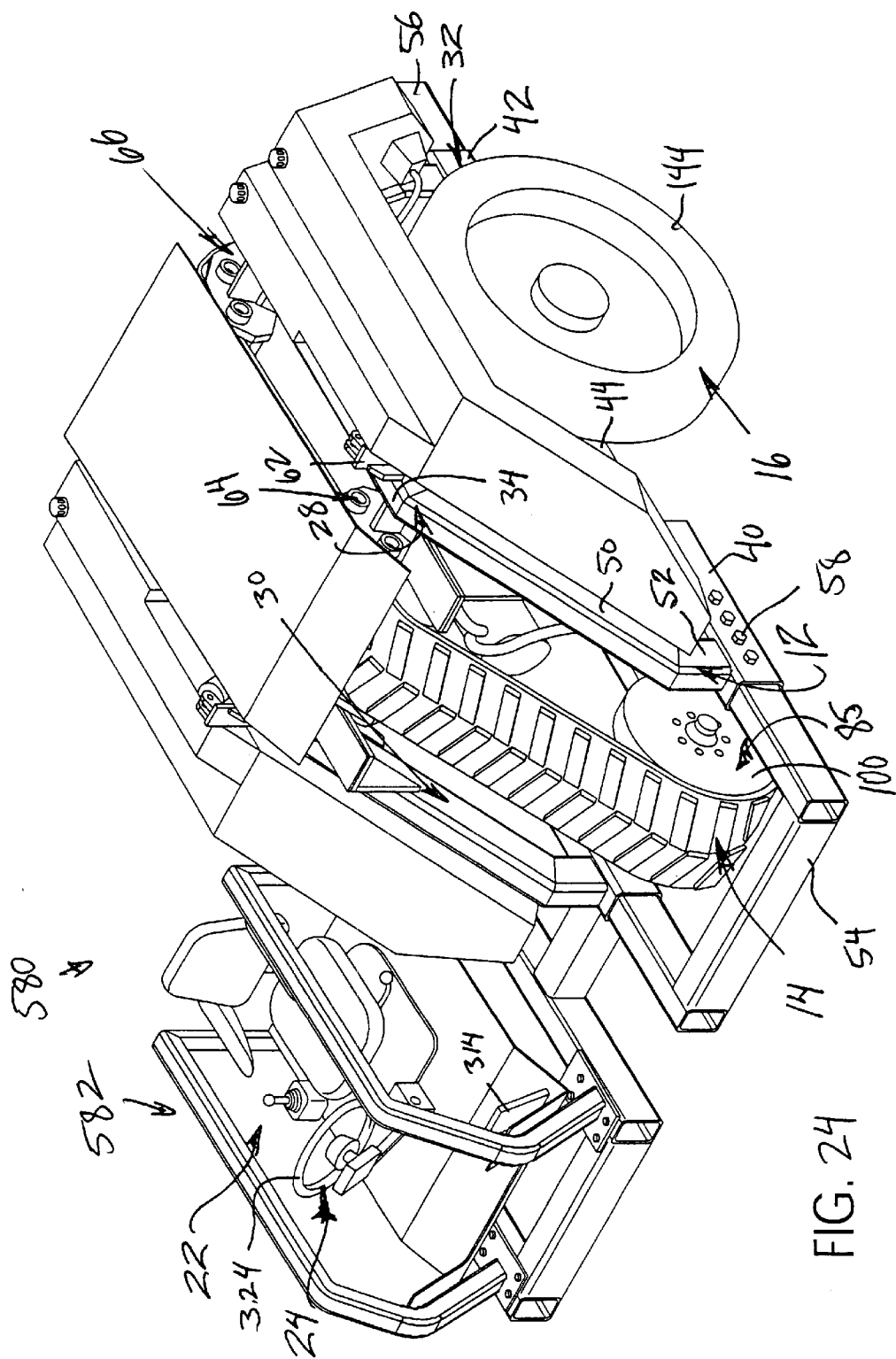
FIG. 24 is a perspective view of a third embodiment of the vehicle showing a cab assembly thereof mounted generally laterally of the main frame.
Figure 25:
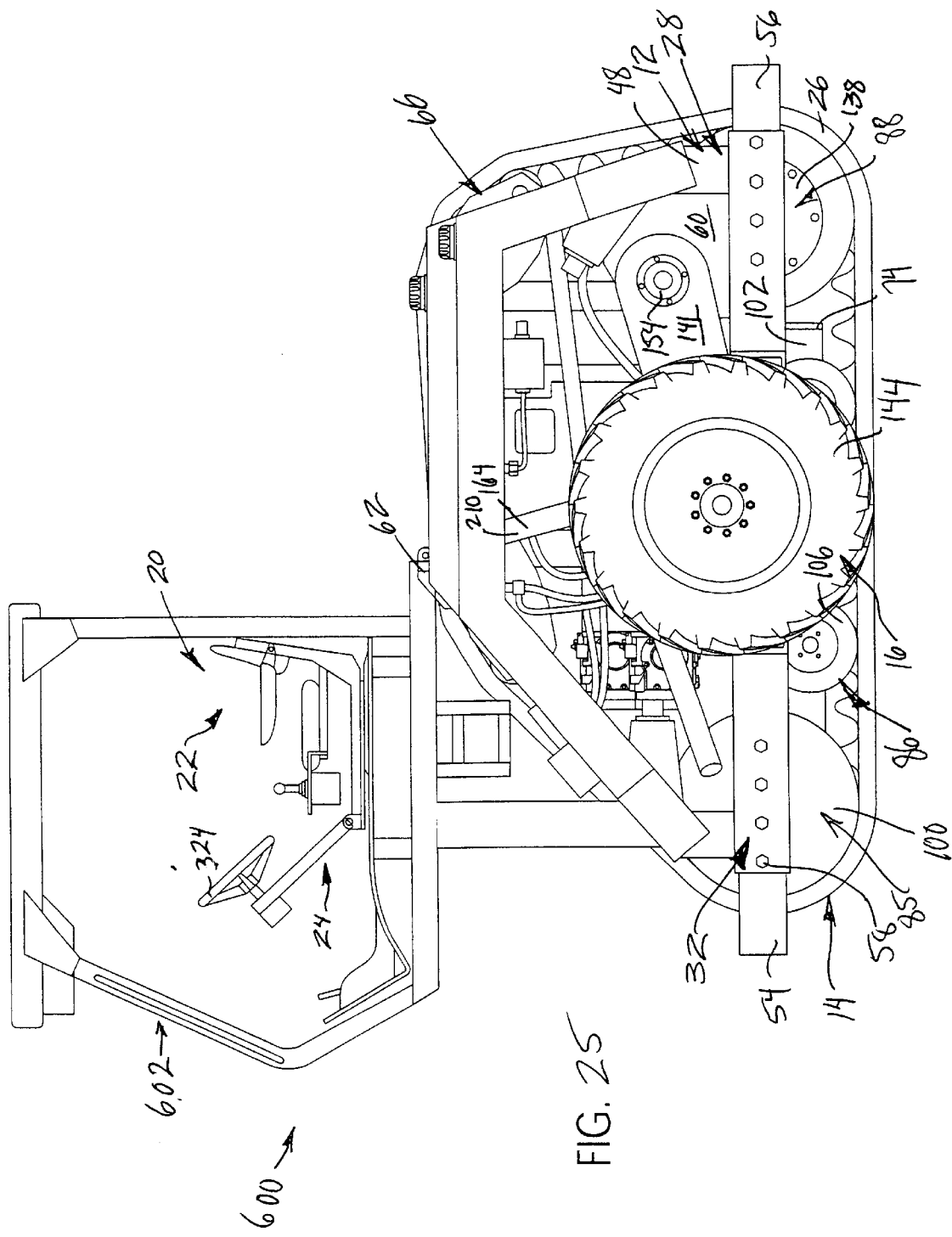
FIG. 25 is a side elevational view of a fourth embodiment of the vehicle showing a cab assembly mounted generally forwardly of the main frame.

A speed control flowchart is shown in FIG. 22. The purpose of the speed control flowchart is to compare the actual speeds of the wheels and track with the target speeds of the wheels and track and to correct for any difference (i.e., "error") between these pairs of values. The speed control chart begins at block 484. The inputs to block 484 are the target speeds for the wheels and track and the actual rpm values for the wheels and track calculated in the rpm calculation flowchart. As discussed, the target speed and actual speed for each wheel 144 and for the track 26 should match. If they do not, there is a nonzero error value for each of the wheels and/or for the track 26. Block 486 uses each error to correct the actual speed of the wheels and/or track. Block 486 uses a PID controller to correct wheel and track speeds. The programming and use of PID controllers is well-known to persons skilled in the art.

The default values of 800 psi for the suspension assembly 164 baseline pressure is appropriate form most conditions. The set point switches 260 allows the operator to reset the baseline pressure set point if appropriate for conditions. The manual switches 190 allow the operator to individually adjust the suspension assembly 164 pressures to stop individual wheel slippage, to shift the weight of the vehicle 10 between the track 26 and the wheels 144 as the operator deems appropriate, and to level the vehicle if necessary. Because each suspension assembly 164 includes a computer controlled portion and a manually controlled portion, the vehicle operator has a significant degree of control of the operation of the suspension assemblies 164.

The backup alarm 308 is actuated by the controller 250 when the controller detects that the FNR lever 252 is in its reverse direction. The backup alarm 308 sounds an audible and/or visual warning signal (using, for example, a horn or warning lights or both on the vehicle) to alert persons in the vicinity of the vehicle that the vehicle is moving in reverse.

The neutral switch 262 is a two position toggle switch that can be used to instantly destroke the track and wheel pumps 178, 180. The neutral switch 262 is preferably mounted on the FNR lever 252. The neutral switch 262 is provided as a safety feature that allows the operator to instantly stop the forward or reverse movement the vehicle without turning the power off.

Preferably, the speed input signal from the FNR lever 252 to the controller 250 is filtered to eliminate spikes which could otherwise cause sudden vehicle acceleration/deceleration. The input from the FNR lever 252 to the controller is filtered, for example, so that if the FNR lever is moved from neutral to maximum speed (forward or reverse) in one rapid movement, the filter will slow the input signal to the controller 250 so that the input signal appears to be a "ramp-type" input voltage increase, not a voltage spike.

The controller 250 can also be programmed to achieve the desired responsiveness or "feel" of the FNR lever. This is important because the vehicle can be constructed and programmed for operation in particular work environments. An embodiment of the vehicle can be constructed and programmed, for example, to operate as an agricultural tractor or vehicle (referred to as "agricultural mode") and another embodiment of the vehicle can be constructed and programmed to operate as a bulldozer-type tractor or vehicle (referred to as "bulldozer mode"). In agricultural mode, the vehicle is typically driven long distances over open fields. In bulldozer mode, the vehicle is typically operated in a confined area (such as inside a warehouse or construction site) and the operator is required to drive relatively slowly and change directions relatively frequently. The controller 250 can be programmed to change the sensitivity or responsiveness of the FNR lever 252 as appropriate for these modes of operation. For example, the controller 250 can be programmed such that a given movement of the FNR lever on the agricultural tractor embodiment results in a greater speed change then an equivalent movement of the FNR lever on the dozer-type tractor. In other words, the software can be programmed to include a scaling factor that increases or decreases the sensitivity and responsiveness of the FNR lever as required for particular applications. It can be appreciated that a single vehicle can be programmed to provide both modes of operation.

The symmetrical shape of the vehicle allows it operate in essentially the same manner with the driver (and the driver's seat) facing in either direction. As mentioned, the seat can be rotated 180 degrees to face toward either end of the vehicle. Implements can be mounted on both ends of the vehicle. For example, when the vehicle is used in bulldozer mode, a bucket loader can be mounted on the on the front and a bulldozer blade on the back of the vehicle. In agricultural mode, a mower can be mounted on the front of the vehicle and a second implement mounted on the front.

The work mode/travel mode switch is particularly useful when a single vehicle is programmed to operate in bulldozer mode and agricultural mode. If, for example, the operator is operating vehicle using the bulldozer blade (i.e., the vehicle is in bulldozer mode), it may be advantageous to limit the maximum speed of the vehicle. By moving the work mode/travel mode switch into its work mode setting, the controller 250 limits the maximum output voltage that can be sent to the wheel and motor pumps 178, 180. For example, in the specific embodiment of the vehicle described and illustrated herein, when the work mode/travel mode switch is in its travel mode switch position and the FNR lever is fully forward (or fully rearward), the vehicle travels at a maximum speed of approximately 7.5 to 8 mph when the engine is running at 3000 rpm and all the pumps are fully stroked. When the work mode/travel mode switch is in its work mode switch position and the FNR lever is fully forward (or rearward), the vehicle speed is limited to approximately 2.5 mph. In essence then, putting the vehicle in work mode precludes the possibility of fully stroking the wheel and track pumps 178, 180.

The work mode/travel mode switch is optional. Instead of having a work mode/travel mode switch, the input controls such as the FNR control (or any other control) could be constructed to be capable of assuming a number of pre-selected positions. Providing these pre-selected FNR lever 252 positions would, in effect, give the vehicle a 2-, 3- or 4-speed hydrostatic transmission control The cockpit 20 includes controls the vehicle operator can use to monitor the diesel engine. The cockpit includes an oil pressure indicator, an amp meter, a temperature indicator, a tachometer, an hour meter and a battery charge indicator for the vehicle electrical system (these controls and indicators and the vehicle electrical system, with the exception of the battery 282 shown schematically in FIG. 12, are not shown in the figures). The cockpit 20 also includes the work/travel mode switch, the manual suspension assembly control switches 190, the control reversal switch 272, the increase/decrease setpoint switch 260 and the neutral switch 262.

The cockpit 20 also includes a parking brake applied switch (not shown) that is preferably in the form of a single pole single throw switch. The parking brake applied switch can be connected as an input to the electronic controller 250, but is preferably on a separate circuit and is connected to the parking brake directly. This parking brake applied switch allows the operator to set the spring applied pressure released brake 201 by flipping the parking brake applied switch without shutting off the engine 172. The parking brake applied switch controls the solenoid 203 operatively associated with the brake 201 to move the brake between locking and releasing positions to thereby lock and release the drive wheel 128 on the track 26.

The cockpit 20 can optionally include a plugged hydraulic filter output indicator. The electronic controller 250 can be programmed such that if one of the filters 190, 194, 196 is plugged, an indicator indicates to the operator that the filter is plugged. Optionally, the electronic controller 250 can be programmed to shut the engine 172 off in the event of filter blockage.

The cockpit 20 can also optionally include a directional change switch (not shown) that functions to change the direction of vehicle travel instantaneously without moving the FNR lever 252 or the inching pedal 256. The switch signals the electronic control 250 to change the pumping directions of the wheel and track pumps 180, 178 simultaneously and instantaneously. The directional change switch can be provided as a safety device and as a convenience to the vehicle operator.

It can be understood that the electronic controller 250 enables the vehicle 10 to be constructed and operated as a multifunction utility vehicle. A single vehicle such as the exemplary vehicle 10 can be reconfigured with various sets of input devices which are mounted in the cockpit and plugged into the electronic controller 250. The electronic controller 250 can be programmed to operate the vehicle in different modes depending on the working environment and the function of the vehicle, including the agricultural and bulldozer modes mentioned and a front end loader mode. A single vehicle can be reconfigured to better accommodate each of these modes.

When the vehicle 10 is used in bulldozer mode, preferably the input controls 252, 254 in the cockpit 20 include a first lever-type (or joystick-type) speed control for generating speed-indicating input signals that are sent to the electronic controller 250 and a second lever-type (or joystick-type) control input device for generating direction-indicating input signals that are sent to the electronic controller 250. Thus, although the exemplary vehicle described above used a steering wheel 254 to steer the vehicle, this is illustrative only and not intended to limit the scope of the invention. Alternatively, a single dual-axis or three-axis joystick-type speed and direction control can be provided which provides both a speed and a directional signal. When used in bulldozer mode, as mentioned, implements can be attached to the front and/or the back of the vehicle 10. For example, the vehicle 10 may have a bulldozer blade on its back end and a bucket-type loader on its front end. The seat assembly 22, which may include a control panel assembly (on which are mounted various combinations of the above-described inputs controls and indicators). Preferably, the speed and steering controls are mounted on the seat assembly 22. The seat assembly 22 is rotatably mounted on the floor of the cockpit 20 for movement between forwardly facing and rearwardly facing positions. Preferably the speed and direction control devices are mounted on the seat assembly and move with the seat assembly when the seat assembly is moved between forwardly facing and rearwardly facing positions.

An optional seat-actuated control reversal switch can be used to provide the function of the control reversal switch 272. A seat-actuated control reversal switch 272 is electrically communicated to the electronic controller 250 and functions to indicate to the controller 250 the direction in which the seat assembly 22 is facing. Preferably the reversal switch 272 is operatively associated seat assembly such that when the seat assembly 22 is moved between forwardly and rearwardly facing positions, the reversal switch 272 is toggled to communicate to the controller 250 that the seat assembly 22 position has been reversed. The controller 250 is programmed the controls work in the same manner in both seat directions. In other words, for example, the speed input control and the direction input control will operate the same way from the operator's point of view in both seat assembly 22 directions. Thus, preferably the electronic controller 250 is programmed such that the vehicle turns to the right when the operator moves the steering input device to the right, for example, and the vehicle is moving forwardly for the point of view of the operator regardless of the direction in which the seat is facing relative to the vehicle. This function can be provided by a separate toggle switch mounted within the cab, but is preferably provided by a switch operatively associated with the seat assembly 22 such that when the seat is turned 180 degrees a switch is toggle.

Preferably in bulldozer mode the blade implement mounted on one end of the vehicle 10 can be utilized to stabilize the vehicle 10 when using an implement mounted on the opposite end of the vehicle. The blade can be used for stabilization jacks in certain applications. There could, however, be hydraulically controlled stabilization jacks provided on the vehicle.

When the vehicle 10 is used in agricultural tractor mode, preferably a steering wheel-type potentiometer 324 (see FIG. 1, for example) is mounted in the cockpit 20 and connected to the electronic controller 250. The agricultural mode embodiment preferably further includes the forward/neutral/reverse single axis lever-type control speed control device 326 (see FIG. 1, for example). Optionally, the manual operated base pressure adjustment switch can be provided by a single rocker-type switch instead of the three portion center return switch. The agricultural mode embodiment is preferably also provided with a three point hitch on each end of the vehicle and with a rotatable seat assembly 22 so that the seat assembly 22 can be moved between forwardly facing and rearwardly facing positions as described above when discussing the bulldozer mode. Preferably the speed input device and the steering input device swing with the seat assembly 22.

When the vehicle functions as a front end loader, preferably the operator inputs include a duel axis, spring-centered joystick for propelling and steering the vehicle 10 and a suspension base pressure adjustment switch for each suspension assembly in the form of rocker switches to add an offset pressure to each suspension cylinder. A rocker-type switch is preferred for operation as a front end loader because the specific gravities of the particular materials being loaded can vary. The rocker switch provides improved operator control over the pressure in the suspension assemblies 164 as compared to, for example, a simple toggle (SPST) switch.

The flowcharts describe the best mode and preferred embodiment of the vehicle 10, but many structural and operational variations thereof are contemplated and within the scope of the present invention. By "operational variations" it is meant that the controller 250 can be programmed to control the vehicle in many different ways.

Although the preferred suspension assemblies 164 is a double suspension cylinder having an independent hydraulically movable piston at each end, it is also contemplated to vertically reposition the wheel 144 with a single sided suspension assembly. The preferred single-sided suspension assembly includes a pressure transducer on its piston side and is computer controllable to maintain suspension assembly baseline pressure foreground-following wheel movement. The operator can adjust the baseline pressure in each single-sided suspension assembly and can manually independently or manually simultaneously raise or lower each or both suspension assemblies.

Any suitable hydraulic valving can be used to control the single-sided suspension assemblies. Closed center proportional valves, for example, could be used by a suitably programmed electronic controller and to independently control each cylinder using pressure feedback information from the pressure transducers. It is contemplated to control each suspension assembly with an appropriately programmed and properly interfaced electronic controller so that the wheels constantly engage the ground surface with a predetermined amount of baseline pressure to keep the vehicle stable. Preferably this is done solely with electrically controlled valving, but it is also contemplated that an accumulator may optionally be used in conjunction with the valving. For example, a small gas charged accumulator may optionally be operatively mounted with each suspension assembly to improve ground-following movement of each wheel.

The electronic controller 250 can also be programmed such that when the vehicle is traveling forwardly with a given baseline pressure and the steering input device is moved from its neutral position to its position of full displacement in either steering direction, the baseline pressure increases by a predetermined amount. For example, if this predetermined amount is 400 pounds of pressure and the vehicle is traveling forwardly with a baseline pressure of 800 pounds, movement of the steering signal input device from neutral through its full range of motion in a given steering direction would cause the controller to increase the hydraulic pressure in each suspension assembly to 1200 pounds. Similarly, if the operator has adjusted the rotary potentiometer to set the baseline pressure to 900 pounds during normal forward travel and the operator then moves the steering signal input device from neutral to its fully displaced position in a given steering direction, the suspension assembly pressure will increase to 1300 pounds.

Preferably, the electronic controller 250 is programmed such that the pressure increase in each suspension assembly is directly proportional to the amount the steering input signal device has moved from its neutral position through its range of movement in a given steering direction. In the context of the example cited immediately above, if the steering wheel (or other steering input device) is moved from its neutral position halfway through its range of movement, the pressure in each suspension assembly would increase proportionately by 200 pounds of pressure of both baseline (because 200 pounds is one-half of 400 pounds). Although this straight line type increase in suspension assembly pressure is preferred, it is also contemplated to increase suspension assembly pressure with relationships other than straight line relationships. For example, it is contemplated in some embodiments to have suspension assembly pressure increase quickly initially when the steering device is moved outwardly from its neutral position in the steering direction and then increase at a progressively slower rate as the steering input device approaches its maximum displacement in a given steering direction. Alternatively, it is contemplated to have suspension assembly pressure increase slowly initially when the steering device is moved out of its initial position in the steering direction and then increase at a progressively faster rate as the steering input device approaches its maximum displacement in a given steering direction.

Alternatively, the controller 250 can be programmed to increase suspension pressure only after a steering signal is received that exceeds a preselected threshold level. When the threshold is exceeded, the controller 250 can be programmed to increase the suspension pressure immediately to a predetermined level or, alternatively, can be programmed to increase suspension pressure in proportion to the amount the steering signal exceeds the threshold level.

The electronic controller 250 vehicle 10 can also be programmed so that during a turn in a given direction (right or left), the suspension assembly 164 on the turning direction side of the vehicle (that is, the right side suspension assembly 164 when the vehicle is turning to the right) decreases wheel 144 pressure and the suspension assembly 164 on the side opposite the turning direction side of the vehicle 10 increases wheel 144 pressure in response to a steering input signal from the steering device 254. It can be understood that in this embodiment, the controller 250 is operable to process the steering input signal and responsively control (a) the respective amounts of power supplied from the engine assembly 170 to the driving structure operating motors 180 of the secondary driving assemblies 16 so as to affect a vehicle steering operation in which the force imparted to the vehicle 10 in the vehicle driving direction by one of the ground engaging driving structures 16 is greater than the force imparted to the vehicle 10 by the other of ground engaging driving structure on the opposite side of the vehicle in the vehicle driving direction to thereby turn the vehicle at the selected angle, and (b) the respective amounts of power supplied from the engine assembly 170 to the mounting structure movers 164 so as to operate one or both of the mounting structure movers 164 such that the ground bearing pressure applied by the ground engaging driving structure imparting the greater force in the vehicle driving direction to the vehicle during the vehicle steering operation is greater than the ground bearing pressure applied by the other ground engaging driving structure, thereby providing the driving structure imparting the greater force in the vehicle driving direction to the vehicle with increased traction relative to the other driving structure during the vehicle steering operation.

In the mode described above, it can be seen that the controller 250 is operable when processing a turning signal to responsively provide a greater amount of power from the engine assembly including the associated pumps to an outer vertical mover 164 with respect to the angle of turn than to an inner vertical mover 164 with respect to the angle of turn so that the faster rotating outer wheel 144 will be provided with greater ground pressure and increased traction and any lateral tilt of the main frame 12 is stabilized.

Because vehicle speed control and vehicle steering are performed with the assistance of the electronic controller 250, the speed control and steering functions are "closed loop" operations (that is, one which utilizes speed feedback signals from the track and/or wheels). More particularly, when the vehicle 10 is driving forwardly at a given speed, straight vehicle tracking (i.e., straight vehicle movement at the preselected speed without turning right or left in the absence of a steering input request from a steering input device 254) is achieved utilizing speed feedback data. That is, the speed feedback data from the flanking wheels 144 is communicated to the electronic controller 250 and straight vehicle tracking is accomplished by continuous controller 250 adjustment of wheel speed. The speed feedback data is from the wheels and the track is fed back to the electronic controller 250. The controller 250 continuously compares the actual speeds of the wheels 144 and of the track 26 to desired speeds (based on the magnitude of the operator-initiated speed input signal) to continuously monitor and adjust wheel speed and thereby provide straight tracking.

The wheel speeds and the track speed are each individually controllable by adjusting the output of the associated pumps. The controller 250 is programmed to monitor and adjust the relative wheel 144 and track 26 speeds as needed. It is not imperative that track 26 speed be equal to the wheel 144 speed during straight ahead vehicle 10 movement. A limited amount of wheel slippage (up to approximately 5 percent) is acceptable. That is, it is not objectionable for the wheel speed to be up to five percent faster than the track speed during straight ahead travel. (It is necessary, however, that of wheel speeds be approximately equal to each other to assure straight vehicle movement.) It is not desirable, however, for the wheel speed to lag the track speed.

The motion control system includes a number of tunable parameters. For example, the minimum (or threshold) voltage level required to be sent to each pump EDC to initiate movement of the associated wheel or track is adjustable and can be set independently for each pump 178, 180. Similarly, the maximum voltage level required to be sent to each pump EDC necessary to effect the maximum pump stroke is adjustable and can be set independently for each pump 178, 180. The acceleration and deceleration of the control voltage "ramps" effected by movement of the input device (such as joystick movement, for example) which determines the rate of increase and the decay rate of the control voltage as a function of input device movement can also be calibrated (as well as filtered, as described above). Preferably, the way in which the vehicle 10 is controlled and the functions performed by the various components of the control system are similar for controlling both forward and reverse travel.

It is also contemplated to program the electronic controller 250 to calculate differential wheel speed and relative track and wheel speeds as a function of both the percentage of steering input requested (by the operator-initiated movement of the steering input device 254) and as a percentage of travel speed of the vehicle 10 at the time the operator-initiated steering request is made.

For example, if the vehicle is traveling forwardly (i.e., in a straight line) at its maximum forward speed and the vehicle operator moves the steering control input device (such as a joystick) from its neutral position in a right turn effecting direction through 90 percent of its range of movement (thereby making a 90 percent steering request), preferably the electronic controller 250 is programmed to effect a lesser degree of differential wheel rotation than if the vehicle were traveling at half of its maximum forward speed, for example, at the moment the 90 percent operator-initiated steering requests is made.

It is contemplated, therefore, for the degree of steering response to be a function of the travel speed of the vehicle. As the percentage of travel speed increases, the degree of steering responsiveness would decrease. For example, in some embodiments of the vehicle (and/or in some modes of vehicle operation of a particular vehicle), it is contemplated to program the electronic controller 250 such that counter rotation of the wheels in response to a steering request would be allowed only if the vehicle is traveling at, for example, ±10% of its maximum speed, that up to a 75% difference in rotational speed would be allowed within the range of from ±10% up to ±60% of maximum speed and that up to a 50% difference in rotational speed would be allowed at speeds above ±60% of maximum speed.

Because the relative wheel and track speeds are controlled using a closed loop control configuration, the wheel and track speeds can be controlled very accurately, thereby controlling or eliminating wheel slippage relative to the track during straight ahead vehicle movement. The electronic controller 250 controls wheel speeds (and therefore pump displacements of the associated pumps) utilizing both the speed feedback information from the wheels and the steering device input information (encoded, for example, as a percentage of steering device movement). It is contemplated to program the electronic controller 250 to include a steering algorithm that will calculate pump stroke output signals based on both the speed feedback signals and the percentage of steering device input.

The ability to maintain the vehicle in a laterally level condition increases driver comfort and vehicle stability. Leveling ability is also advantageous in many working conditions. For example, when the vehicle 10 is used as a dozer and is provided with a bucket-type implement, a blade-type implement or other earth moving implement, the ability to level the vehicle facilitates the process of making a level road or the like because the leveling action of the vehicle maintains the implement in a laterally level condition while earth is being moved.

Another preferred arrangement for laterally leveling the vehicle 10 involves measuring the degree of lateral tilt of the vehicle 10 and responsively leveling the same. This arrangement utilizes a rate gyro and an accelerometer. The rate gyro measures the roll rate of the main frame (and therefore of the attached cab) in the lateral or side-to-side direction. The angular position or deflection angle of the frame (relative to horizontal where "horizontal" is determined relative to the direction of the Earth's gravitational force) can be calculated by mathematically integrating the roll rate. A mathematical integration function is a function that calculates a displacement from a rate.

A rate gyro can be utilized to determine both the angle of the vehicle in the lateral direction relative to horizontal and the frequency of side-to-side movement of the vehicle. To illustrate what is meant by "frequency of side-to-side movement", if the vehicle is traveling forwardly across generally level but rocky or uneven terrain, the vehicle will typically tend to move back and forth laterally at a relatively high rate or frequency, the frequency being dependent on a number of factors including the vehicle travel speed, the nature of the terrain, tire pressure and so on. For the sake of illustration, it will be assumed that this lateral tilting movement of the vehicle while traveling across the generally level but uneven surface is confined to an angular range of between ±10 degrees from horizontal. This situation is to be contrasted with a situation in which the vehicle is traversing (or parked on) a slope of approximately 10 degrees, the vehicle being positioned on the slope such that its longitudinal axis is perpendicular to the gradient or direction of incline of the slope. In this latter situation, the vehicle is disposed at 10 degrees with 0 frequency (in the instance in which the vehicle is parked or stationary) or the vehicle is disposed at an average angular position of 10 degrees, although the exact angular position may fluctuate about the 10 degree angular measurement due to the uneven as of the terrain, vehicle state and so on.

The electronic controller would not attempt to level the vehicle in the first cited instance, that is, the instance in which the vehicle is traversing a generally level but uneven surface and is moving side to side ±10 degrees at a frequency above the predetermined threshold level. The electronic controller would, however, execute a leveling algorithm to initiate a lateral leveling action in the latter instance is, that is, the instance in which the vehicle is disposed at an average ±10 degree angle for a period of time above the predetermined frequency threshold level This can be accomplished by providing to a pair of suspension assembly associated control valves (such as, for example, two closed center proportional valves) opposite polarity voltages of appropriate magnitude. Because the magnitude of the fluid flow through each closed center proportional valves is directly proportional to the magnitude of the input voltage, and because the feedback sensors utilized to detect and measure lateral tilt have no discontinuities in them, the closed center proportional control valves can be precisely controlled to level the cab at a controlled rate. The rate gyro, for example, has no discontinuities and therefore is smooth acting. This allows the electronic controller to slow the rate of angular movement of the vehicle sufficiently as the vehicle returns to horizontal to comfortably returned the operator to level without an abrupt stop at the horizontal position.

It can be understood, therefore, that the electronic control system provides the electronic controller with the ability to measure angular displacement of the vehicle laterally from horizontal and the lateral rate of angular movement from horizontal. This ability allows the control system to react to changes in angular position with a vehicle leveling-type of response. For example, if the vehicle is traveling across a generally level (i.e., generally horizontal) surface and the one of the vehicle wheels encounters and rolls over an raised obstruction such as a rock or stump, the electronic controller would be able to determine from the angular displacement of the vehicle from horizontal and the rate at which this angular displacement from horizontal was achieved (i.e. essentially instantaneously), that the appropriate response would be to retract the suspension assembly associated with the instantaneously elevated wheel by lowering the hydraulic pressure in that suspension assembly. The hydraulic pressure in the opposite suspension assembly would remain unaffected by the rapid changes in vehicle angle, lateral vehicle rotation rate and the associated increase in hydraulic pressure in the suspension assembly on the obstruction side of vehicle. Thus, it can be understood that when one of the wheels encounters a raised obstruction, for example, the change in lateral angular position occurs at a frequency rate above the predetermined threshold frequency and therefore no leveling action (meaning the causing of simultaneous and oppositely directed fluid flow by the electronic controller) occurs. Rather, the electronic controller responds to the obstruction by adjusting only the suspension assembly pressure in the suspension assembly on the obstruction side. Therefore the ground following or individual suspension assembly pressure adjustment has a higher priority than the leveling type of suspension assembly adjustment.

Method for Periodic Re-calibration of the Rate Gyro

The rate that is calculated by the rate gyro is extremely accurate, but it does include an offset. Every time a mathematical integration function is performed on the rate gyro, there is an offset and the rate gyro tends to accumulate these errors so that over time the rate gyro through its integration function will indicate an inaccurate deflection angle for the main frame of the vehicle. The electronic control system can be programmed to perform the method described below for correcting this offset using data from a two axis accelerometer.

The pressure transducers on the piston sides of the cylinders provide a reading of the downward force on the wheel 144. The rate gyro monitors the horizontal angle of the main frame of the vehicle. This provides a direct measurement of the rate of angular motion of the frame which must be integrated to yield an angular displacement. Thus, $$\alpha = {}_0\!\int^\infty R(\pm \delta R)dt$$

where $\alpha$ = the angular displacement of the frame

R = the angular rate indicated by the rate gyro $\pm \delta R$ = the intrinsic offset inherent in the rate sensor The intrinsic offset is measurable (and therefore theoretically correctable at zero rates), but the offset varies with angular rate and environmental conditions. It is therefore imperative that an absolute reference to inertial space be available to occasionally correct the frame deflection angle. This function is performed by the two axis accelerometer. A two axis accelerometer measures acceleration in axes that are at right angles to one another. This can be used as an inertial reference under some circumstances by simply taking the ratio of the magnitude of the two axes when they are in an inverted "V." configuration. This ratio is the tangent of the angular deviation of the inertial reference from vertical. Thus, the roll angle given by the bi-axial accelerometer is:

$\alpha = \tan^{-1}$ (acceleration 1/acceleration 2)

where acceleration 1 is the direction of the angle. To compensate for body forces, a longer term (1–5 seconds) selective average will be calculated which is given by n=N $A = \Sigma(\alpha)(\gamma)$ n=0 where $\gamma = 0$ if steering angle is not equal to zero. At the end of a specified period (N measurements), the value A will be used to correct a given by the roll rate sensor.

The rate gyro and the two axis accelerometer are preferably mounted on the main frame of the vehicle. The two axes of the two axis accelerometer are in an inverted "V" orientation and each axis is 45 degrees from horizontal and the two axes are 90 degrees apart.

It can also be appreciated from a comparison of FIGS. 1 and 23–25 that it is contemplated to construct the vehicle 10, 560 (FIG. 22), 580 (FIG. 23), 600 (FIG. 25) with a cab portion thereof, 18, 562, 582, 602, respectively, located in different positions relative to the respective frames 12. Identical structures on the vehicles 560, 580, 600 are designated by identical reference numbers and are not further described. The cab 562 is mounted generally rearwardly of the frame 12 of the vehicle 560, the cab 582 is mounted to the side of the vehicle 580 and the cab 602 is mounted generally forwardly of the frame 12 of the vehicle 600. The construction of each cab 18, 562, 582, 602 can vary depending upon its location relative to the frame 12 and on the intended work environment of the vehicles 10, 560, 580, 600 and tasks the vehicle can be expected to perform.

The exemplary vehicle 10 is intended to illustrate broad principles only and is not intended to limit scope of the invention to the embodiment shown. Variations of vehicle are therefore contemplated and within the scope of the invention. For example, although the vehicle 10 is shown an described having non-steerable wheels so that the vehicle is steered using differential wheel speed, it is contemplated to construct any of the vehicles described herein to have steerable wheels. When steerable wheels are used in assembly, the wheels are preferably powered for power driven rotational movement thereof in either wheel rotation direction, but it is also contemplated to construct a vehicle according to the principles described herein having steerable idler (i.e., non-powered) wheels.

It is a contemplated to construct embodiments of the vehicle in which the flanking wheels are mounted to the main frame in a central vehicle position (as in vehicle 10, for example). Alternatively, it is contemplated to construct embodiments of the vehicle in which the flanking wheels are mounted in a forward vehicle position or, as another alternative, in an aft (or rearward) vehicle position. Furthermore, it is contemplated to provide embodiments of the vehicle in which the wheels are movable in a longitudinal direction (as well as vertically) so that in some positions of adjustment the wheels can be in a central vehicle position and in other positions of adjustment the wheels are in a forward (or, alternatively, aft) vehicle position.

Furthermore, it is contemplated to construct non-computerized versions of the vehicles described herein. It is contemplated, for example, to construct embodiments of the vehicles described herein that are completely manually controllable.

It can thus be appreciated that the objectives of the present invention have been fully and effectively accomplished. It is to be understood, however, that the foregoing preferred embodiment has been provided solely to illustrate the structural and functional principles of the present invention and is not intended to be limiting. To the contrary, the present invention is intended to encompass all the modifications, alterations, and substitutions within the spirit and scope of the appended claims.

What is claimed:

1. A vehicle comprising:

a frame assembly;

an engine assembly carried by said frame assembly constructed and arranged to generate power;

a track assembly on said frame assembly, a series of rollers including a drive roller, and an endless track trained about said rollers so as to provide an operative ground engaging flight extending longitudinally with respect to said frame assembly;

a power operated track mover operatively connected to said drive roller to move said operative flight in ground engaging relation;

a pair of left and right driving and steering wheels disposed on opposite sides of said track assembly in flanking relation thereto;

each of said wheels having (1) mounting structure supporting the wheel for rotational movement about a rotational axis mounted on said frame assembly for vertical movements between extended and retracted positions with respect thereto; (2) a power operated wheel rotator connected thereto to rotate the associated wheel about its rotational axis and (3) a power operated vertical mover constructed and arranged to move said mounting structure with respect to said frame assembly between extended and retracted positions;

the arrangement of the wheel mounting structures and vertical movers with respect to said frame assembly and track frame structure being such that movement by said movers of said wheel mounting structures with respect to said frame assembly between said retracted and extended positions creates a shift of load between said wheels and said track assembly progressively between a maximum traction condition wherein the load is shared relatively less by the wheels and the entire operative flight of the track and a maximum turning tricycle condition wherein the load is shared relatively more by said wheels and by only a portion of the operative flight of the track with the remainder of the operative flight of the track tilted out of ground contact;

an electronic controller operable to control (a) an amount of power supplied from said engine assembly to said power operated track mover (b) an amount of power supplied from said engine assembly to a left one of said wheel rotators (c) an amount of power supplied from said engine assembly to a right one of said wheel rotators (d) an amount of power supplied from said engine assembly to a left one of said vertical movers and (e) an amount of power supplied from said engine assembly to a right one of said vertical movers;

a speed input system communicated to said controller, said speed input system being operable to transmit a speed signal to said controller indicative of a selected speed at which said vehicle is to be moved;

said controller being operable to receive said speed signal and responsively control the amount of power supplied from said engine assembly to said track mover and said wheel rotators so as to move said vehicle at said selected speed;

a steering input device communicated with said controller, said steering input device being operable to transmit straight and turning signals to said controller indicative of a selected straight vehicle movement and of a selected angle at which the vehicle is to be turned;

said controller being operable to process the steering signals transmitted thereto and responsively control (a) the respective amounts of power supplied from said engine assembly to said track mover, said wheel rotators and said vertical movers such that (1) when a straight signal is processed, both wheels rotate at the same speed in uncoordinated relation with the track speed and said wheel mounting structures are in relative retracted positions with respect to said frame assembly presenting a traction condition wherein the load is shared between the wheels and the entire operative flight of the track, and (2) when a turning signal is processed, an outer wheel with respect to the angle of turn rotates at a greater speed than an inner wheel with respect to the angle of turn to thereby effect the turn and said wheel mounting structures are in relative extended positions relative to said frame assembly presenting a turning tricycle condition wherein the load is shared between said wheels and only a portion of the operative flight of said track;

a lateral tilt input system connected with said controller, said lateral tilt input system being operable to generate a lateral tilt signal indicative of a sustained movement of the vehicle along a slope in a direction wherein a downhill wheel is lower than an uphill wheel and said frame assembly has at least a predetermined lateral tilt;

said controller being operable to process said lateral tilt signal and responsively control the respective amounts of power from said engine assembly to one or more of said vertical movers to move said frame assembly from said lateral tilted condition into a generally horizontally level condition.

2. A vehicle as defined in claim 1 wherein each of said vertical movers has a separate manually actuatable second vertical mover in series therewith; a manually actuated lateral tilt system operatively connected to each second vertical mover to cause power from said engine assembly to move said second vertical mover in accordance with a selected manual actuation thereof.

3. A vehicle as defined in claim 2 wherein said controller is operable when processing a turning signal as aforesaid to responsively provide a greater amount of power from said engine assembly to an outer vertical mover with respect to the angle of turn than to an inner vertical mover with respect to the angle of turn so that the faster rotating outer wheel is provided with greater ground pressure and increased traction and any lateral tilt of said frame assembly during the turn is stabilized.

4. A vehicle as defined in claim 1 wherein said lateral tilt input system includes a tilt switch constructed and arranged to indicate the direction of a lateral tilt of said frame assembly beyond level and a timer constructed and arranged to indicate the time the tilt switch has indicated a tilt of the frame assembly beyond level in one direction, said lateral tilt input system including controller components operable to transmit a lateral tilt signal indicative of tilt direction when said tilt switch indicates a tilt direction and said timer indicates a predetermined time for such tilt direction.

5. A vehicle as defined in claim 1 wherein said lateral tilt input system includes a rate gyro and an accelerometer operable to indicate the frequency of lateral tilting movement of said frame assembly in any one direction beyond a predetermined threshold level, said lateral tilt input system including controller components for transmitting a directional lateral tilt signal in response to the indication of said rate gyro and accelerometer.

6. A vehicle according to claim 1 wherein said engine assembly comprises an engine and a hydraulic pump system operatively connected to said engine, said engine being constructed and arranged to operate said hydraulic pump system to pressurize a supply of hydraulic fluid; said track mover being a track hydraulic motor fluidly communicated with said hydraulic pump system, said track hydraulic motor being constructed and arranged to move said track using pressurized fluid supplied thereto by said hydraulic pump system; each of said wheel rotators being a wheel hydraulic motor fluidly communicated with said hydraulic pump system, said wheel motors being constructed and arranged to rotate said wheels using pressurized fluid supplied thereto by said hydraulic pump system.

7. A vehicle according to claim 6, wherein said hydraulic pump system comprises three variable stroke reversible hydraulic pumps, a first of said pumps being fluidly communicated to said track motor, a second of said pumps being fluidly communicated to one of said wheel motors, and a third of said pumps being fluidly communicated to the other of said wheel motors.

8. A vehicle comprising:

a frame assembly;

an engine assembly carried by said frame assembly constructed and arranged to generate power;

a track assembly on said frame assembly, a series of rollers including a drive roller, and an endless track trained about said rollers so as to provide an operative ground engaging flight extending longitudinally with respect to said frame assembly;

a power operated track mover operatively connected to said drive roller to move said operative flight in ground engaging relation;

a pair of left and right driving and steering wheels disposed on opposite sides of said track assembly in flanking relation thereto;

each of said wheels having (1) mounting structure supporting the wheel for rotational movement about a rotational axis mounted on said frame assembly for vertical movements between extended and retracted positions with respect thereto; (2) a power operated wheel rotator connected thereto to rotate the associated wheel about its rotational axis and (3) a power operated vertical mover constructed and arranged to move said mounting structure with respect to said frame assembly between extended and retracted positions;

the arrangement of the wheel mounting structures and vertical movers with respect to said frame assembly and track frame structure being such that movement by said movers of said wheel mounting structures with respect to said frame assembly between said retracted and extended positions creates a shift of load between said wheels and said track assembly progressively between a maximum traction condition wherein the load is shared relatively less by the wheels and the entire operative flight of the track and a maximum turning tricycle condition wherein the load is shared relatively more by said wheels and by only a portion of the operative flight of the track with the remainder of the operative flight of the track tilted out of ground contact;

an electronic controller operable to control (a) an amount of power supplied from said engine assembly to said power operated track mover (b) an amount of power supplied from said engine assembly to a left one of said wheel rotators (c) an amount of power supplied from said engine assembly to a right one of said wheel rotators (d) an amount of power supplied from said engine assembly to a left one of said vertical movers and (e) an amount of power supplied from said engine assembly to a right one of said vertical movers;

a speed input system communicated to said controller, said speed input system being operable to transmit a speed signal to said controller indicative of a selected speed at which said vehicle is to be moved;

said controller being operable to receive said speed signal and responsively control the amount of power supplied from said engine assembly to said track mover and said wheel rotators so as to move said vehicle at said selected speed;

a steering input device communicated with said controller, said steering input device being operable to transmit straight and turning signals to said controller indicative of a selected straight vehicle movement and of a selected angle at which the vehicle is to be turned;

said controller being operable to process the steering signals transmitted thereto and responsively control (a)

the respective amounts of power supplied from said engine assembly to said track mover, said wheel rotators and said vertical movers such that (1) when a straight signal is processed, both wheels rotate at the same speed in uncoordinated relation with the track speed and said wheel mounting structures are in relative retracted positions with respect to said frame assembly presenting a traction condition wherein the load is shared between the wheels and the entire operative flight of the track, and (2) when a turning signal is processed, an outer wheel with respect to the angle of turn rotates at a greater speed than an inner wheel with respect to the angle of turn to thereby effect the turn and said wheel mounting structures are in relative extended positions relative to said frame assembly presenting a turning tricycle condition wherein the load is shared between said wheels and only a portion of the operative flight of said track;

each of said vertical movers having a separate manually actuatable second vertical mover in series therewith; and a manually actuated lateral tilt system operatively connected to each second vertical mover to cause power from said engine assembly to move said second vertical mover in accordance with a selected manual actuation thereof.

9. A vehicle as defined in claim 8 wherein said controller is operable when processing a turning signal as aforesaid to responsively provide a greater amount of power from said engine assembly to an outer vertical mover with respect to the angle of turn than to an inner vertical mover with respect to the angle of turn so that the faster rotating outer wheel is provided with greater ground pressure and increased traction and any lateral tilt of said frame assembly during the turn is stabilized.

10. A vehicle as defined in claim 8 wherein each vertical mover and second vertical mover in series therewith comprises a suspension assembly comprising two cylinders fixed end to end so as to present free ends having longitudinally movable piston rods extruding therefrom, and pistons on said piston rods within said cylinders dividing the cylinders into chambers, said manually actuated lateral tilt system including an auxiliary hydraulic pump drivingly connected with said engine assembly, and a control valve hydraulically connected between said auxiliary pump and a load bearing chamber of each suspension assembly for controlling the flow of hydraulic fluid from said auxiliary pump into and out of said load bearing chamber.

11. A vehicle as defined in claim 10 wherein each of said control valves is solenoid operated and said manually actuated lateral tilt system further includes a manually actuated toggle switch for operating each solenoid operating switch.

12. A vehicle according to claim 8 wherein said engine assembly comprises an engine and a hydraulic pump system operatively connected to said engine, said engine being constructed and arranged to operate said hydraulic pump system to pressurize a supply of hydraulic fluid; said track mover being a track hydraulic motor fluidly communicated with said hydraulic pump system, said track hydraulic motor being constructed and arranged to move said track using pressurized fluid supplied thereto by said hydraulic pump system; each of said wheel rotators being a wheel hydraulic motor fluidly communicated with said hydraulic pump system, said wheel motors being constructed and arranged to rotate said wheels using pressurized fluid supplied thereto by said hydraulic pump system.

13. A vehicle according to claim 12, wherein said hydraulic pump system comprises three variable stroke reversible hydraulic pumps, a first of said pumps being fluidly communicated to said track motor, a second of said pumps being fluidly communicated to one of said wheel motors, and a third of said pumps being fluidly communicated to the other of said wheel motors.

14. A vehicle comprising:

a frame assembly;

an engine assembly carried by said frame assembly constructed and arranged to generate power;

a track assembly on said frame assembly, a series of rollers including a drive roller, and an endless track trained about said rollers so as to provide an operative ground engaging flight extending longitudinally with respect to said frame assembly;

a power operated track mover operatively connected to said drive roller to move said operative flight in ground engaging relation;

a pair of left and right driving and steering wheels disposed on opposite sides of said track assembly in flanking relation thereto;

each of said wheels having (1) mounting structure supporting the wheel for rotational movement about a rotational axis mounted on said frame assembly for vertical movements between extended and retracted positions with respect thereto; (2) a power operated wheel rotator connected thereto to rotate the associated wheel about its rotational axis and (3) a power operated vertical mover constructed and arranged to move said mounting structure with respect to said frame assembly between extruded and retracted positions;

the arrangement of the wheel mounting structures and vertical movers with respect to said frame assembly and track frame structure being such that movement by said movers of said wheel mounting structures with respect to said frame assembly between said retracted and extended positions creates a shift of load between said wheels and said track assembly progressively between a maximum traction condition wherein the load is shared relatively less by the wheels and the entire operative flight of the track and a maximum turning tricycle condition wherein the load is shared relatively more by said wheels and by only a portion of the operative flight of the track with the remainder of the operative flight of the track tilted out of ground contact;

an electronic controller operable to control (a) an amount of power supplied from said engine assembly to said power operated track mover (b) an amount of power supplied from said engine assembly to a left one of said wheel rotators (c) an amount of power supplied from said engine assembly to a right one of said wheel rotators (d) an amount of power supplied from said engine assembly to a left one of said vertical movers and (e) an amount of power supplied from said engine assembly to a right one of said vertical movers;

a speed input system communicated to said controller, said speed input system being operable to transmit a speed signal to said controller indicative of a selected speed at which said vehicle is to be moved;

said controller being operable to receive said speed signal and responsively control the amount of power supplied from said engine assembly to said track mover and said wheel rotators so as to move said vehicle at said selected speed;

a steering input device communicated with said controller, said steering input device being operable to transmit straight and turning signals to said controller indicative of a selected straight vehicle movement and of a selected angle at which the vehicle is to be turned;

said controller being operable to process the steering signals transmitted thereto and responsively control (a) the respective amounts of power supplied from said engine assembly to said track mover, said wheel rotators and said vertical movers such that (1) when a straight signal is processed, both wheels rotate at the same speed in uncoordinated relation with the track speed and said wheel mounting structures are in relative retracted positions with respect to said frame assembly presenting a traction condition wherein the load is shared between the wheels and the entire operative flight of the track, and (2) when a turning signal is processed, an outer wheel with respect to the angle of turn rotates at a greater speed than an inner wheel with respect to the angle of turn to thereby effect the turn and said wheel mounting structures are in relative extended positions relative to said frame assembly presenting a turning tricycle condition wherein the load is shared between said wheels and only a portion of the operative flight of said track;

said controller being operable when processing a turning signal as aforesaid to responsively provide a greater amount of power from said engine assembly to an outer vertical mover with respect to the angle of turn than to an inner vertical mover with respect to the angle of turn so that the faster rotating outer wheel is provided with greater ground pressure and increased traction and any lateral tilt of said frame assembly during the turn is stabilized.

15. A vehicle as defined in claim 14 wherein said controller has a lateral tile input system connected therewith operable to create a lateral tilt signal indicative of a sustained movement of the vehicle along a slope in a direction wherein a downhill wheel is lower than an uphill wheel and said frame assembly has at least a predetermined lateral tilt;

said controller being operable to process said lateral tilt signal and responsively control the respective amounts of power from said engine assembly to one or more of said vertical movers to move said frame assembly from said lateral tilted condition into a generally horizontally level condition.

16. A vehicle according to claim 14 wherein said engine assembly comprises an engine and a hydraulic pump system operatively connected to said engine, said engine being constructed and arranged to operate said hydraulic pump system to pressurize a supply of hydraulic fluid; said track mover being a track hydraulic motor fluidly communicated with said hydraulic pump system, said track hydraulic motor being constructed and arranged to move said track using pressurized fluid supplied thereto by said hydraulic pump system; each of said wheel rotators being a wheel hydraulic motor fluidly communicated with said hydraulic pump system, said wheel motors being constructed and arranged to rotate said wheels using pressurized fluid supplied thereto by said hydraulic pump system.

17. A vehicle according to claim 16, wherein said hydraulic pump system comprises three variable stroke reversible hydraulic pumps, a first of said pumps being fluidly communicated to said track motor, a second of said pumps being fluidly communicated to one of said wheel motors, and a third of said pumps being fluidly communicated to the other of said wheel motors.

* * * * *